US009889880B2

(12) United States Patent
Mori

(10) Patent No.: US 9,889,880 B2
(45) Date of Patent: Feb. 13, 2018

(54) MOTOR CONTROL DEVICE, ELECTRIC POWER STEERING DEVICE USING SAME, AND VEHICLE

(71) Applicant: NSK Ltd., Shinagawa-ku, Tokyo (JP)

(72) Inventor: Kenji Mori, Kanagawa (JP)

(73) Assignee: NSK Ltd., Tokyo (JP)

(*) Notice: Subject to any disclaimer, the term of this patent is extended or adjusted under 35 U.S.C. 154(b) by 0 days.

(21) Appl. No.: 15/109,858

(22) PCT Filed: Mar. 10, 2015

(86) PCT No.: PCT/JP2015/001284
§ 371 (c)(1),
(2) Date: Jul. 6, 2016

(87) PCT Pub. No.: WO2015/136918
PCT Pub. Date: Sep. 17, 2015

(65) Prior Publication Data
US 2016/0325777 A1 Nov. 10, 2016

(30) Foreign Application Priority Data

Mar. 11, 2014 (JP) ................................. 2014-048009

(51) Int. Cl.
*B62D 5/04* (2006.01)
*H02P 27/06* (2006.01)
(Continued)

(52) U.S. Cl.
CPC .......... *B62D 5/0484* (2013.01); *B60L 3/0061* (2013.01); *B60L 3/12* (2013.01);
(Continued)

(58) Field of Classification Search
CPC .. B62D 5/0484; B62D 5/0481; B62D 5/0487; H02P 29/032; H02P 6/085; H02P 6/12;
(Continued)

(56) References Cited

U.S. PATENT DOCUMENTS 7,557,583 B2 * 7/2009 Zettel ................. G01R 31/3278
324/418
8,045,301 B2 * 10/2011 Shiba ..................... B60L 3/003
318/800

(Continued)

FOREIGN PATENT DOCUMENTS

CN      1970331 A    5/2007
CN      1983795 A    6/2007
(Continued)

OTHER PUBLICATIONS

International Preliminary Report on Patentability (PCT/IB/338 & PCT/IB/373) issued in PCT Application No. PCT/JP2015/001284 dated Sep. 22, 2016, including English translation of document C2 (Japanese-language Written Opinion (PCT/ISA/237)) previously filed on Jul. 6, 2016 (seven (7) pages).

(Continued)

*Primary Examiner* — Rita Leykin
(74) *Attorney, Agent, or Firm* — Crowell & Moring LLP

(57) ABSTRACT

The motor control device includes plural motor current blocking units that, in blocking operation, individually block energization between plural motor driving circuits and multi-phase motor windings of a multi-phase electric motor and an abnormality detecting unit that detects a short-circuit failure of the motor current blocking units. The abnormality detecting unit causes one or more motor current blocking units of the plural motor current blocking units to perform a blocking operation during energization between the plural motor driving circuits and the multi-phase electric motor, and, during the blocking operation, detects a short-circuit failure of the motor current blocking units caused to perform the blocking operation based on current values of currents flowing to the plural motor driving circuits.

10 Claims, 25 Drawing Sheets

(51) Int. Cl.

| | | |
|---|---|---|
| *H02P 25/22* | (2006.01) | |
| *B60L 3/00* | (2006.01) | |
| *B60L 3/12* | (2006.01) | |
| *H02H 3/04* | (2006.01) | |
| *H02H 7/08* | (2006.01) | |
| *H02H 7/122* | (2006.01) | |
| *H02P 29/032* | (2016.01) | |
| *H02P 6/12* | (2006.01) | |
| *H02P 6/08* | (2016.01) | |
| *H02P 29/024* | (2016.01) | |

(52) U.S. Cl.
CPC .......... *B62D 5/046* (2013.01); *B62D 5/0487* (2013.01); *H02H 3/044* (2013.01); *H02H 7/08* (2013.01); *H02H 7/0833* (2013.01); *H02H 7/122* (2013.01); *H02P 6/085* (2013.01); *H02P 6/12* (2013.01); *H02P 25/22* (2013.01); *H02P 27/06* (2013.01); *H02P 29/0241* (2016.02); *H02P 29/032* (2016.02); *B60L 2210/40* (2013.01); *B60L 2220/54* (2013.01); *B60L 2240/429* (2013.01); *B60L 2240/529* (2013.01); *Y02T 10/641* (2013.01); *Y02T 10/642* (2013.01); *Y02T 10/7241* (2013.01)

(58) Field of Classification Search
CPC ........ H02P 25/22; H02P 27/06; B60L 3/0061; B60L 3/12; B60L 2220/54; B60L 2240/429; B60L 2240/529; H02H 3/044; H02H 7/08; H02H 7/0833; H02H 7/122; Y02T 10/641; Y02T 10/642; Y02T 10/7241
USPC ............................ 318/400.21, 508, 514, 515
See application file for complete search history.

(56) References Cited

U.S. PATENT DOCUMENTS

| | | | |
|---|---|---|---|
| 8,598,826 B2* | 12/2013 | Danjo | B60L 3/003 |
| | | | 318/400.02 |
| 8,660,755 B2* | 2/2014 | Kuroda | B62D 5/0481 |
| | | | 180/443 |
| 2007/0063663 A1 | 3/2007 | Ueda et al. | |
| 2007/0115604 A1 | 5/2007 | Zettel et al. | |
| 2009/0251831 A1 | 10/2009 | Shiba et al. | |
| 2011/0241589 A1 | 10/2011 | Danjo et al. | |
| 2013/0090809 A1 | 4/2013 | Kuroda | |
| 2014/0055059 A1* | 2/2014 | Uryu | H02P 27/06 |
| | | | 318/9 |

FOREIGN PATENT DOCUMENTS

| | | | |
|---|---|---|---|
| JP | 2006-345689 A | | 12/2006 |
| JP | 2006345689 A | * | 12/2006 |
| JP | 2008-11683 A | | 1/2008 |
| JP | 2010-158089 A | | 7/2010 |
| JP | 2013-79027 A | | 5/2013 |

OTHER PUBLICATIONS

International Search Report (PCT/ISA/210) issued in PCT Application No. PCT/JP2015/001284 dated Apr. 28, 2015 with English translation (Four (4) pages).

Japanese-language Written Opinion (PCT/ISA/237) issued in PCT Application No. PCT/JP2015/001284 dated Apr. 28, 2015 (Three (3) pages).

Extended European Search Report issued in counterpart European Application No. 15762403.2 dated Jul. 21, 2017 (8 pages).

Chinese-language Office Action issued in counterpart Chinese Application No. 201580005607.1 dated Nov. 30, 2017 with unverified English translation (17 pages).

* cited by examiner

FIG. 6
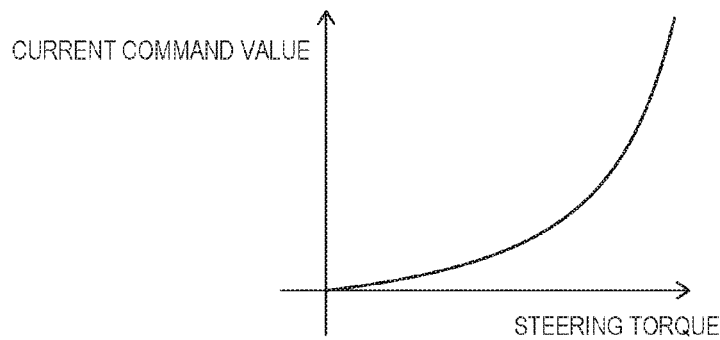
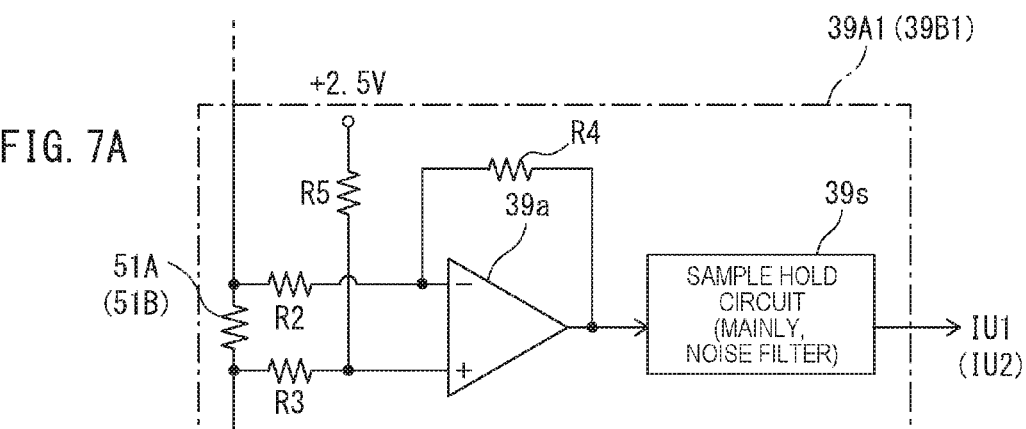
FIG. 7A
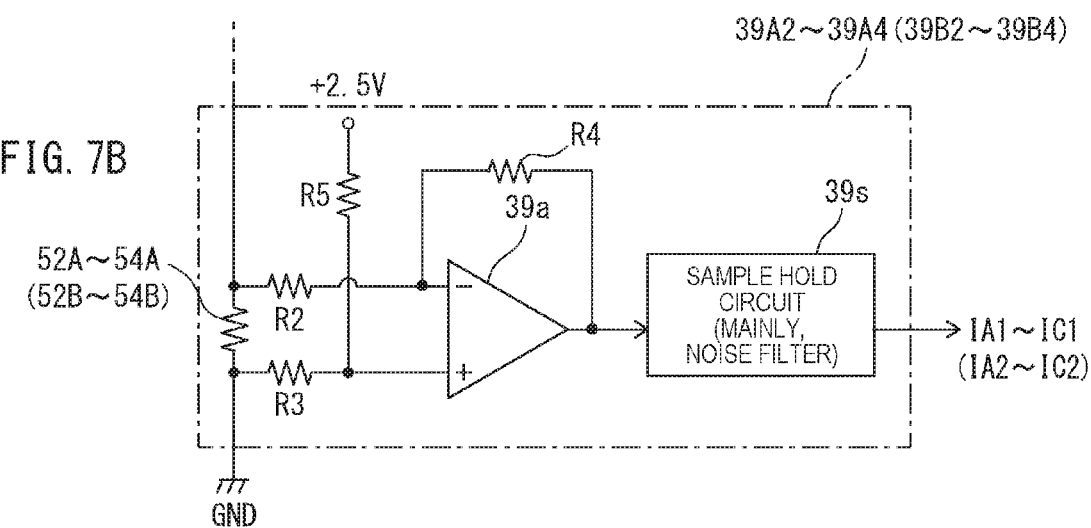
FIG. 7B

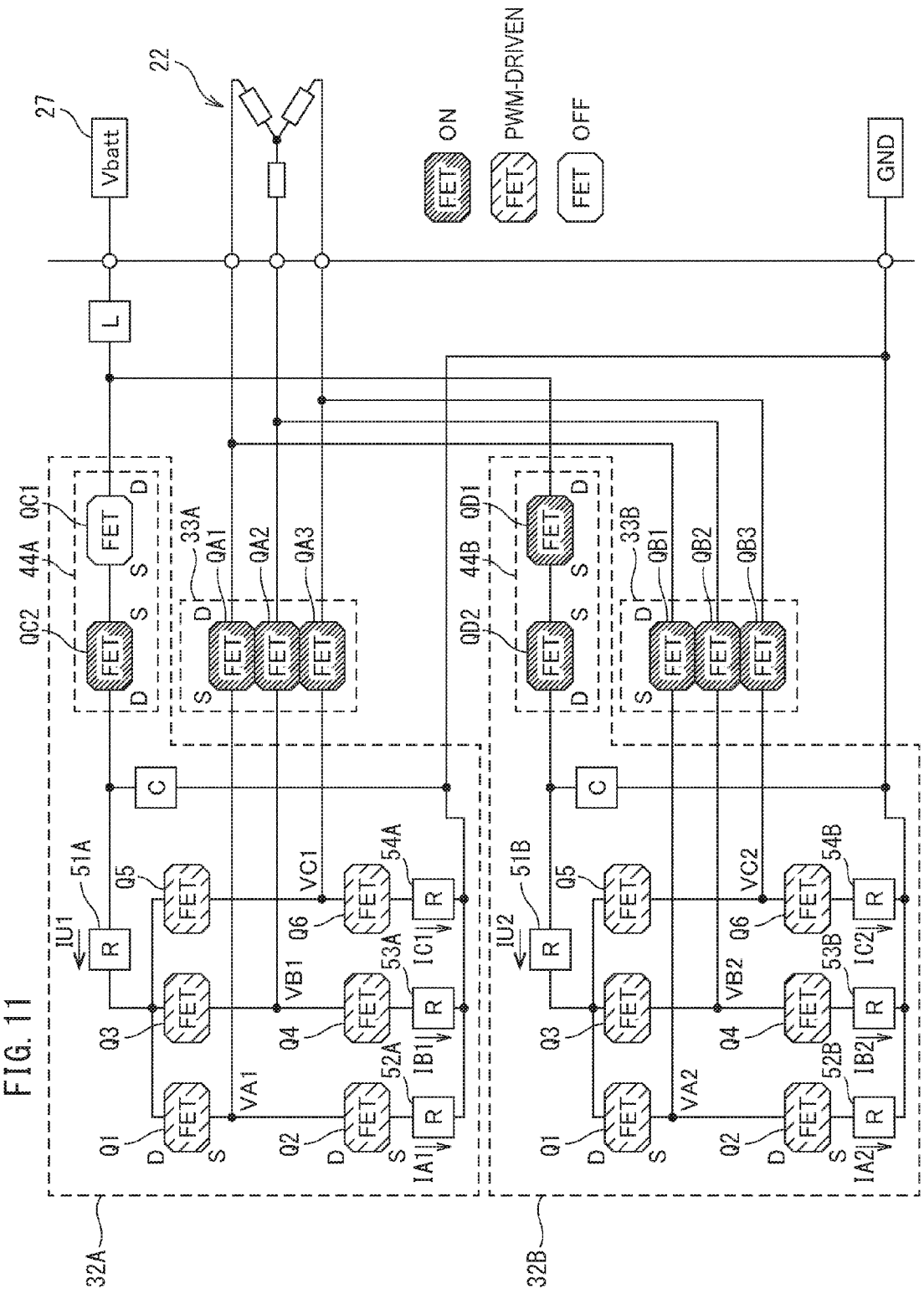

FIG. 28A
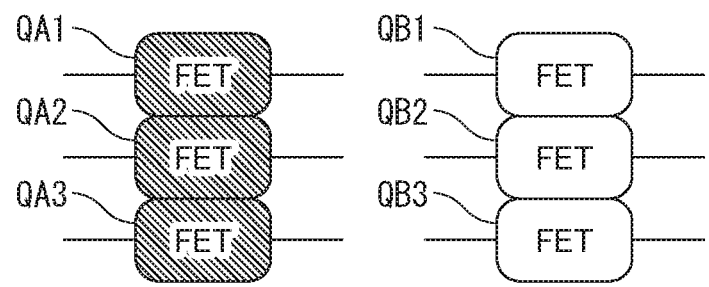
FIG. 28B
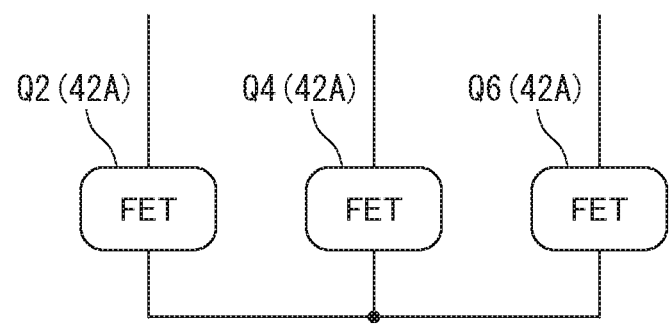
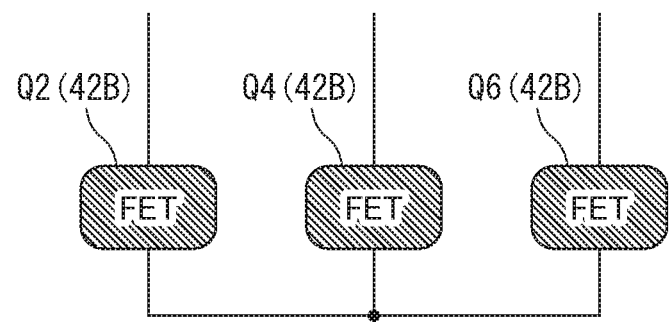

MOTOR CONTROL DEVICE, ELECTRIC POWER STEERING DEVICE USING SAME, AND VEHICLE

TECHNICAL FIELD

The present invention relates to a motor control device that controls driving of a multi-phase electric motor, and to an electric power steering device and a vehicle that use the same.

BACKGROUND ART

It is desired that a motor control device controlling driving of an electric motor of an electric power steering device or an electric motor of an electric braking device mounted in a vehicle, a traveling electric motor of an electric vehicle or a hybrid vehicle, or the like can continue to drive the electric motor even when something abnormal occurs in a motor control system.

In order to meet the desire, an electric power steering device has been proposed that has a configuration in which along with a duplex inverter for supplying a motor driving current to a multi-phase electric motor, a power source relay is provided between a power source and each inverter, and a motor relay is provided between each inverter and a motor winding of each phase of the multi-phase electric motor (for example, see PTL 1).

When something abnormal occurs in switching means of one or more inverter units, the electric power steering device causes the power source relay and the motor relay to perform a blocking operation to block energization between the abnormal inverter and the power source and energization between the inverter and the multi-phase electric motor.

In addition, during normal control for assisting steering of a steering wheel, the electric power steering device causes the power source relay to block energization between the device and the power source, and monitors a voltage of a wire connecting the power source relay to the motor to check a short-circuit failure of the power source relay.

Additionally, the electric power steering device causes the motor relay to block energization between the device and the motor during the normal control for assisting the steering of the steering wheel, and monitors a voltage of a wire connecting the motor relay to the motor to check a short-circuit failure of the motor relay.

CITATION LIST

Patent Literature

PTL 1: JP 2013-79027 A

SUMMARY OF INVENTION

Technical Problems

Meanwhile, in the conventional example described in PTL 1 described above, the checking of the power source relay and the motor relay uses the voltages of the wire connecting the power source relay to the motor and the wire connecting the motor relay to the motor. Additionally, capacitors for power supply assistance and removal of noise (such as ripples) are provided on an inverter-side from a power source relay-side.

Accordingly, in the above conventional example, even when the power source relay is put into a blocked state during the normal control, charging voltages of the capacitors allow maintaining of the voltage of the wire connecting the power source relay to the motor. Thus, depending on the charge state of the capacitors, there is a problem in that it is difficult to detect a short-circuit failure of the power source relay by voltage monitoring.

Additionally, in the above conventional example, the checking of the motor relay uses the voltage of the wire connecting the motor relay to the motor. However, the voltage of the wire fluctuates in response to PWM driving of the inverter regardless of the presence or absence of a short-circuit failure. Thus, depending on the driving state of the inverter, there is a problem in that it is difficult to detect a short-circuit failure of the motor relay.

Accordingly, the present invention has been accomplished in view of the unsolved problems of the conventional example. It is an object of the present invention to provide a motor control device capable of more surely detecting a short-circuit failure of at least one of a motor current blocking unit and a power source blocking unit regardless of the driving state of a motor driving circuit and the like, an electric power steering device, and a vehicle that use the motor control device.

Solution to Problems

In order to achieve the object mentioned above, according to an aspect of the present invention, there is provided a motor control device comprising: a plurality of motor driving circuits configured to operate by receiving a power source supplied from a common power source system and supply multi-phase motor driving currents to multi-phase motor windings of a multi-phase electric motor; a control computing device configured to control driving of the plurality of motor driving circuits; a plurality of multi-phase motor current blocking units individually interposed between the plurality of motor driving circuits and the multi-phase motor windings and configured to individually block energization between the plurality of motor driving circuits and the multi-phase motor windings in blocking operation; a plurality of current detecting units configured to individually detect currents flowing to the plurality of motor driving circuits; and a first abnormality detecting unit configured to detect a short-circuit failure of the plurality of motor current blocking units on a basis of current values of the currents detected by the plurality of current detecting units.

The first abnormality detecting unit causes one or more motor current blocking units of the plurality of motor current blocking units to perform the blocking operation during energization between the plurality of motor driving circuits and the multi-phase electric motor, and, during the blocking operation, detects a short-circuit failure of the motor current blocking units caused to perform the blocking operation based on the current values of the currents detected by the plurality of current detecting units.

In addition, an aspect of an electric power steering device according to the present invention applies the above-described motor control device to a motor control device that includes an electric motor causing a steering mechanism to generate a steering assisting force.

Furthermore, an aspect of a vehicle according to the present invention includes the above-described motor control device.

Advantageous Effects of Invention

According to the present invention, the motor driving circuit for supplying a motor current to the multi-phase electric motor is multiplexed, and the motor current blocking units are individually interposed between each of the multiplexed motor driving circuits and the motor winding of each phase. In addition, during energization to the multiphase electric motor, one or more of the plurality of motor current blocking units are caused to perform a blocking operation, and currents flowing to the plurality of motor driving circuits at that time are detected. Then, based on current values of the detected currents, a short-circuit failure of the one or more motor current blocking units caused to perform the blocking operation is detected. Thus, a short-circuit failure of the motor current blocking units can be more surely detected regardless of the driving states of the motor driving circuits.

In addition, the electric power steering device is configured by including the motor control device having the advantageous effect described above. Thus, even while the motor driving circuits are being driven, a short-circuit failure of the motor current blocking units can be more surely detected. Thus, before any more serious problem occurs, electrical block of one or more motor driving circuits in which a failure has been detected or a notification or the like of the occurrence of the short-circuit failure thereof can be performed. Accordingly, an electric power steering device having a relatively high reliability can be provided.

Furthermore, since the vehicle is configured by including the motor control device having the advantageous effect, a short-circuit failure of the motor current blocking units can be more surely detected even while the motor driving circuits are being driven. Thus, before any more serious problem occurs, electrical block of one or more motor driving circuits in which a failure has been detected or a notification or the like of the occurrence of the short-circuit failure thereof can be performed. Accordingly, a vehicle having a relatively high reliability can be provided.

BRIEF DESCRIPTION OF DRAWINGS

FIG. 6 is a characteristic curve chart depicting a relationship between steering torque and steering assisting current command value;

FIG. 7A and FIG. 7B are block diagrams depicting a specific configuration of current detecting circuits of FIG. 4;

FIG. 11 is a diagram depicting one example of a power source-side current check blocking operation pattern;

FIG. 28A and FIG. 28B are diagrams depicting other examples of the motor-side voltage check blocking operation pattern;

DESCRIPTION OF EMBODIMENTS (Configuration)

Figure 1:
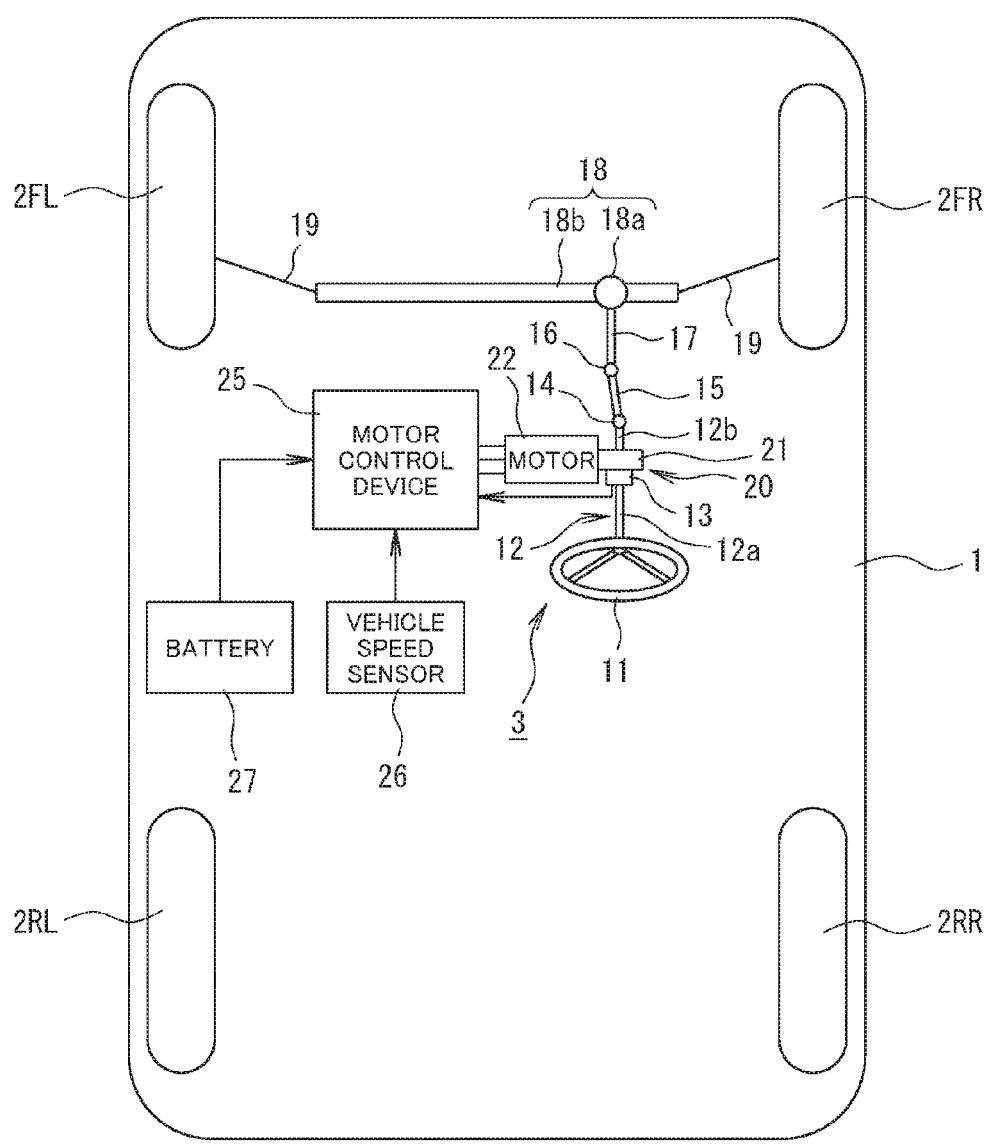
FIG. 1 is an entire structural view depicting an embodiment in which a motor control device of the present invention is applied to an electric power steering device mounted in a vehicle.

A vehicle 1 according to an embodiment of the present invention includes front wheels 2FR and 2FL serving as right and left steered wheels and rear wheels 2RR and 2RL, as depicted in FIG. 1. The front wheels 2FR and 2FL are steered by an electric power steering device 3.

The electric power steering device 3 includes a steering wheel 11, a steering shaft 12, a steering torque sensor 13, a first universal joint 14, a lower shaft 15, and a second universal joint 16, as depicted in FIG. 1.

The electric power steering device 3 further includes a pinion shaft 17 and a steering gear 18.

A steering force applied to the steering wheel 11 by a driver is transmitted to the steering shaft 12. The steering shaft 12 includes an input shaft 12a and an output shaft 12b. One end of the input shaft 12a is connected to the steering wheel 11 and the other end thereof is connected to one end of the output shaft 12b via the steering torque sensor 13.

Then, the steering force transmitted to the output shaft 12b is transmitted to the lower shaft 15 via the first universal joint 14 and furthermore transmitted to the pinion shaft 17 via the second universal joint 16. The steering force transmitted to the pinion shaft 17 is transmitted to a tie rod 19 via the steering gear 18 to steer the front wheels 2FR and 2FL as the steered wheels. Herein, the steering gear 18 is formed in a rack and pinion form having a pinion 18a connected to the pinion shaft 17 and a rack 18b engaged with the pinion 18a. Accordingly, the steering gear 18 converts a rotational movement transmitted to the pinion 18a to a translatory movement in a vehicle width direction at the rack 18b.

A steering assisting mechanism 20 that transmits a steering assisting force to the output shaft 12b is connected to the output shaft 12b of the steering shaft 12. The steering assisting mechanism 20 includes a deceleration gear 21 connected to the output shaft 12b formed by, for example, a worm gear mechanism, and a three-phase electric motor 22 as a multi-phase electric motor formed by, for example, a three-phase brushless motor, which is connected to the deceleration gear 21 and generates the steering assisting force.

The steering torque sensor 13 detects a steering torque applied to the steering wheel 11 and transmitted to the input shaft 12a. The steering torque sensor 13 is configured to, for example, convert the steering torque into a twist angular displacement of an unillustrated torsion bar interposed between the input shaft 12a and the output shaft 12b and convert the twist angular displacement into a resistance change or a magnetic change to detect.

Figure 2:
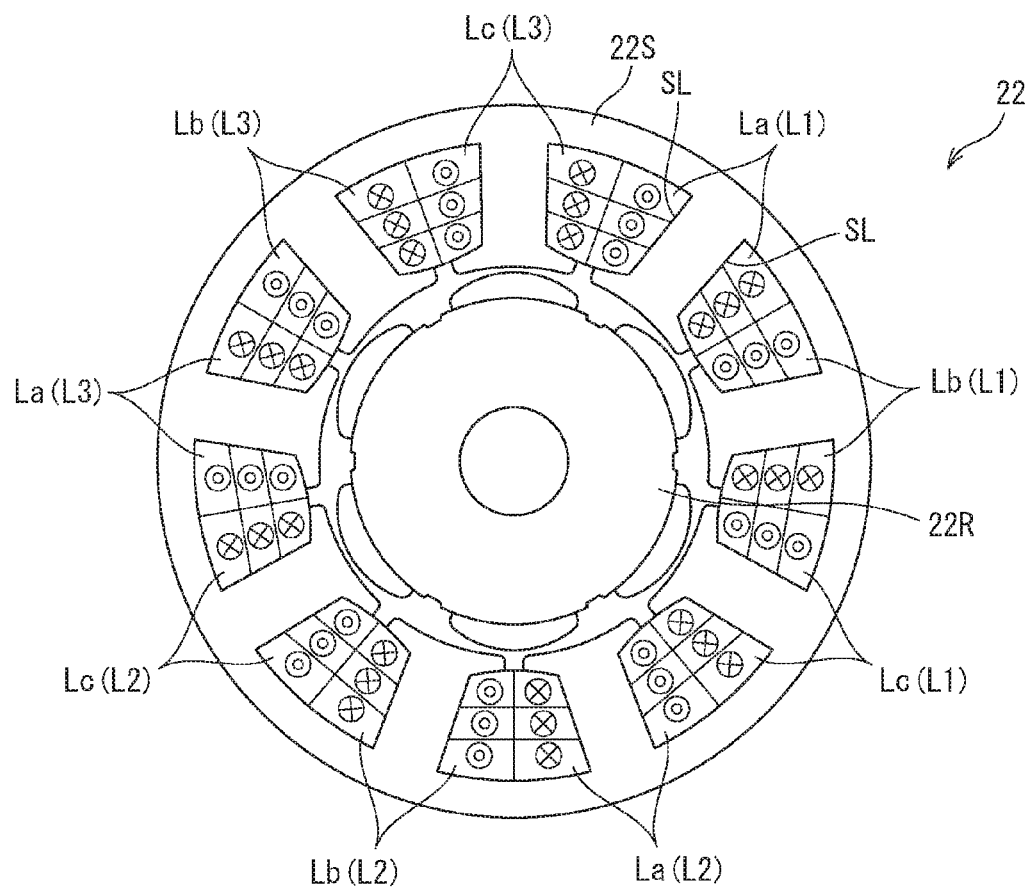
FIG. 2 is a sectional view depicting the configuration of a three-phase electric motor.

In addition, as depicted in FIG. 2, the three-phase electric motor 22 has a configuration of a surface permanent magnet (SPM) motor that includes a stator 22S having, for example, nine teeth T formed protrudingly inward on an inner peripheral surface of the stator to form slots SL and serving as magnetic poles and a rotor 22R of a surface permanent magnet type with, for example, six poles that is rotatably arranged facing the teeth T in an inner peripheral side of the stator 22S.

Figure 3:
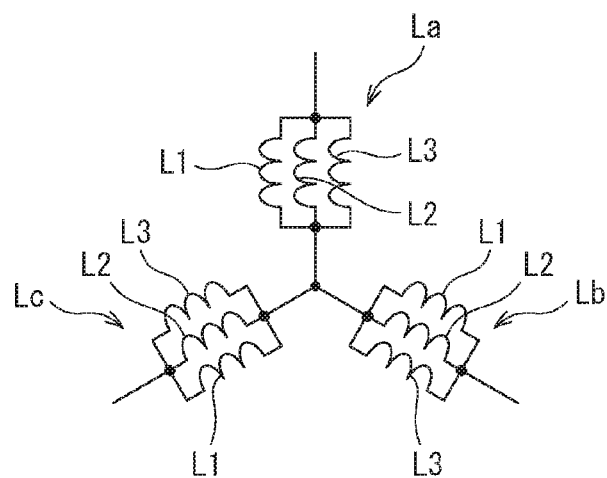
FIG. 3 is a schematic diagram depicting the structure of windings in the three-phase electric motor of FIG. 2.

Then, multi-phase motor windings La, Lb, and Lc of A phase, B phase, and C phase forming three phases are wound on the slots SL of the stator 22S. Each of the multi-phase motor windings La, Lb, and Lc has a configuration, as depicted in FIG. 3, in which, for example, three coil portions L1, L2, and L3 are connected in parallel, and the coil portions L1 to L3 are wound into three layers on the slots SL. One ends of the multi-phase motor windings La, Lb, and Lc are connected to each other to be star-connected, and other ends thereof are connected to a motor control device 25 to individually supply an A-phase motor driving current Ia, a B-phase motor driving current Ib, and a C-phase motor driving current Ic. Hereinafter, current values of the A-phase motor driving current Ia, the B-phase motor driving current Ib, and the C-phase motor driving current Ic may be referred to as "A-phase motor driving current value Ia, B-phase motor driving current value Ib, and C-phase motor driving current value Ic". In addition, the A-phase, B-phase, and C-phase motor driving current values Ia, Ib, and Ic may be referred to as "three-phase motor driving current values Ia, Ib, and Ic", and the A-phase, B-phase, and C-phase motor driving currents Ia, Ib, and Ic may be referred to as "three-phase motor driving currents Ia, Ib, and Ic".

Figure 4:
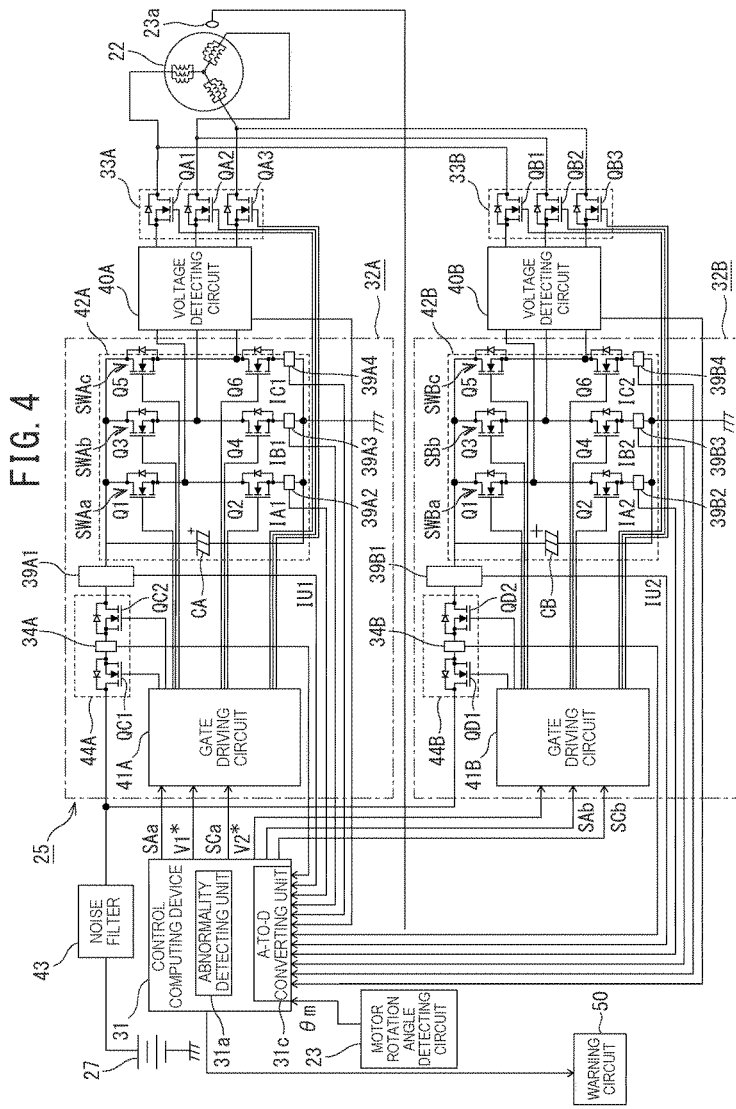
FIG. 4 is a circuit diagram depicting a specific configuration of the motor control device.

Furthermore, as depicted in FIG. 4, the three-phase electric motor 22 includes a rotation position sensor 23a, such as a resolver, that detects a rotation position of the motor. A detection value from the rotation position sensor 23a is supplied to a motor rotation angle detecting circuit 23, and the motor rotation angle detecting circuit 23 detects a motor rotation angle $\theta m$.

A steering torque Ts detected by the steering torque sensor 13 and a vehicle speed Vs detected by a vehicle speed sensor 26 are input to the motor control device 25, and also, the motor rotation angle $\theta m$ output from the motor rotation angle detecting circuit 23 is input thereto.

In addition, a direct current is input to the motor control device 25 from a battery 27 as a direct current voltage source.

A specific configuration of the motor control device 25 is formed as depicted in FIG. 4. Specifically, the motor control device 25 includes a control computing device 31 that computes a motor voltage command value, first and second motor driving circuits 32A and 32B to which three-phase motor voltage command values V1* and V2* output from the control computing device 31 are individually input, and first and second motor current blocking circuits 33A and 33B interposed between output sides of the first and second motor driving circuits 32A and 32B and the multi-phase motor windings La to Lc of the three-phase electric motor 22.

Additionally, as depicted in FIG. 4, the motor control device 25 includes motor voltage detecting circuits 40A and 40B provided between the first and second motor driving circuits 32A and 32B and the first and second motor current blocking circuits 33A and 33B.

Then, as depicted in FIG. 4, respective motor phase voltage detection values VA1, VB1, VC1, VA2, VB2, and VC2 detected by the motor voltage detecting circuits 40A and 40B are input to the control computing device 31.

Furthermore, as depicted in FIG. 4, upstream-side current detection values IU1 and IU2 output from current detecting circuits 39A1 and 39B1 are input to the control computing device 31. In addition, downstream-side current detection values IA1, IB1, and IC1 output from current detecting circuits 39A2 to 39A4 and downstream-side current detection values IA2, IB2, and IC2 output from current detecting circuits 39B2 to 39B4 are input to the control computing device 31.

The steering torque Ts detected by the steering torque sensor 13 and the vehicle speed Vs detected by the vehicle speed sensor 26 depicted in FIG. 1 are input to the control computing device 31, although illustration thereof is omitted in FIG. 4. In addition, as depicted in FIG. 4, the motor rotation angel $\theta m$ output from the motor rotation angle detecting circuit 23 is input to the control computing device 31.

Figure 5:
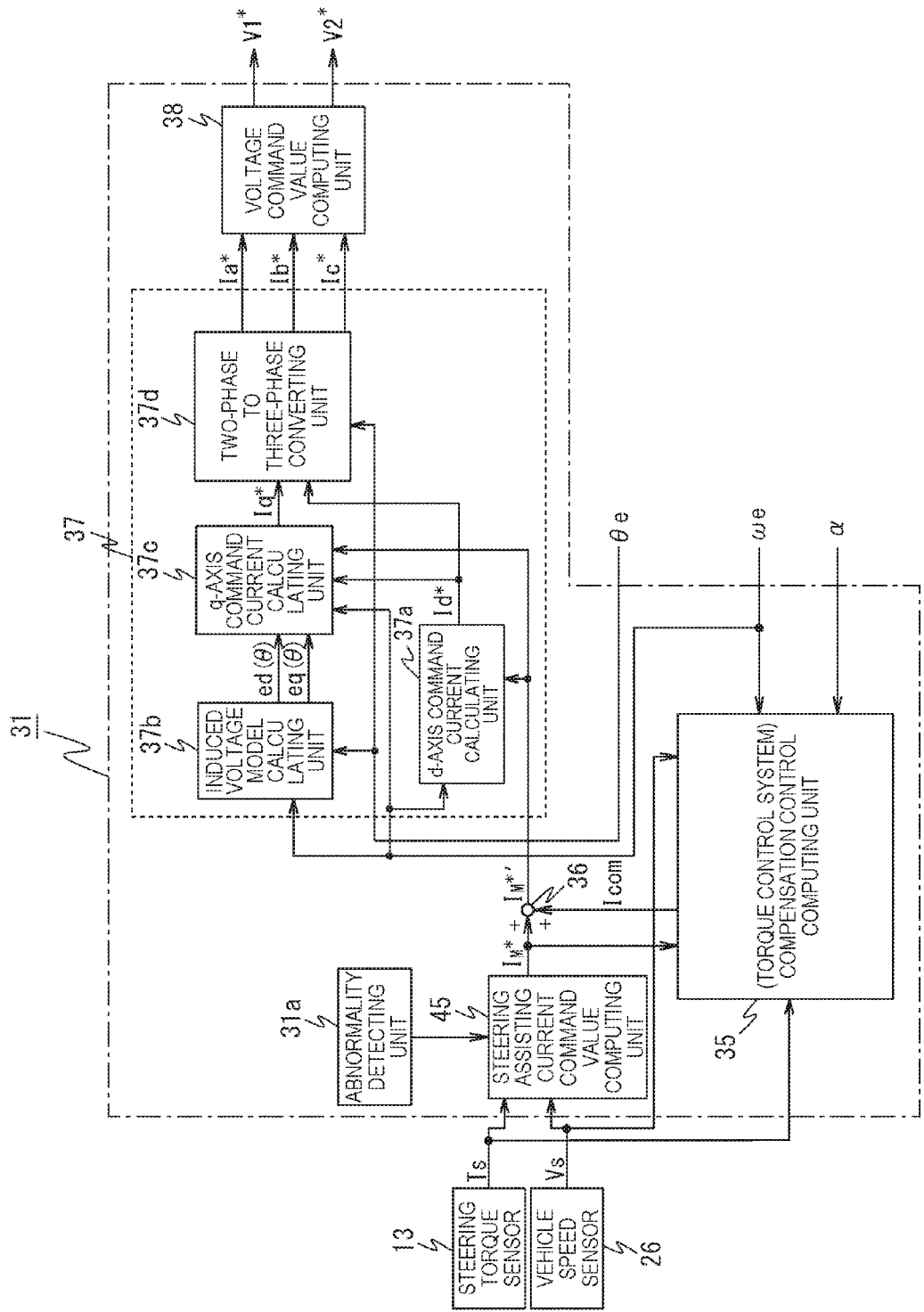
FIG. 5 is a block diagram depicting a specific configuration of a control computing device of FIG. 4.

As depicted in FIG. 5, the control computing device 31 includes a steering assisting current command value computing unit 45 that calculates a steering assisting current command value I* and a compensation control computing unit 35 that performs compensation on the basis of a motor angular velocity $\omega e$ and a motor angular acceleration $\alpha$ input thereto on the steering assisting current command value I* calculated by the steering assisting current command value computing unit 45. Furthermore, the control computing device 31 includes a d-q axis current command value computing unit 37 that calculates d-q axis current command values on the basis of the post-compensation steering assisting current command value I*' compensated by the compensation control computing unit 35 and converts the calculated current command values to three-phase current command values.

The steering assisting current command value computing unit 45 refers to a steering assisting current command value calculation map depicted in FIG. 6 on the basis of the steering torque Ts and the vehicle speed Vs to calculate a steering assisting current command value I* made of a current command value. The steering assisting current command value calculation map is formed by a characteristic curve chart indicated by a parabolic curve, whose horizontal axis represents steering torque Ts and whose vertical axis represents steering assisting current command value I*, as depicted in the drawing.

Then, the steering assisting current command value I* is calculated by referring to a current command value calculation curve depicted in FIG. 6 previously set on the basis of the steering torque Ts and the vehicle speed Vs.

The compensation control computing unit 35 calculates, for example, a convergence compensation value for compensating for the convergence of a yaw rate on the basis of the motor angular velocity ωe and a torque compensation value for compensating for a value corresponding to a torque generated by inertia of the three-phase electric motor 22 on the basis of the motor angular acceleration α to prevent deterioration of inertial sensing or control responsiveness. In addition, the compensation control computing unit 35 estimates a self-aligning torque (SAT) and, on the basis of the estimated SAT, calculates a self-aligning torque compensation value for compensating for an assisting force of the three-phase electric motor 22. Furthermore, the compensation control computing unit 35 calculates a command value compensation value Icom by adding together the calculated convergence compensation value, torque compensation value, and self-aligning torque compensation value. Then, the compensation control computing unit 35 adds the calculated command value compensation value Icom to the steering assisting current command value I* output from the steering assisting current command value computing unit 45 by an adder 36 to calculate a post-compensation steering assisting current command value I*'. The compensation control computing unit 35 outputs the post-compensation steering assisting current command value I*' to the d-q axis current command value computing unit 37.

The d-q axis current command value computing unit 37 includes a d-axis target current calculating unit 37a, an induced voltage model calculating unit 37b, a q-axis target current calculating unit 37c, and a two-phase to three-phase converting unit 37d.

The d-axis target current calculating unit 37a calculates a d-axis target current Id* on the basis of the post-compensation steering assisting current command value I*' and the motor angular velocity ω.

The induced voltage model calculating unit 37b calculates a d-axis EMF component ed (θ) and a q-axis EMF component eq (θ) of a d-q axis induced voltage model EMF (Electro Magnetic Force) on the basis of a motor rotation angle θ and the motor angular velocity ω.

The q-axis target current calculating unit 37c calculates a q-axis target current Iq* on the basis of the d-axis EMF component ed (θ) and the q-axis EMF component eq (θ) output from the induced voltage model calculating unit 37b, the d-axis target current Id* output from the d-axis target current calculating unit 37a, the post-compensation steering assisting current command value I*', and the motor angular velocity ω.

The two-phase to three-phase converting unit 37d coverts the d-axis target current Id* output from the d-axis target current calculating unit 37a and the q-axis target current Iq* output from the q-axis target current calculating unit 37c to three-phase current command values Ia*, Ib*, and Ic*.

In addition, the control computing device 31 includes a voltage command value computing unit 38 that calculates the motor voltage command values V1* and V2* for the first and second motor driving circuits 32A and 32B.

The voltage command value computing unit 38 calculates the motor voltage command values V1* and V2* on the basis of the A-phase current command value Ia*, the B-phase current command value Ib*, the C-phase current command value Ic*, and the downstream-side current detection values IA1 to IC1 and IA2 to IC2 detected by the current detecting circuits 39A2 to 39A4 and 39B2 to 39B4. Specifically, the voltage command value computing unit 38 calculates the three-phase motor driving current values Ia, Ib, and Ic from the downstream-side current detection values IA1 to IC1 and IA2 to IC2 detected by the current detecting circuits 39A2 to 39A4 and 39B2 to 39B4 by computation including addition of the values. Then, the voltage command value computing unit 38 subtracts the three-phase motor driving current values Ia, Ib, and Ic from the A-phase current command value Ia*, the B-phase current command value Ib*, and the C-phase current command value Ic* to calculate current deviations ΔIa, ΔIb, and ΔIc. Furthermore, based on these current deviations ΔIa, ΔIb, and ΔIc, for example, PI control computation or PID control computation is performed to calculate the three-phase motor voltage command values V1* and V2* for the first and second motor driving circuits 32A and 32B. Then, the calculated three-phase motor voltage command values V1* and V2* are output to the first and second motor driving circuits 32A and 32B. Herein, the three-phase motor voltage command values V1* and V2* are output as the same value to each other in a normal state in which there is no abnormality detected by an abnormality detecting unit 31a that will be described later. In other words, the first and second motor driving circuits 32A and 32B are adapted to be usually responsible for 50[%] for each to share an amount of electric current necessary for steering assistance.

Additionally, the respective motor phase voltage detection values VA1, VB1, VC1, VA2, VB2, and VC2, the respective upstream-side current detection values IU1 and IU2, and the downstream-side current detection values IA1, IB1, IC1, IA2, IB2, and IC2 are input to the control computing device 31 via an A-to-D converting unit 31c.

Then, the control computing device 31 includes the abnormality detecting unit 31a that detects abnormality (such as a failure) occurring in electric field effective transistors (hereinafter abbreviated as "FETs") forming each component unit of the first and second motor driving circuits 32A and 32B on the basis of the respective input voltage detection values and current detection values.

Specifically, the abnormality detecting unit 31a detects an open-circuit failure and a short-circuit failure of FETs Q1 to Q6 as switching elements that form first and second inverter circuits 42A and 42B that will be described later.

Furthermore, the abnormality detecting unit 31a detects a short-circuit failure of current blocking FETs QC1 to QC2 and QD1 to QD2 that form first and second power source blocking circuits 44A and 44B that will be described later.

Still furthermore, the abnormality detecting unit 31a detects a short-circuit failure of current blocking FETs QA1 to QA3 and QB1 to QB3 that form the first and second motor current blocking circuits 33A and 33B that will be described later.

The abnormality detecting unit 31a outputs an abnormality detection signal SAa or SAb of a logical value "1" to the first or second motor driving circuit 32A or 32B in which an open-circuit failure or a short-circuit failure is occurring. On the other hand, when neither an open-circuit failure nor a short-circuit failure is not detected, the abnormality detecting unit 31a outputs abnormality detection signals SAa and SAb of a logical value "0" to the first and second motor driving circuit 32A and 32B.

Additionally, when detecting a short-circuit failure of the first and second power source blocking circuits 44A and 44B and the first and second motor current blocking circuits 33A and 33B, the abnormality detecting unit 31a performs a blocking operation for each FET of the first and second motor driving circuits 32A and 32B in a previously set blocking operation pattern. Specifically, the abnormality detecting unit 31a outputs blocking operation pattern signals SCa and SCb corresponding to various blocking operation patterns to first and second gate driving circuits 41A and 41B that will be described later. The blocking operation pattern signals SCa and SCb are, for example, 4-bit digital signals having a bit pattern corresponding to, for example, a previously set blocking operation pattern.

Additionally, the present embodiment is configured so that, when detecting a short-circuit failure of the first and second motor current blocking circuits 33A and 33B, an optional check mode can be set from among previously set three kinds of check modes by operation of an unillustrated operation unit by a user.

The abnormality detecting unit 31a detects a short-circuit failure of the first and second motor current blocking circuits 33A and 33B by a blocking operation pattern and a checking method corresponding to the set check mode. In addition, details of the check modes will be described later.

As depicted in FIG. 4, the first motor driving circuit 32A includes the first gate driving circuit 41A to which the three-phase motor voltage command value V1* output from the control computing device 31 is input to form a gate signal and the first inverter circuit 42A to which the gate signal output from the first gate driving circuit 41A is input.

Furthermore, the first motor driving circuit 32A includes a VR voltage detecting circuit 34A that is provided between a FET QC1 and a FET QC2 of the first power source blocking circuit 44A that will be described later, and that detects a voltage of a connection line of the FETs QC1 and QC2.

Still furthermore, the first motor driving circuit 32A includes the current detecting circuit 39A1 that detects a direct current supplied to the first inverter circuit 42A and the current detecting circuits 39A2 to 39A4 that detect direct currents flowing from lower arms of the first inverter circuit 42A to ground.

In addition, the second motor driving circuit 32B includes the second gate driving circuit 41B to which the three-phase motor voltage command value V2* output from the control computing device 31 is input to form a gate signal and the second inverter circuit 42B to which the gate signal output from the second gate driving circuit 41B is input.

Furthermore, the second motor driving circuit 32B includes a VR voltage detecting circuit 34B that is provided between a FET QD1 and a FET QD2 of the second power source blocking circuit 44B that will be described later, and that detects a voltage of a connection line of the FETs QD1 and QD2.

Still furthermore, the second motor driving circuit 32B includes the current detecting circuit 39B1 that detects a direct current supplied to the second inverter circuit 42B and the current detecting circuits 39B2 to 39B4 that detect direct currents flowing from lower arms of the second inverter circuit 42B to ground.

When the motor voltage command value V1* is input from the control computing device 31, the first gate driving circuit 41A forms six gate signals subjected to pulse width modulation (PWM) based on the motor voltage command value V1* and a triangular wave carrier signal Sc. Then, the gate signals are output to the first inverter circuit 42A.

Additionally, when the motor voltage command value V2* is input from the control computing device 31, the second gate driving circuit 41B forms six gate signals subjected to pulse width modulation (PWM) based on the motor voltage command value V2* and the triangular wave carrier signal Sc. Then, the gate signals are output to the second inverter circuit 42B.

In addition, the control computing device 31 may be configured to generate the six PWM gate signals in common and to input to the first and second inverter circuits 42A and 42B.

Additionally, when the abnormality detection signal SAa input from the control computing device 31 has the logical value "0" (normal), the first gate driving circuit 41A outputs three high-level gate signals to the first motor current blocking circuit 33A and simultaneously outputs two high-level gate signals to the first power source blocking circuit 44A. Thereby, motor current is allowed to flow through the first inverter circuit 42A, and also battery power is allowed to flow therethrough.

On the other hand, when the abnormality detection signal SAa input from the control computing device 31 has the logical value "1" (abnormal), the first gate driving circuit 41A simultaneously outputs three low-level gate signals to the first motor current blocking circuit 33A and simultaneously outputs two low-level gate signals to the first power source blocking circuit 44A. In addition, the first gate driving circuit 41A simultaneously outputs six low-level gate signals to the first inverter circuit 42A to block motor current and also block battery power.

Similarly, when the abnormality detection signal SAb input from the control computing device 31 has the logical value "0" (normal), the second gate driving circuit 41B outputs three high-level gate signals to the second motor current blocking circuit 33B and simultaneously outputs two high-level gate signals to the second power source blocking circuit 44B. Thereby, motor current is allowed to flow through the second inverter circuit 42B, and also battery power is allowed to flow therethrough.

On the other hand, when the abnormality detection signal SAb input from the control computing device 31 has the logical value "1" (abnormal), the second gate driving circuit 41B simultaneously outputs three low-level gate signals to the second motor current blocking circuit 33B and outputs a low-level gate signal to the second power source blocking circuit 44B. In addition, the second gate driving circuit 41B simultaneously outputs six low-level gate signals to the second inverter circuit 42B to block motor current and also block battery power.

Still furthermore, the first gate driving circuit 41A simultaneously outputs two gate signals to the first power source blocking circuit 44A, i.e., a low-level gate signal to a FET as a blocking object and a high-level gate signal to a FET as an energizing object on the basis of a blocking operation pattern indicated by the bit pattern of the blocking operation pattern signal SCa input from the control computing device 31. In addition, the first gate driving circuit 41A simultaneously outputs six gate signals to the respective FETs of the first inverter circuit 42A, i.e., a low-level gate signal to a FET as a blocking object and a high-level gate signal to a FET as an energizing object. Furthermore, the first gate driving circuit 41A simultaneously outputs three gate signals to the first motor current blocking circuit 33A, i.e., a low-level gate signal to a FET as a blocking object and a high-level gate signal to a FET as an energizing object.

On the other hand, the second gate driving circuit 41B simultaneously outputs two gate signals to the second power source blocking circuit 44B, i.e., a low-level gate signal to a FET as a blocking object and a high-level gate signal to a FET as an energizing object on the basis of a blocking operation pattern indicated by the bit pattern of the blocking operation pattern signal SCb input from the control computing device 31. In addition, the second gate driving circuit 41B simultaneously outputs six gate signals to the respective FETs of the second inverter circuit 42B, i.e., a low-level gate signal to a FET as a blocking object and a high-level gate signal to a FET as an energizing object. Furthermore, the second gate driving circuit 41B simultaneously outputs three gate signals to the second motor current blocking circuit 33B i.e., a low-level gate signal to a FET as a blocking object and a high-level gate signal to a FET as an energizing object.

The battery current of the battery 27 is input to the first inverter circuit 42A via a noise filter 43, the first power source blocking circuit 44A, and the current detecting circuit 39A1, and a smoothing electrolytic capacitor CA is connected to an input side thereof. The electrolytic capacitor CA includes a noise removing function and an electric power supply assisting function for the first inverter circuit 42A.

The first inverter circuit 42A includes six FETs Q1 to Q6 as switching elements and has a configuration in which three switching arms SWAa, SWAb, and SWAc each having each two of the FETs connected in series are connected in parallel. Then, the gate signals output from the first gate driving circuit 41A are input to gates of the respective FETs Q1 to Q6. The input allows the A-phase motor driving current Ia, the B-phase motor driving current Ib, and the C-phase motor driving current Ic to flow to the three-phase motor windings La, Lb, and Lc of the three-phase electric motor 22 from connection points between the FETs of the respective switching arms SWAa, SWAb, and SWAc via the first motor current blocking circuit 33A.

Additionally, the battery current of the battery 27 is input to the second inverter circuit 42B via the noise filter 43, the second power source blocking circuit 44B, and the current detecting circuit 39B1, and a smoothing electrolytic capacitor CB is connected to an input side thereof. The electrolytic capacitor CB includes a noise removing function and an electric power supply assisting function for the second inverter circuit 42B.

The second inverter circuit 42B includes six FETs Q1 to Q6 as switching elements and has a configuration in which three switching arms SWBa, SWBb, and SWBc each having each two of the FETs connected in series are connected in parallel. Then, the gate signals output from the second gate driving circuit 41B are input to gates of the respective FETs Q1 to Q6. The input allows the A-phase motor driving current Ia, the B-phase motor driving current Ib, and the C-phase motor driving current Ic to flow to the three-phase motor windings La, Lb, and Lc of the three-phase electric motor 22 from connection points between the FETs of the respective switching arms SWBa, SWBb, and SWBc via the second motor current blocking circuit 33B.

In addition, in the respective switching arms SWAa, SWAb, SWAc, SWBa, SWBb, and SWBc of the first and second inverter circuits 42A and 42B, the current detecting circuits 39A2 to 39A4 and 39B2 to 39B4 are connected to respective source sides of the FETs Q2, Q4, and Q6 that serve as the lower arms. Ends of the current detecting circuits 39A2 to 39A4 and 39B2 to 39B4 opposing the sides thereof facing the FETs Q2, Q4, and Q6 are grounded. Then, the current detecting circuits 39A2 to 39A4 and 39B2 to 39B4 detect downstream-side current detection signals (analog signals corresponding to the downstream-side current detection values IA1 to IC1 and IA2 to IC2). Hereinafter, the analog signals corresponding to the downstream-side current detection values IA1 to IC1 and IA2 to IC2 may be referred to as "downstream-side current detection signals IA1 to IC1 and IA2 to IC2".

The current detecting circuits 39A1 and 39B1 include current detecting shunt resistances 51A and 51B interposed between power source-sides of the respective switching arms SWAa to SWAc and SWBa to SWBc and the first and second power source blocking circuits 44A and 44B, as depicted in FIG. 7A. Each of the current detecting circuits 39A1 and 39B1 includes an operational amplifier 39a to which both-end voltages of the shunt resistances 51A and 51B are input via resistances R2 and R3 and a sample hold circuit 39s that is mainly formed by a noise filter and to which an output signal of the operational amplifier 39a is supplied, as depicted in FIG. 7A.

Then, upstream-side current detection signals output from the sample hold circuit (analog signals corresponding to the upstream-side current detection signals IU1 and IU2) are supplied to the A-to-D converting unit 31c of the control computing device 31.

Similarly, the current detecting circuits 39A2 to 39A4 include current detecting shunt resistances 52A, 53A, and 54A interposed between grounded-sides of the respective switching arms SWAa to SWAc and the ground, as depicted in FIG. 7B. Each of the current detecting circuits 39A2 to 39A4 includes an operational amplifier 39a to which respective both-end voltages of the shunt resistances 52A, 53A, and 54A are input via resistances R2 and R3 and a sample hold circuit 39s that is mainly formed by a noise filter and to which an output signal of the operational amplifier 39a is supplied, as depicted in FIG. 7B.

In addition, the current detecting circuits 39B2 to 39B4 include current detecting shunt resistances 52B, 53B, and 54B interposed between grounded-sides of the respective switching arms SWBa to SWBc and the ground, as depicted in FIG. 7B. Each of the current detecting circuits 39B2 to 39B4 includes an operational amplifier 39a to which respective both-end voltages of the shunt resistances 52B, 53B, and 54B are input via resistances R2 and R3 and a sample hold circuit 39s that is mainly formed by a noise filter and to which an output signal of the operational amplifier 39a is supplied, as depicted in FIG. 7B.

Then, the downstream-side current detection signals IA1 to IC1 and IA2 to IC2 output from the sample hold circuit 39s are supplied to the A-to-D converting unit 31c of the control computing device 31.

Figure 8:
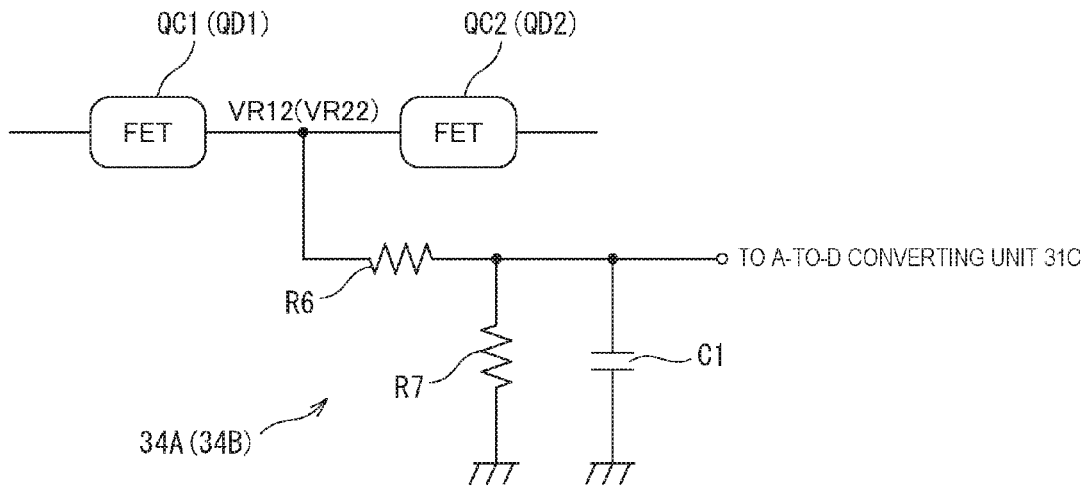
FIG. 8 is a circuit diagram depicting a specific configuration of VR voltage detecting circuits of FIG. 4.

Each of the VR voltage detecting circuits 34A and 34B includes a resistance R6, a resistance R7, and a capacitor C1, as depicted in FIG. 8.

In the VR voltage detecting circuit 34A, one end of the resistance R6 is connected to a connection line (a voltage monitoring line) of the FETs QC1 and QC2, and an other end thereof is connected to one end of the resistance R7 and one end of the capacitor C1. Furthermore, the one end of the resistance R7 is connected to the one end of the capacitor C1, and an other end of the resistance R7 and an other end of the capacitor C1 are grounded. Then, when the FET QC1 or QC2 is being energized (in an ON state), current flows to the capacitor C1 from the battery 27 or the electrolytic capacitor CA via the resistance R6, and a voltage VR12 (≈battery voltage Vbat [V]) applied to both ends of the capacitor C1 is supplied to the A-to-D converting unit 31c of the control computing device 31. On the other hand, when the FET QC1 or QC2 is not being energized (in an OFF state), the resistance R7 becomes a pulldown resistance and the voltage VR12 becomes ground potential (≈0 [V]).

In addition, in the VR voltage detecting circuit 34B, one end of the resistance R6 is connected to a connection line (a voltage monitoring line) of the FETs QD1 and QD2. Other connection configuration is the same as that of the VR voltage detecting circuit 34A. Then, when the FET QD1 or QD2 is being energized (in an ON state), current flows to the capacitor C1 from the battery 27 or the electrolytic capacitor CB via the resistance R6, and a voltage VR22 (≈Vbat) applied to both ends of the capacitor C1 is supplied to the A-to-D converting unit 31c of the control computing device 31. On the other hand, when the FET QD1 or QD2 is not being energized (in an OFF state), the resistance R7 becomes a pulldown resistance and the voltage VR22 becomes ground potential (≈0 [V]).

In addition, respective element values of the resistances R6 and R7 and the capacitor Clare set to be those serving as time constants that can provide a filtering effect for eliminating voltage fluctuation of the monitoring line due to PWM driving. Additionally, the element value of the capacitor C1 is a smaller value than those of the electrolytic capacitors CA and CB.

The first motor current blocking circuit 33A includes three current blocking FETs QA1, QB2, and QC3. A source of the FET QA1 is connected to a connection point of the FETs Q1 and Q2 of the switching arm SWAa of the first inverter circuit 42A via the motor voltage detecting circuit 40A, and a drain thereof is connected to the A-phase motor winding La of the three-phase electric motor 22. Additionally, a source of the FET QA2 is connected to a connection point of the FETs Q3 and Q4 of the switching arm SWAb of the first inverter circuit 42A via the motor voltage detecting circuit 40A, and a drain thereof is connected to the B-phase motor winding Lb of the three-phase electric motor 22. Furthermore, a source of the FET QA3 is connected to a connection point of the FETs Q5 and Q6 of the switching arm SWAc of the first inverter circuit 42A via the motor voltage detecting circuit 40A, and a drain thereof is connected to the C-phase motor winding Lc of the three-phase electric motor 22.

In addition, the second motor current blocking circuit 33B includes three current blocking FETs QB1, QB2, and QB3. A source of the FET QB1 is connected to a connection point of the FETs Q1 and Q2 of the switching arm SWBa of the second inverter circuit 42B via the motor voltage detecting circuit 40B, and a drain thereof is connected to the A-phase motor winding La of the three-phase electric motor 22. Additionally, a source of the FET QB2 is connected to a connection point of the FETs Q3 and Q4 of the switching arm SWBb of the second inverter circuit 42B via the motor voltage detecting circuit 40B, and a drain thereof is connected to the B-phase motor winding Lb of the three-phase electric motor 22. Furthermore, a source of the FET QB3 is connected to a connection point of the FETs Q5 and Q6 of the switching arm SWBc of the second inverter circuit 42B via the motor voltage detecting circuit 40B, and a drain thereof is connected to the C-phase motor winding Lc of the three-phase electric motor 22.

Then, each of the FETs QA1 to QA3 and QB1 to QB3 of the first and second motor current blocking circuits 33A and 33B is connected in the same direction in such a manner that an anode of a parasitic diode D faces sides where the first and second inverter circuits 42A and 42B are located.

The first power source blocking circuit 44A has a serial circuit configuration in which sources of the two FETs QC1 and QC2 are connected to each other and parasitic diodes thereof are connected in mutually opposite directions. Then, a drain of the FET QC1 is connected to an output side of the noise filter 43, and a drain of the FET QC2 is connected to a drain of each of the FETs Q1, Q3, and Q5 of the first inverter circuit 42A.

In addition, the second power source blocking circuit 44B has a serial circuit configuration in which sources of the two FETs QD1 and QD2 are connected to each other and parasitic diodes thereof are connected in mutually opposite directions. Then, a drain of the FET QD1 is connected to the output side of the noise filter 43, and a drain of the FET QD2 is connected to a drain of each of the FETs Q1, Q3, and Q5 of the second inverter circuit 42B.

(Abnormality Detecting Processing of FETs Q1 to Q6)

The abnormality detecting unit 31a performs abnormality detection of the FETs Q1 to Q6 in the following manner.

Specifically, in a case in which, for example, an open-circuit failure occurs in an A-phase upper arm (Q1) of the first motor driving circuit 32A, when the motor driving current value Ia of the arm having the open-circuit failure occurring therein becomes positive, the upstream-side current detection value IU1 of the first motor driving circuit 32A decreases and the upstream-side current detection value IU2 of the second motor driving circuit 32B increases so as to compensate for the decrease.

Then, by comparing the detected upstream-side current detection values IU1 and IU2, the first or second motor driving circuit 32A or 32B having the open-circuit failure occurring therein can be specified. The abnormality detecting unit 31a outputs the abnormality detection signal SAa or SAb of the logical value "1" to the first or second motor driving circuit 32A or 32B having the open-circuit failure occurring therein.

In addition, in the case in which an open-circuit failure occurs in any of the upper arms, no particular change occurs in a three-phase waveform of the motor driving current, so that steering assisting control can be continued.

In addition, in a case in which, for example, a short-circuit failure occurs in the A-phase upper arm of the first motor driving circuit 32A, the upstream-side current detection value IU1 of the first motor driving circuit 32A suddenly sharply increases, whereas the upstream-side current detection value IU2 of the second motor driving circuit 32B slightly increases. This can lead to a determination that when an instantaneous value of the upstream-side current detection value IU1 becomes equal to or more than a predetermined threshold value, the upper arm has a short-circuit failure. The abnormality detecting unit 31a outputs the abnormality detection signal SAa or SAb of the logical value "1" to the first or second motor driving circuit 32A or 32B in which the short-circuit failure is occurring.

In this case, motor current is also significantly disturbed. However, by blocking the first motor current blocking circuit 33A of the first motor driving circuit 32A, motor driving current is supplied only from the second motor driving circuit 32B to the respective phase motor windings La to Lc of the three-phase electric motor 22, whereby the motor driving current recovers to a stable sine wave form. Accordingly, driving of the three-phase electric motor 22 can be continued.

At this time, as will be described later, a pulse width modulation (PWM) signal is input to the gates of the FETs of the first and second inverter circuits 42A and 42B. Thus, the three-phase motor driving currents Ia, Ib, and Ic output from the first and second inverter circuits 42A and 42B are rectangular wave signals having a controlled duty ratio. Due to this, in a case of simply detecting the instantaneous values of the three-phase motor driving currents Ia, Ib, and Ic, if detected when the rectangular wave signals are OFF, the detected values do not represent accurate motor current values.

Accordingly, in order to accurately detect the upstream-side current detection values IU1 and IU2, the upstream-side current detection values IU1 and IU2 are supplied to a peak hold circuit that holds peak values for a time equal to or more than approximately one cycle of the pulse width modulation signal. In this manner, by holding the peak values, peak (maximum) values of the upstream-side current detection values IU1 and IU2 can be quickly and accurately detected.

(Short-Circuit Failure Detection Processing)

Next, based on FIG. 9, a description will be given of processing steps of short-circuit failure detection processing of the first and second power source blocking circuits 44A and 44B and the first and second motor current blocking circuits 33A and 33B by the abnormality detecting unit 31a. In addition, the short-circuit failure detection processing is repeatedly executed in a previously set cycle.

Figure 9:
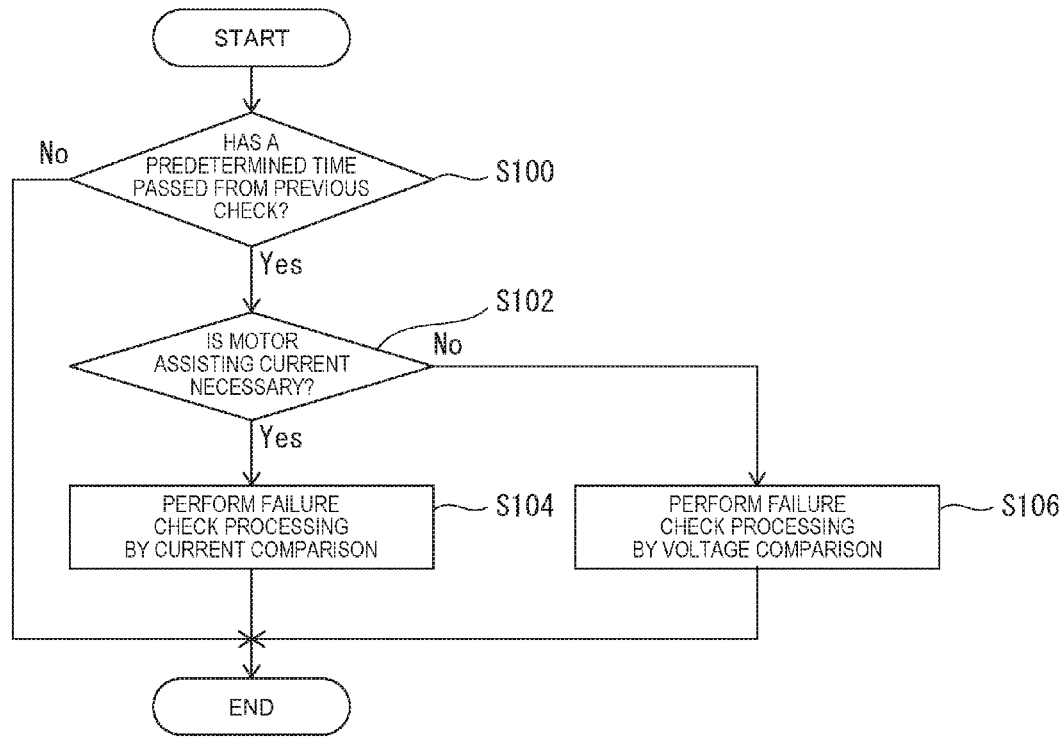
FIG. 9 is a flowchart depicting one example of processing steps of short-circuit failure detection processing.

When the abnormality detecting unit 31a executes the short-circuit failure detection processing, first, the unit 31a proceeds to step S100, as depicted in FIG. 9.

At step S100, the abnormality detecting unit 31a determines whether or not an elapsed time from a previous check has passed a previously set predetermined time on the basis of a count value of an unillustrated timer provided in the control computing device 31. Then, when determining that it is an initial check or that the elapsed time has passed the predetermined time (Yes), the unit 31a proceeds to step S102, whereas when determining negatively (No), the unit 31a ends the series of processing.

When proceeding to step S102, the abnormality detecting unit 31a determines whether or not there is motor energization or whether or not energization is necessary on the basis of the steering assisting current command value I*, the three-phase current command values Ia*, Ib*, and Ic*, and the three-phase motor driving current values Ia, Ib, and Ic computed by the control computing unit 31. Then, when determining that there is motor energization or energization is necessary (Yes), the unit 31a proceeds to step S104, whereas when determining that energization is unnecessary (No), the unit 31a proceeds to step S106.

Specifically, assume that, by comparing each above-mentioned current value with a previously set current threshold value, for example, the steering assisting current command value I* is determined to be equal to or more than a first current threshold value and any of the three-phase current command values Ia*, Ib*, and Ic* is determined to be equal to or more than a second current threshold value. In this case, additionally, when any of the three-phase motor driving current values Ia, Ib, and Ic is equal to or more than a previously set third current threshold value, it is determined that there is energization to the motor. Additionally, when the three-phase motor driving current values Ia, Ib, and Ic are all less than the previously set third current threshold value, it is determined that there is no energization to the motor but energization is necessary.

On the other hand, assume that the steering assisting current command value I* is determined to be less than the first current threshold value and the three-phase current command values Ia*, Ib*, and Ic* are determined to be all less than the second current threshold value. In this case, additionally, when all of the three-phase motor driving current values Ia, Ib, and Ic are less than the previously set third current threshold value, it is determined that energization is unnecessary and there is no energization. In addition, when any of the three-phase motor driving current values Ia, Ib, and Ic is equal to or more than the third threshold value, it is determined that there is motor energization but energization is unnecessary.

When proceeding to step S104, the abnormality detecting unit 31a executes failure check processing by current comparison for performing short-circuit failure check on the basis of currents flowing to the first and second motor driving circuits 32A and 32B during motor energization and ends the series of processing. In addition, after ending the failure check processing by current comparison, the counter value of the timer is cleared.

On the other hand, when proceeding to step S106, the abnormality detecting unit 31a executes failure check processing by voltage comparison for performing short-circuit failure check on the basis of voltages generated in the first and second motor driving circuits 32A and 32B during motor nonenergization and ends the series of processing. In addition, after ending the failure check processing by voltage comparison, the counter value of the timer is cleared.

(Failure Check Processing by Current Comparison)

Next, based on FIGS. 10 to 22, a description will be given of processing steps of the failure check processing by current comparison.

Figure 10:
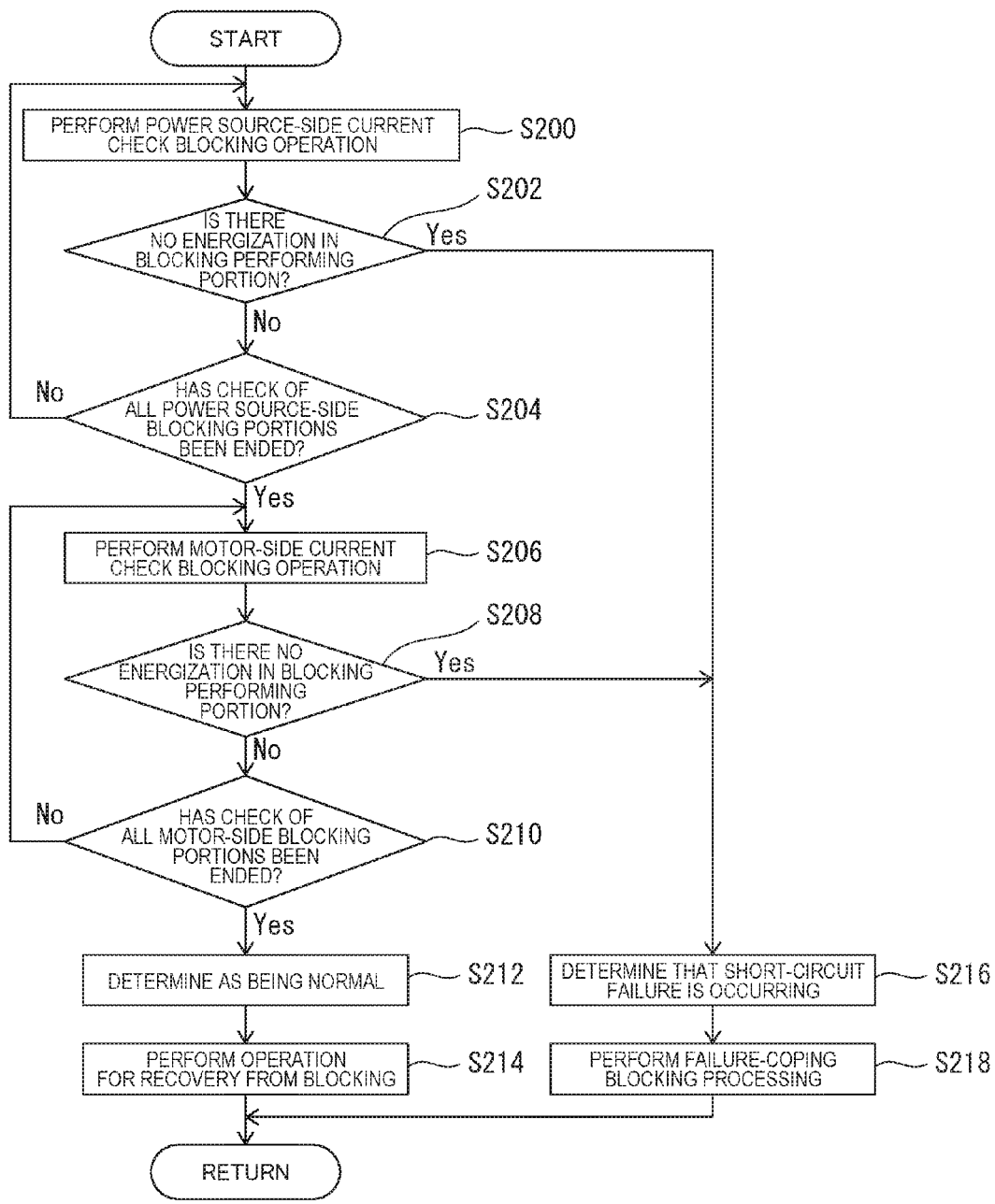
FIG. 10 is a flowchart depicting one example of processing steps of failure check processing by current comparison.

When the abnormality detecting unit 31a executes the failure check processing by current comparison, first, the unit 31a proceeds to step S200, as depicted in FIG. 10.

At step S200, the abnormality detecting unit 31a executes power source-side current check blocking operation processing and proceeds to step S202.

Figure 12A:
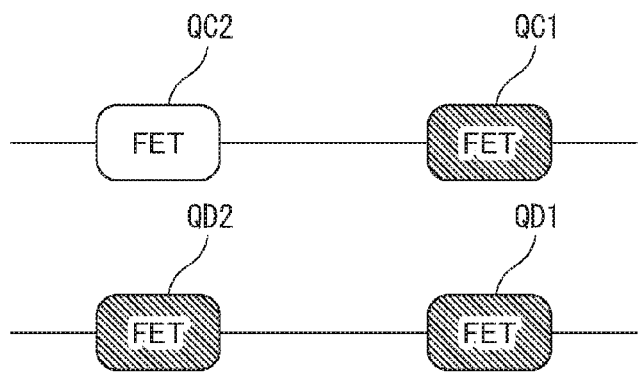
FIG. 12A to FIG. 12C are diagrams depicting other examples of the power source-side current check blocking operation pattern.
Figure 12B:
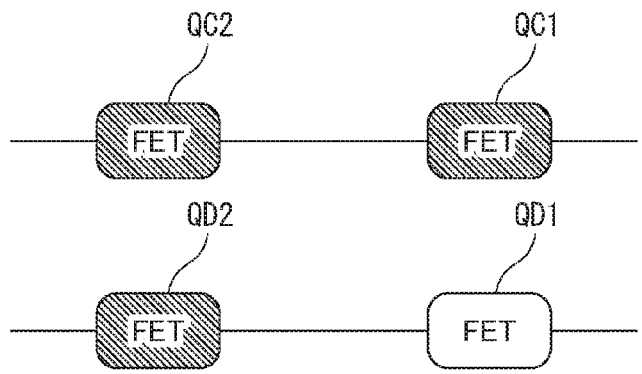
Figure 12C:
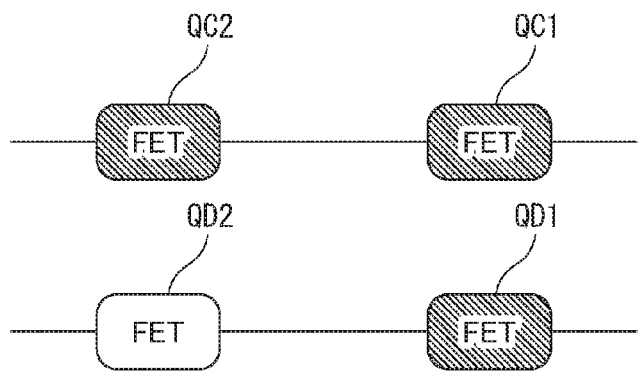

Hereinafter, a specific example of the power source-side current check blocking operation processing will be described based on FIG. 11 and FIGS. 12A to 12C. Here, FIG. 11 is a circuit diagram in which the circuit diagram of FIG. 4 is simplified by focusing on the flow of current. Additionally, FIGS. 12A to 12C are diagrams depicting blocking portions changed in the circuit diagram of FIG. 11.

In the present embodiment, in a previously set power source-side current check blocking operation pattern, a FET as an object for detecting a short-circuit failure is put in a blocked state (an OFF state).

Herein, the power source-side current check blocking operation pattern is a pattern in which a FET to be blocked of the FETs QC1 to QC2 and QD1 to QD2 of the first and second power source blocking circuits 44A and 44B is determined in such a manner that energization paths to all phases (the three phases in the present embodiment) of the motor are maintained.

Specifically, as depicted in FIG. 11, in the power source-side current check blocking operation pattern in a case of detection of a short-circuit failure of the FET QC1, the FET QC1 is turned OFF (a blocked state), whereas the FETs QC2, QD1, and QD2 are turned ON. In addition, in the blocking operation pattern, the respective FETs Q1 to Q6 of the first and second inverter circuits 42A and 42B are put in a state driven and controlled by a PWM gate signal (hereinafter referred to as "PWM-driven state"). At this time, the abnormality detecting unit 31a outputs, to the second gate driving circuit 41B, the motor voltage command value V2* set so that the second inverter circuit 42B is responsible for supplying 100 [%] of a motor current necessary to assist steering (hereinafter referred to as "steering assisting current).

This blocking operation pattern enables the energization paths between the second motor driving circuit 32B and all phases of the motor to be maintained, and also can cause the second inverter circuit 42B to be responsible for supplying 100 [%] of the necessary steering assisting current.

Similarly, the power source-side current check blocking operation pattern in a case of detection of a short-circuit failure of the FET QC2 is a blocking operation pattern in which the FET QC2 is turned OFF (a blocked state), whereas the FETs QC1, QD1, and QD2 are turned ON, as depicted in FIG. 12A. In addition, the power source-side current check blocking operation pattern in a case of detection of a short-circuit failure of the FET QD1 is a blocking operation pattern in which the FET QD1 is turned OFF (a blocked state), whereas the FETs QC1, QC2, and QD2 are turned ON, as depicted in FIG. 12B. In addition, the power source-side current check blocking operation pattern in a case of detection of a short-circuit failure of the FET QD2 is a blocking operation pattern in which the FET QD2 is turned OFF (a blocked state), whereas the FETs QC1, QC2, and QD1 are turned ON, as depicted in FIG. 12C. In all of the cases, the respective FETs Q1 to Q6 of the first and second inverter circuits 42A and 42B are put in a PWM-driven state.

In all of the blocking operation patterns described above, only one of the first and second motor driving circuits 32A and 32B drives the three-phase electric motor 22. Thus, in the present embodiment, the control computing device 31 controls one of the circuits that maintains energization paths so that the circuit side supplies 100 [%] of the amount of current necessary to assist steering, as described above. However, in order to prevent the circuit from being damaged by, for example, a load exceeding a rated value, the present embodiment sets an upper limit value of the amount of current for which the circuit is responsible. Then, when the amount of current necessary to assist steering exceeds the upper limit value, the control computing device 31 cancels the execution of check and restarts control by both of the motor driving circuits.

Returning to FIG. 10, at step S202, the failure check processing by current comparison is performed on the basis of the upstream-side current detection values IU1 and IU2 of the current detecting circuits 39A1 and 39B1 to determine whether or not the blocking performing portion is being non-energized. Then, when determining as being non-energized (No), the abnormality detecting unit 31a proceeds to step S204, whereas when determining negatively (Yes), the unit 31a proceeds to step S216.

Hereinafter, a specific example of the failure check processing by current comparison in the power source-side current check blocking operation, which is executed at step S202, will be described based on FIG. 13.

Figure 13:
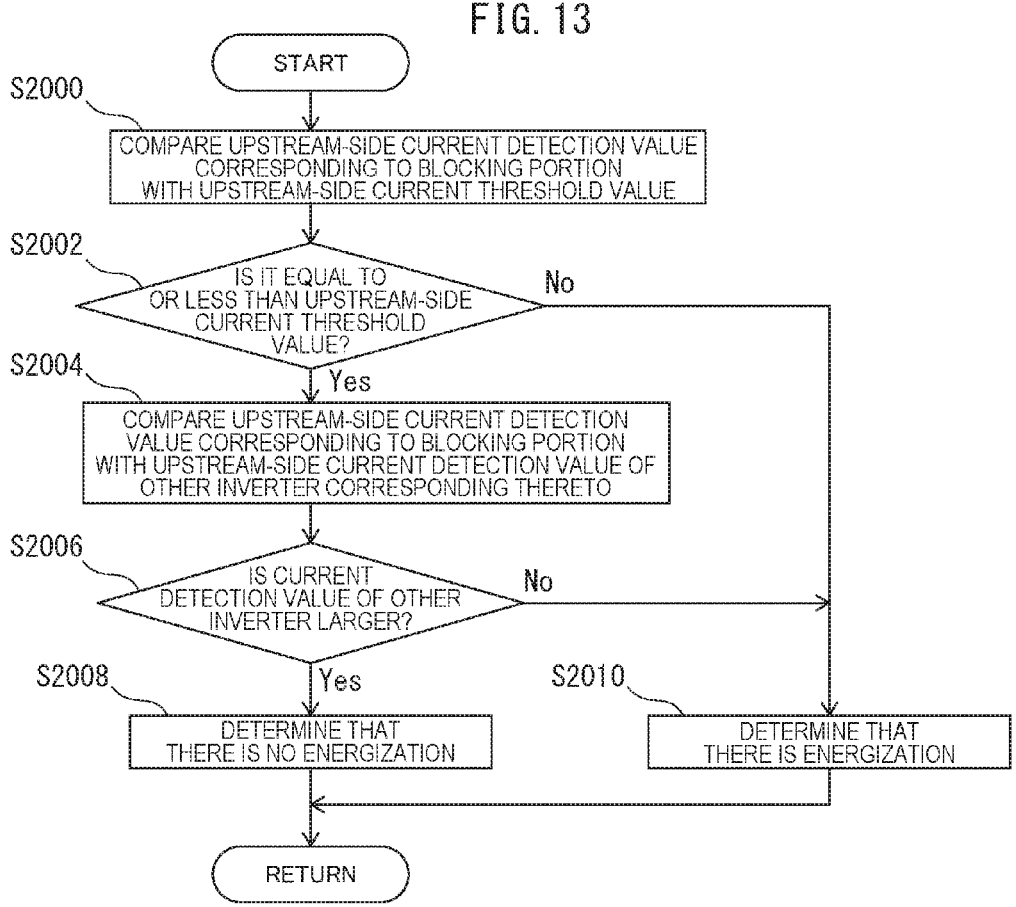
FIG. 13 is a flowchart depicting one example of processing steps of failure check processing by current comparison in power source-side current check blocking operation.

At step S202, when the failure check processing by current comparison in the power source-side current check blocking operation is started, first, the abnormality detecting unit 31a proceeds to step S2000, as depicted in FIG. 13.

At step S2000, the abnormality detecting unit 31a compares an absolute value of an upstream-side current detection value corresponding to a blocking portion with a previously set upstream-side current threshold value. After that, the unit 31a proceeds to step S2002. Herein, the upstream-side current threshold value is a value set within an error range in which it can be determined that there is no current flow, on the basis of 0 [A].

In the present embodiment, when the blocking portion is the FET QC1 or QC2 of the first power source blocking circuit 44A, the upstream-side current detection value IU1 of the current detecting circuit 39A1 is compared with the upstream-side current threshold value. On the other hand, when the blocking portion is the FET QD1 or QD2 of the second power source blocking circuit 44B, the upstream-side current detection value IU2 of the current detecting circuit 39B1 is compared with the upstream-side current threshold value.

At step S2002, the abnormality detecting unit 31a determines whether or not the upstream-side current detection value is equal to or less than the upstream-side current threshold value on the basis of the comparison result of step S2000. Then, when determining that it is equal to or less than the upstream-side current threshold value (Yes), the unit 31a proceeds to step S2004, whereas when determining negatively (No), the unit 31a proceeds to step S2010.

Herein, when the blocking portion is in a normally blocked state, energization between the portion and the battery 27 is blocked. Thereby, the upstream-side current detection value corresponding to the blocking portion (hereinafter referred to as "upstream-side blocking object current value") becomes 0 [A] or substantially 0 [A]. Accordingly, the upstream-side blocking object current value becomes equal to or less than the upstream-side current threshold value. On the other hand, when a short-circuit failure occurs in the blocking portion, current flows thereinto from the battery 27, whereby the absolute value of the upstream-side blocking object current value becomes larger than the upstream-side current threshold value.

For example, when the FET QC1 is assumed to be a blocking portion and a short-circuit failure occurs in the FET QC1, the upstream-side blocking object current value IU1 becomes "IU1≠0 [A]", and the absolute value thereof becomes larger than the upstream-side current threshold value.

At step S2004, the abnormality detecting unit 31a compares the upstream-side blocking object current value with an upstream-side current detection value of another inverter circuit of an energizing portion corresponding thereto (hereinafter referred to as "upstream-side energizing object current value"), and the unit 31a proceeds to step S2006.

Since the present embodiment includes the two inverter circuits: the first and second inverter circuits 42A and 42B, any one of the upstream-side current detection value IU1 and the upstream-side current detection value IU2 is the upstream-side blocking object current value, and any other one thereof is the upstream-side energizing object current value. Then, a comparison is made between the magnitudes of the upstream-side blocking object current value and the upstream-side energizing object current value.

At step S2006, the abnormality detecting unit 31a determines whether or not the upstream-side energizing object current value is larger than the upstream-side blocking object current value. Then, when determining that it is larger (Yes), the unit 31a proceeds to step S2008, whereas when determining negatively (No), the unit 31a proceeds to step S2010.

Specifically, since the upstream-side blocking object current value becomes a current value in a state in which current from the battery 27 is blocked, the value is 0 [A] or substantially 0 [A]. Meanwhile, the upstream-side energizing object current value is a current value in a state energized with the battery 27. Accordingly, when the FET as the blocking portion is in a normally blocked state, the upstream-side blocking object current value becomes 0 [A] or substantially 0 [A], whereby the upstream-side energizing object current value becomes larger than the upstream-side blocking object current value.

For example, when only the FET QC1 of the FETs of the first and second power source blocking circuits 44A and 44B, is put in a blocked state, the upstream-side blocking object current value becomes IU1 and the upstream-side energizing object current value becomes IU2. When the FET QC1 is normal, the upstream-side blocking object current value IU1 is "IU1≈0 [A]", and the upstream-side blocking object current value IU1 and the upstream-side energizing object current value IU2 are in a magnitude relationship of "IU1<IU2".

When proceeding to step S2008, the abnormality detecting unit 31a determines that there is no energization, ends the series of processing, and returns to the initial processing.

On the other hand, when proceeding to step S2010, the abnormality detecting unit 31a determines that there is energization, ends the series of processing, and returns to the initial processing.

While the specific example of the failure check processing by current comparison has been described above, the invention is not limited to this configuration and may be configured to determine whether or not there is energization by performing only one of the processing of the above steps S2000 to S2002 and the processing of the above steps S2004 to S2006.

Returning to FIG. 10, when proceeding to step S204, the abnormality detecting unit 31a determines whether check processing of all power source-side blocking portions has been ended or not. Then, when determining that the check processing has been ended (Yes), the unit 31a proceeds to step S206, whereas when determining negatively (No), the unit 31a proceeds to step S200.

Specifically, the abnormality detecting unit 31a determines whether or not the failure check processing of step S202 has been ended in all the FETs of the first and second power source blocking circuits 44A and 44B. Then, when determining that it has not been ended, the unit 31a repeatedly executes failure check processing of unchecked FETs in the blocking operation patterns depicted in FIG. 11 and FIGS. 12A to 12C until the check processing of all the FETs QC1 to QC2 and QD1 to QD2 is ended.

When proceeding to step S206, the abnormality detecting unit 31a executes motor-side current check blocking operation processing and proceeds to step S208.

Hereinafter, a specific example of motor-side current check blocking operation processing will be described based on FIG. 14 to FIG. 22.

Figure 14:
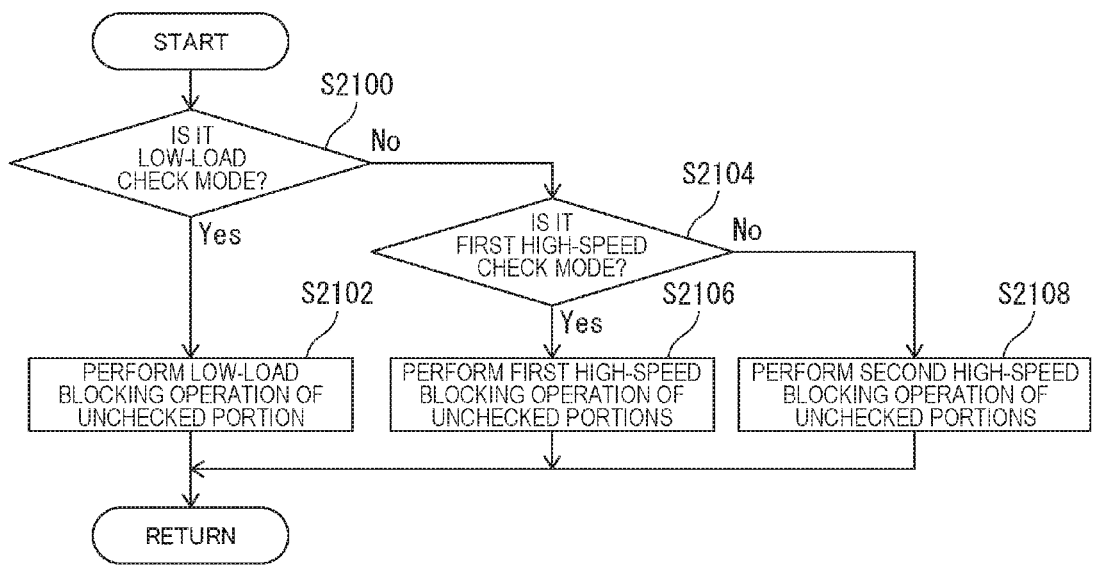
FIG. 14 is a flowchart depicting one example of processing steps of motor-side current check blocking operation processing.

At step S206, when the motor-side current check blocking operation processing is started, first, the abnormality detecting unit 31a proceeds to step S2100, as depicted in FIG. 14.

At step S2100, the abnormality detecting unit 31a determines whether a low-load check mode has been set or not. Then, when determining that the low-load check mode has been set (Yes), the unit 31a proceeds to step S2102, whereas when determining negatively (No), the unit 31a proceeds to step S2104.

When proceeding to step S2102, the abnormality detecting unit 31a performs low-load blocking operation processing of an unchecked portion, ends the series of processing, and returns to the initial processing.

On the other hand, when proceeding to step S2104, the abnormality detecting unit 31a determines whether a first high-speed check mode has been set or not. Then, when determining that the first high-speed check mode has been set (Yes), the unit 31a proceeds to step S2106, whereas when determining negatively (No), the unit 31a proceeds to step S2108.

When proceeding to step S2106, the abnormality detecting unit 31a performs the first high-speed blocking operation processing of unchecked portions, ends the series of processing, and returns to the initial processing.

Alternatively, when proceeding to step S2108, the abnormality detecting unit 31a performs a second high-speed blocking operation processing of unchecked portions, ends the series of processing, and returns to the initial processing.

Hereinafter, a specific example of blocking operation processing in each check mode will be described.

(Low-Load Blocking Operation Processing)

Figure 15:
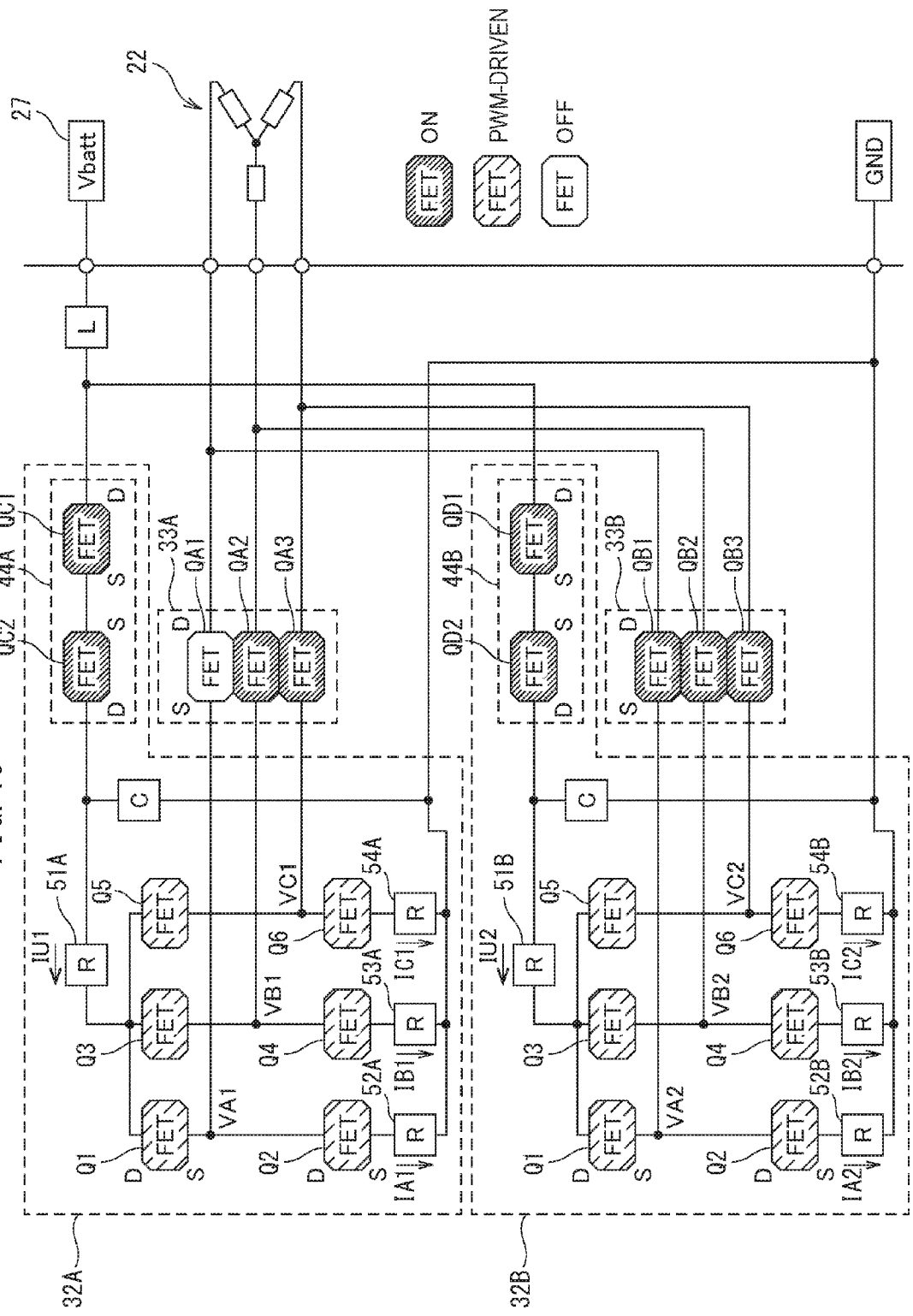
FIG. 15 is a diagram depicting one example of a low-load blocking operation pattern.

First, based on FIG. 15 and FIGS. 16A to 16E, a description will be given of a specific example of the low-load blocking operation processing where the low-load check mode is set. Here, FIG. 15 is a circuit diagram in which the circuit diagram of FIG. 4 is simplified by focusing on the flow of current. Additionally, FIGS. 16A to 16E are diagrams depicting blocking portions changed in the circuit diagram of FIG. 15.

In the present embodiment, when the low-load check mode is set, a FET as an object for detecting a short-circuit failure is put in a blocked state (an OFF state) by a previously set low-load blocking operation pattern.

Herein, the low-load blocking operation pattern is a pattern in which any one FET of the FETs QA1 to QA3 and QB1 to QB3 of the first and second motor current blocking circuits 33A and 33B is determined as a FET to be blocked. In other words, the low-load blocking operation pattern is a check mode in which each one FET to be blocked in the first and second motor current blocking circuits 33A and 33B is checked one by one in order.

Specifically, in the low-load blocking operation pattern in a case of detection of a short-circuit failure of the FET QA1, the FET QA1 is turned OFF (a blocked state), whereas the FETs QA2 to QA3 and QB1 to QB3 are turned ON, as depicted in FIG. 15. In addition, in the blocking operation pattern, the respective FETs Q1 to Q6 of the first and second inverter circuits 42A and 42B are put in a PWM-driven state.

At this time, the abnormality detecting unit 31a outputs, to the second gate driving circuit 41B, the motor voltage command value V2* set so that the switching arm SWBa of the second inverter circuit 42B is responsible for supplying 100 [%] of a necessary steering assisting current. In addition, the other switching arms SWBb and SWBc are set to be responsible for supplying 50 [%] thereof, the same as usual. In addition, the first inverter circuit 42A performs the same operation as usual.

With this blocking operation pattern, energization paths to all the phases of the motor can be formed by remaining paths other than a path blocked by the FET QA1 in the first and second motor driving circuits 32A and 32B. In addition, in a case of an A-phase assisting current, the pattern can cause the switching arm SWBa of the second inverter circuit 42B to be responsible for supplying 100 [%] of a necessary amount of the steering assisting current. In addition, as for a B-phase assisting current, it can cause the switching arms SWAb and SWBb of the first and second inverter circuits 42A and 42B to be responsible for supplying each 50 [%] thereof. Furthermore, as for a C-phase assisting current, it can cause the switching arms SWAc and SWBc of the first and second inverter circuits 42A and 42B to be responsible for supplying each 50 [%] thereof.

Figure 16A:
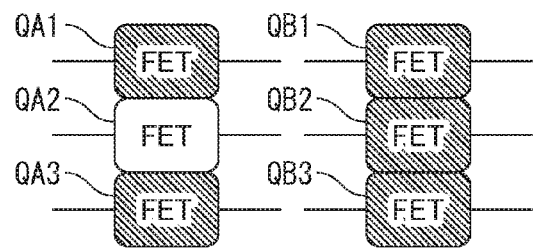
FIG. 16A to FIG. 16E are diagrams depicting other examples of the low-load blocking operation pattern.
Figure 16B:
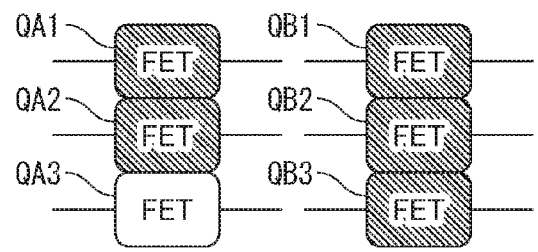
Figure 16C:
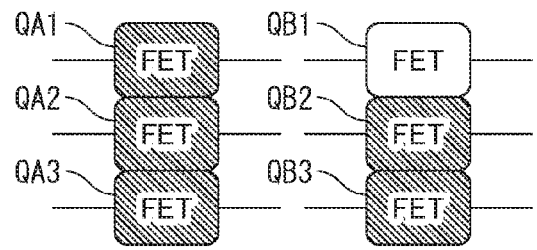
Figure 16D:
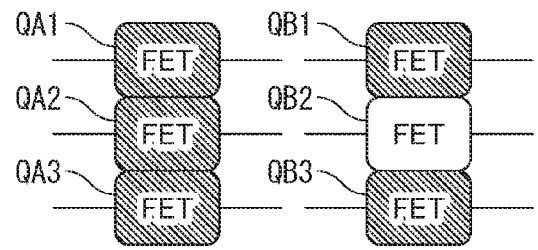
Figure 16E:
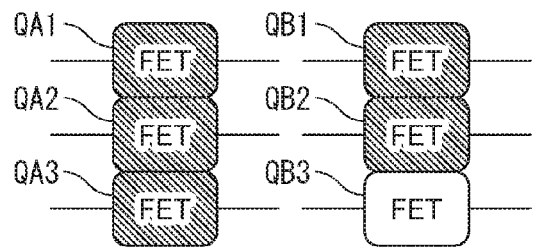

Similarly, the low-load blocking operation pattern in a case of detection of a short-circuit failure of the FET QA2 is a blocking operation pattern in which the FET QA2 is turned OFF (a blocked state), whereas the FETs QA1, QA3, and QB1 to QB3 are turned ON, as depicted in FIG. 16A. In addition, the low-load blocking operation pattern in a case of detection of a short-circuit failure of the FET QA3 is a blocking operation pattern in which the FET QA3 is turned OFF (a blocked state), whereas the FETs QA1 to QA2 and QB1 to QB3 are turned ON, as depicted in FIG. 16B. In addition, the low-load blocking operation pattern in a case of detection of a short-circuit failure of the FET QB1 is a blocking operation pattern in which the FET QB1 is turned OFF (a blocked state), whereas the FETs QA1 to QA3 and QB2 to QB3 are turned ON, as depicted in FIG. 16C. Additionally, the low-load blocking operation pattern in a case of detection of a short-circuit failure of the FET QB2 is a blocking operation pattern in which the FET QB2 is turned OFF (a blocked state), whereas the FETs QA1 to QA3, QB1, and QB3 are turned ON, as depicted in FIG. 16D. Additionally, the low-load blocking operation pattern in case of detection of a short-circuit failure of the FET QB3 is a blocking operation pattern in which the FET QB3 is turned OFF (a blocked state), whereas the FETs QA1 to QA3 and QB1 to QB2 are turned ON, as depicted in FIG. 16E. In all the cases, the respective FETs Q1 to Q6 of the first and second inverter circuits 42A and 42B are put in a PWM-driven state. With these blocking operation patterns, energization paths to all the phases of the motor can be formed by remaining paths unblocked in the first and second motor driving circuits 32A and 32b.

In the blocking operation patterns described above, any one switching arm of one of the first and second inverter circuits 42A and 42B is responsible for performing energization to one phase of the three-phase electric motor 22. Accordingly, in the present embodiment, as described above, the control computing device 31 controls the one switching arm so as to be responsible for supplying 100 [%] of the amount of current (any one of Ia*, Ib*, and Ic*) necessary for steering assistance of the phase corresponding to the arm. However, in order to prevent the switching arm from being damaged by, for example, a load exceeding a rated value, the present embodiment sets an upper limit value of the amount of current for which the one switching arm is responsible. Then, when the amount of current necessary for steering assistance exceeds the upper limit value, the control computing device 31 cancels check execution and restarts control by all arms of both motor driving circuits.

(First High-Speed Blocking Operation Processing)

Figure 17:
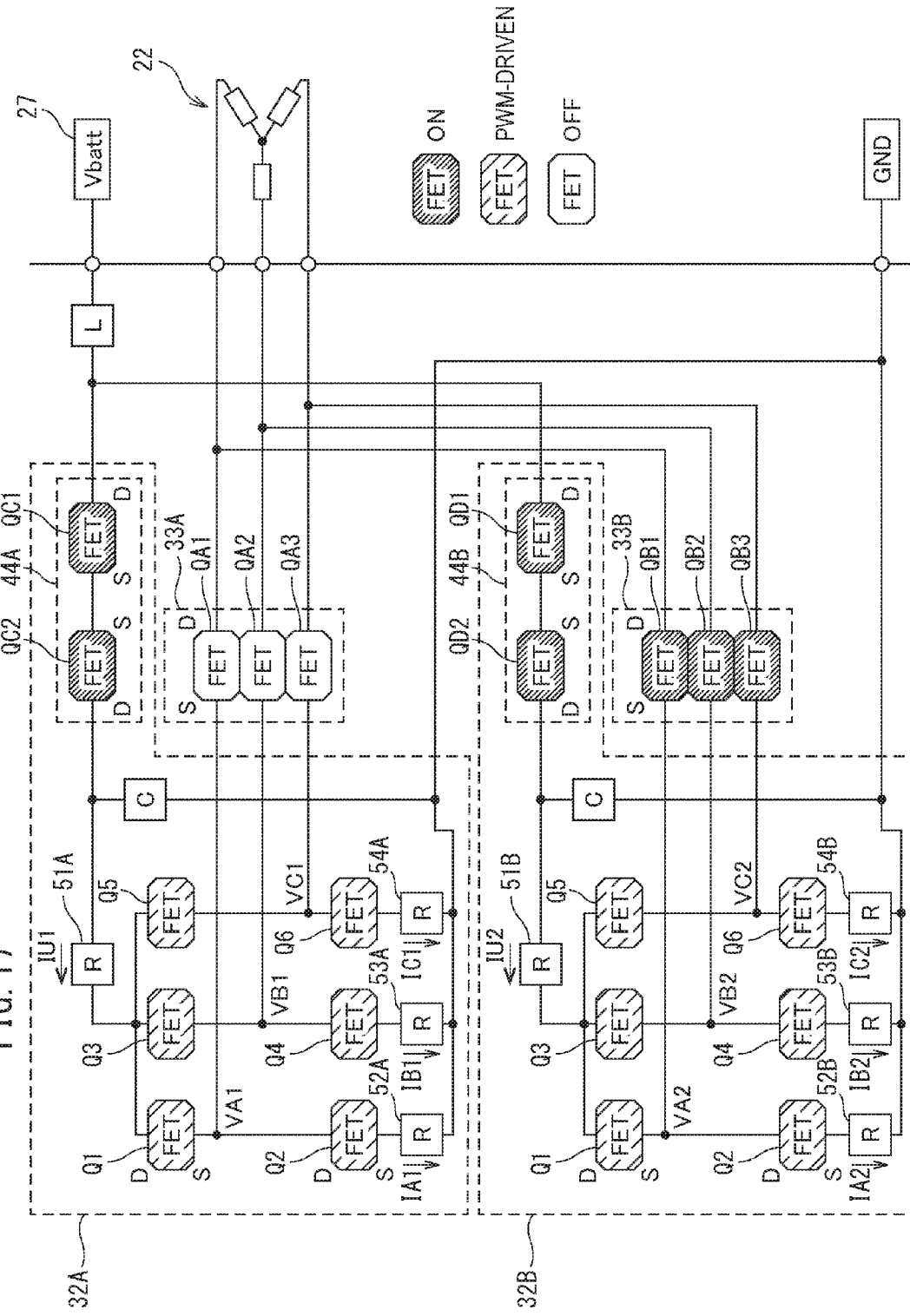
FIG. 17 is a diagram depicting one example of a first high-speed blocking operation pattern.
Figure 18:
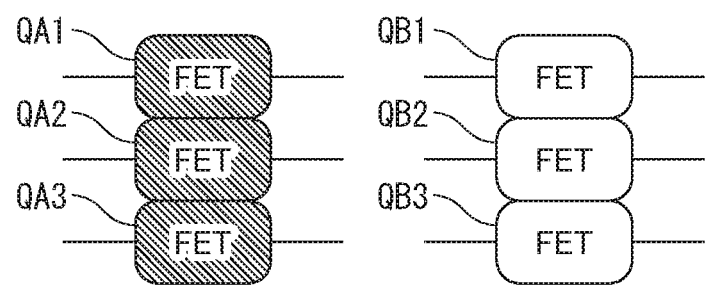
FIG. 18 is a diagram depicting another example of the first high-speed blocking operation pattern.

Next, a specific example of a first high-speed blocking operation processing where the first high-speed check mode is set will be described based on FIG. 17 and FIG. 18. Here, FIG. 17 is a circuit diagram in which the circuit diagram of FIG. 4 is simplified by focusing on the flow of current. In addition, FIG. 18 are diagrams depicting blocking portions changed in the circuit diagram of FIG. 17.

In the present embodiment, when the first high-speed check mode is set, FETs as objects for detecting a short-circuit failure are put in a blocked state (an OFF state) by a previously set first high speed blocking operation pattern.

Herein, the first high-speed blocking operation pattern is a pattern in which, all the FETs of either one of a set of the FETs QA1 to QA3 of the first motor current blocking circuit 33A and a set of the FFTs QB1 to QB3 of the second motor current blocking circuit 33B are determined as FETs to be blocked. In other words, the first high-speed check mode is a check mode in which all the FETS of each of the first and second motor current blocking circuits 33A and 33B are collectively checked in order starting from either one of the circuits.

Specifically, in the first high-speed blocking operation pattern in a case of detection of a short-circuit failure of the FETs QA1 to QA3, the FETs QA1 to QA3 are turned OFF (a blocked state), whereas the FETs QB1 to QB3 are turned ON, as depicted in FIG. 17. In addition, in the blocking operation pattern, the respective FETs Q1 to Q6 of the first and second inverter circuits 42A and 42B are put in a PWM-driven state.

At this time, the abnormality detecting unit 31a outputs, to the second gate driving circuit 41B, the motor voltage command value V2* set so that the second inverter circuit 42B is responsible for supplying 100 [%] of a necessary steering assisting current.

This blocking operation pattern enables energization paths to all the phases of the motor to be maintained by the second motor driving circuit 32B, and also can cause the second inverter circuit 42B to be responsible for supplying 100 [%] of the necessary steering assisting current.

Similarly, the first high-speed blocking operation pattern in a case of detection of a short-circuit failure of the FETs QB1 to QB3 is a blocking operation pattern in which the FETs QB1 to QB3 are turned OFF (a blocked state), whereas the FETs QA1 to QA3 are turned ON, as depicted in FIG. 18. Even in this case, the respective FETs Q1 to Q6 of the first and second inverter circuits 42A and 42B are put in a PWM-driven state.

At this time, the abnormality detecting unit 31a outputs, to the first gate driving circuit 41A, the motor voltage command value V1* set so that the first inverter circuit 42A is responsible for supplying 100 [%] of a necessary steering assisting current.

With this blocking operation pattern, energization paths to all the phases of the motor can be maintained by the first motor driving circuit 32A. In addition, the pattern can cause the first inverter circuit 42A to be responsible for supplying 100 [%] of the necessary steering assisting current.

However, in order to prevent the inverter circuit from being damaged by, for example, a load exceeding a rated value, the present embodiment sets an upper limit value of the amount of the current for which the one inverter circuit is responsible. Then, when the amount of motor current necessary for steering assistance exceeds the upper limit value, the control computing unit 31 cancels check execution and restarts control by all the arms of both motor driving circuits.

(Second High-Speed Blocking Operation Processing)

Figure 19:
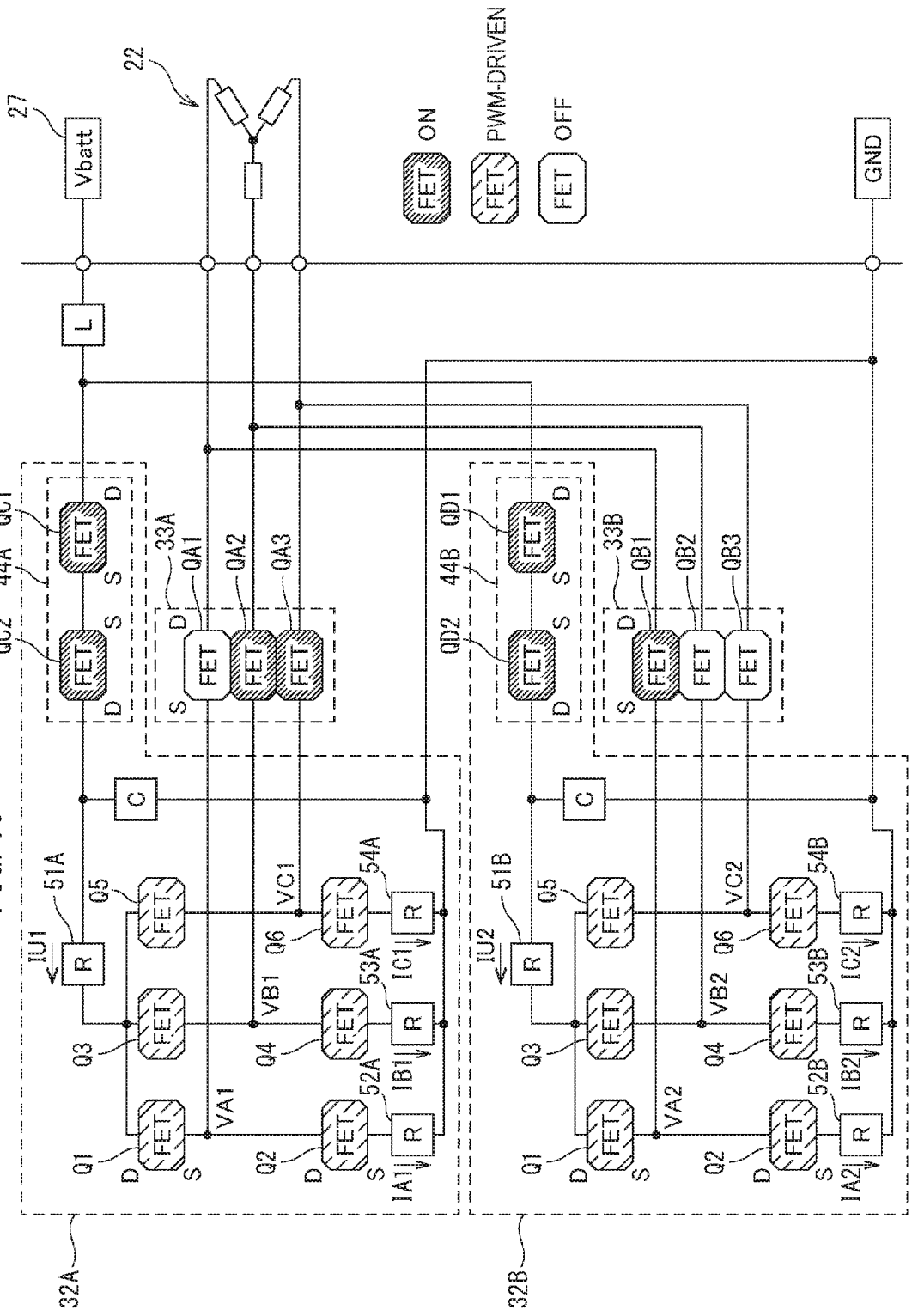
FIG. 19 is a diagram depicting one example of a second high-speed blocking operation pattern.
Figure 20A:
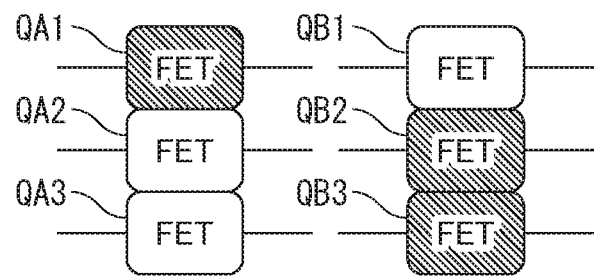
FIG. 20A to FIG. 20C are diagrams depicting other examples of the second high-speed blocking operation pattern.
Figure 20B:
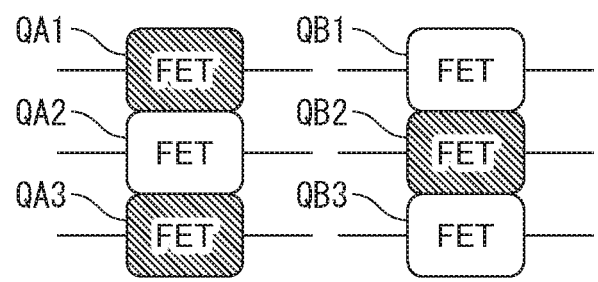
Figure 20C:
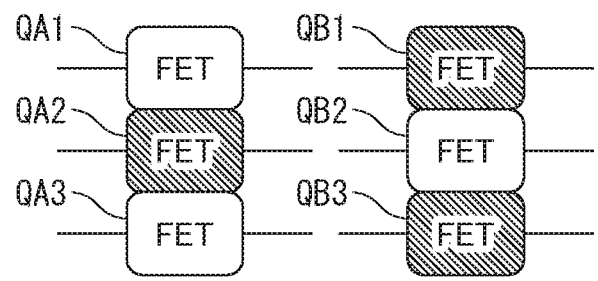

Next, a specific example of the second high-speed blocking operation processing where the second high-speed check mode is set will be described based on FIG. 19 and FIGS. 20A to 20C. Here, FIG. 19 is a circuit diagram in which the circuit diagram of FIG. 4 is simplified by focusing on the flow of current. Additionally, FIGS. 20A to 20C are diagrams depicting blocking portions changed in the circuit diagram of FIG. 19.

In the present embodiment, when the second high-speed check mode is set, FETs as objects for detecting a short-circuit failure are put in a blocked state (an OFF state) by a previously set second high-speed blocking operation pattern.

Herein, the second high-speed blocking operation pattern is a pattern in which one of the FETs of either one of two set including a set of the FETs QA1 to QA3 of the first motor current blocking circuit 33A and a set of FFTs QB1 to QB3 of the second motor current blocking circuit 33B, and two of the FETs of the other one of the two sets having a phase different from a phase of the one of the FFTs of the either one are determined as FETs to be blocked. In other words, the second high-speed check mode is a check mode in which, each three FETs as each combination of the FETs of the FETs of the first and second motor current blocking circuits 33A and 33B are collectively checked.

Specifically, in a case of detection of a short-circuit failure of three FETs: the FETs QA1, QB2, and QB3, the FETs QA1, QB2, and QB3 are turned OFF (a blocked state), whereas the FETs QA2 to QA3 and QB1 are turned ON, as depicted in FIG. 19. In addition, in the blocking operation pattern, the respective FETs Q1 to Q6 of the first and second inverter circuits 42A and 42B are put in a PWM-driven state.

At this time, the abnormality detecting unit 31a outputs, to the second gate driving circuit 41B, the motor voltage command value V2* set so that the switching arm SWBa of the second inverter circuit 42B is responsible for supplying 100 [%] of a steering assisting current necessary for the A phase. In addition, the abnormality detecting unit 31a outputs, to the first gate driving circuit 41A, the motor voltage command value V1* set so that the switching arms SWAb and SWAc of the first inverter circuit 42A is responsible for supplying 100 [%] of a steering assisting current necessary for the B phase and the C phase.

With this blocking operation pattern, energization paths to all the phases of the motor can be formed by remaining paths other than paths blocked by the FETs QA1, QB2, and QB3 of the first and second motor current blocking circuits 33A and 33B. Additionally, in the case of an A-phase assisting current, the pattern can cause the switching arm SWBa of the second inverter circuit 42B to be responsible for supplying 100 [%] of a necessary steering assisting current. In addition, as for a B-phase assisting current, it can cause the switching arm SWAb of the first inverter circuit 42A to be responsible for supplying 100 [%] thereof. Furthermore, as for a C-phase assisting current, it can cause the switching arm SWAc of the first inverter circuit 42A to be responsible for supplying 100 [%] thereof.

Furthermore, in the second high-speed blocking operation pattern in a case of detection of a short-circuit failure of the remaining three FETs: the FETs QA2, QA3, and QB1, the FETs QA2, QA3, and QB1 are turned OFF (a blocked state), whereas the FETs QA1, QB2, and QB3 are turned ON, as depicted in FIG. 20A. In addition, in the blocking operation pattern, the respective FETs Q1 to Q6 of the first and second inverter circuits 42A and 42B are put in a PWM-driven state.

At this time, the abnormality detecting unit 31a outputs, to the first gate driving circuit 41A, the motor voltage command value V1* set so that the switching arm SWAa of the first inverter circuit 42A is responsible for supplying 100 [%] of a steering assisting current necessary for the A phase. In addition, the unit 31a outputs, to the second gate driving circuit 41B, the motor voltage command value V2* set so that the switching arms SWBb and SWBc of the second inverter circuit 42B are responsible for supplying 100 [%] of a steering assisting current necessary for the B phase and the C phase.

With this blocking operation pattern, energization paths to all the phases of the motor can be formed by remaining paths other than paths blocked by the FETs QA2, QA3, and QB1 of the first and second motor current blocking circuits 33A and 33B. In addition, in a case of an A-phase assisting current, the pattern can cause the switching arm SWAa of the first inverter circuit 42A to be responsible for supplying 100 [%] of a necessary amount of the steering assisting current. Additionally, as for a B-phase assisting current, it can cause the switching arm SWBb of the second inverter circuit 42B to be responsible for supplying 100 [%] thereof. Furthermore, as for a C-phase assisting current, it can cause the switching arm SWBc of the second inverter circuit 42B to be responsible for supplying 100 [%] thereof.

However, in order to prevent each switching arm from being damaged by, for example, a load exceeding a rated value, the present embodiment sets an upper limit value of the amount of the current for which each switching arm is responsible. Then, when the amount of current necessary for steering assistance exceeds the upper limit value, the control computing unit 31 cancels check execution and restarts control by all the arms of both motor driving circuits.

Here, the second high-speed blocking operation pattern is not limited to the combinations of the blocking operation patterns depicted in FIG. 19 and FIG. 20A, and may be other combinations, such as, for example, combinations of blocking operation patterns as depicted in FIGS. 20B and 20C.

Returning to FIG. 10, at step S208, the failure check processing by current comparison is performed on the basis of the downstream-side current detection values IA1 to IC1 and IA2 to IC2 of the current detecting circuits 39A2 and 39A4 and 39B1 to 39B4 to determine whether the blocking performing portion is not being energized. Then, when determining that it is not being energized (No), the abnormality detecting unit 31a proceeds to step S210, whereas when determining negatively (Yes), the unit 31a proceeds to step S216.

Hereinafter, a specific example of the failure check processing by current comparison in the motor-side current check blocking operation corresponding to each check mode will be described based on FIG. 21 and FIG. 22.
(Failure Check Processing by Current Comparison in Low-Load Check Mode)

First, a specific example of the failure check processing by current comparison where the low-load check mode is set will be described based on FIG. 21.

Figure 21:
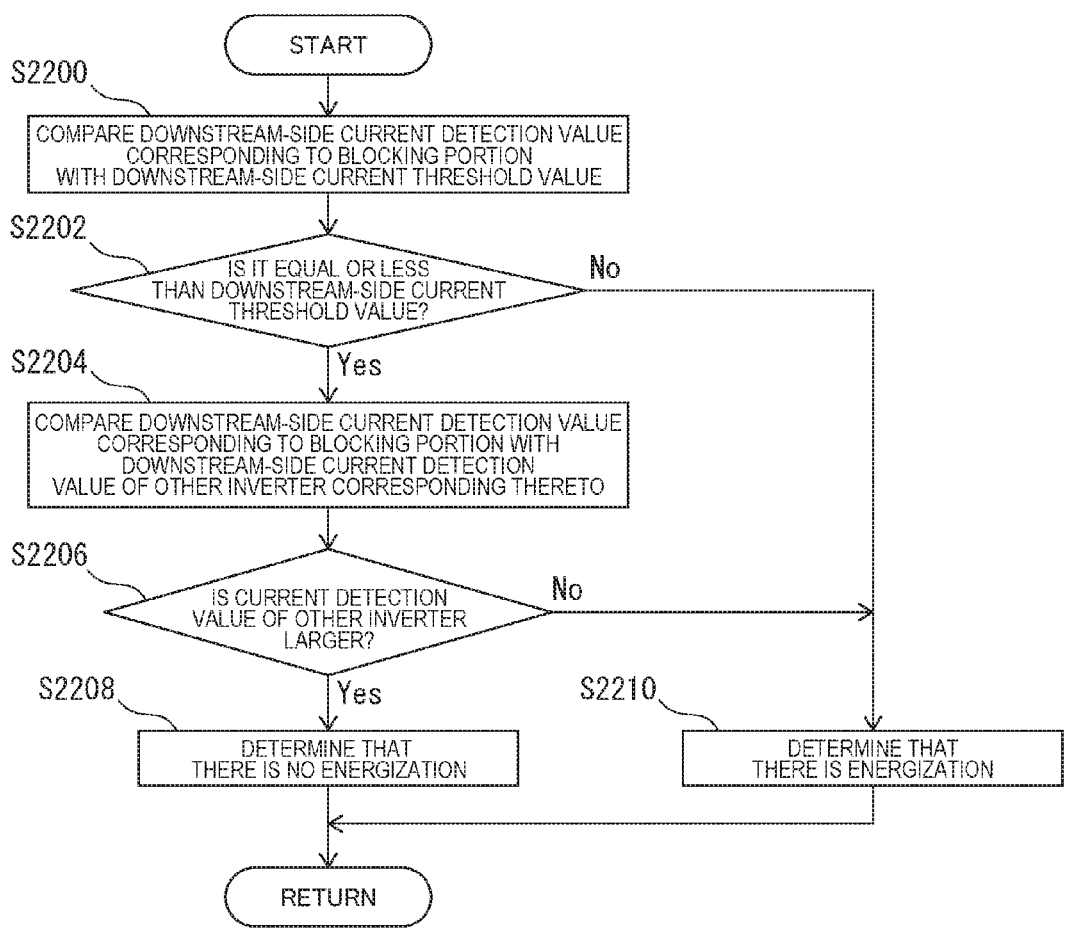
FIG. 21 is a flowchart depicting one example of processing steps of failure check processing by current comparison in a low-load check mode.

At step S208, when the failure check processing by current comparison in the low-load check mode is started, first, the abnormality detecting unit 31a proceeds to step S2200, as depicted in FIG. 21.

At step S2200, the abnormality detecting unit 31a compares a downstream-side current detection value corresponding to a FET as a blocking portion in the low-load blocking operation pattern with a previously set downstream-side current threshold value. After that, the unit 31a proceeds to step S2202. Herein, the downstream-side current threshold value is a value set within an error range in which it can be determined that there is no current flow, on the basis of 0 [A].

Specifically, when the blocking portion is any one of the FETs QA1 to QA3 of the first motor current blocking circuit 33A, any one of the downstream-side current detection values IA1 to IC1 corresponding to the blocking portion in the current detecting circuits 39A2 to 39A4 is compared with the downstream-side threshold value. On the other hand, when the blocking portion is any one of the FETs QB1 to QB3 of the second motor current blocking circuit 33B, any one of the downstream-side current detection values IA2 to IC2 corresponding to the blocking portion in the current detecting circuits 39B2 to 39B4 is compared with the downstream-side threshold value.

At step S2202, the abnormality detecting unit 31a determines whether the downstream-side current detection value corresponding to the blocking portion is equal to or less than the downstream-side current threshold value or not on the basis of the comparison result of step S2200. Then, when determining that it is equal to or less than the downstream-side current threshold value (Yes), the unit 31a proceeds to step S2204, whereas when determining negatively (No), the unit 31a proceeds to step S2210.

In other words, when the blocking portion is in a normally blocked state, no current flows into the motor winding of the corresponding phase of the three-phase electric motor 22 from the switching arm corresponding to the blocking portion of the inverter circuit. Thus, an absolute value of the downstream-side current detection value corresponding to the blocking portion (hereinafter referred to as "downstream-side blocking object current value") becomes 0 [A] or substantially 0 [A]. In the present embodiment, when the downstream-side blocking object current value is equal to or less the downstream-side current threshold value, it is determined that any one of the corresponding downstream-side current detection values IA1 to IC1 and IA2 to IC2 is 0 [A].

At step S2204, the abnormality detecting unit 31a compares the downstream-side blocking object current value with an absolute value of a downstream-side current detection value of an energization portion of an other inverter circuit corresponding thereto (hereinafter referred to as "downstream-side energizing object current value"), and the unit 31a proceeds to step S2206.

In other words, since the present embodiment includes the two inverter circuits: the first and second inverter circuits 42A and 42B, a comparison is made between magnitudes of an absolute value of any one of the downstream-side current detection values IA1 to IC1 of the first inverter circuit 42A and an absolute value of any one of the downstream-side current detection values IA2 to IC2 of the second inverter circuit 42B, corresponding to the same phase to that of the any one of the downstream-side current detection values IA1 to IC1.

At step S2206, the abnormality detecting unit 31a determines whether the downstream-side energizing object current value is larger than the downstream-side blocking object current value or not. Then, when determining that it is larger (Yes), the unit 31a proceeds to step S2208, whereas when determining negatively (No), the unit 31a proceeds to step S2210.

In other words, the downstream-side blocking object current value is a current value in a state in which energization between the switching arm of the phase corresponding to the blocking portion in the inverter circuit and the motor winding of the phase corresponding to the blocking portion in the three-phase electric motor 22 has been blocked. Thus, the downstream-side blocking object current value is 0 [A] or substantially 0 [A]. On the other hand, the downstream-side energizing object current value corresponding to the downstream-side blocking object current value is a current value in a state in which there is energization between the switching arm of each phase of the inverter circuit and the motor winding of each phase of the three-phase electric motor 22. Accordingly, when the FET as the blocking portion is in a normally blocked state, the downstream-side energizing object current value is larger than the downstream-side blocking object current value.

For example, when the FET QA1 is in a blocked state, the downstream-side blocking object current value is |IA1| and the downstream-side energizing object current value is |IA2|. In this case, when the FET QA1 is normal, the downstream-side blocking object current value |IA1| is "|IA1|≈0 [A]", and the downstream-side blocking object current value and the downstream-side energizing object current value |IA2| are in a magnitude relationship of "|IA1|<|IA2|".

When proceeding to step S2208, the abnormality detecting unit 31a determines that there is no energization, ends the series of processing, and returns to the initial processing.

On the other hand, when proceeding to step S2210, the abnormality detecting unit 31a determines that there is energization, ends the series of processing, and returns to the initial processing.

While the specific example of the failure check processing by current comparison in the low-load check mode has been described above, the invention is not limited to the configuration, and may employ a configuration in which only either one of the processing of step S2200 to S2202 and the processing of steps S2204 to S2206 is performed to determine whether or not there is energization.

(Failure Check Processing by Current Comparison in First and Second High-Speed Check Modes)

Next, a specific example of failure check processing by current comparison where the first or second high-speed check mode is set will be described based on FIG. 22.

Figure 22:
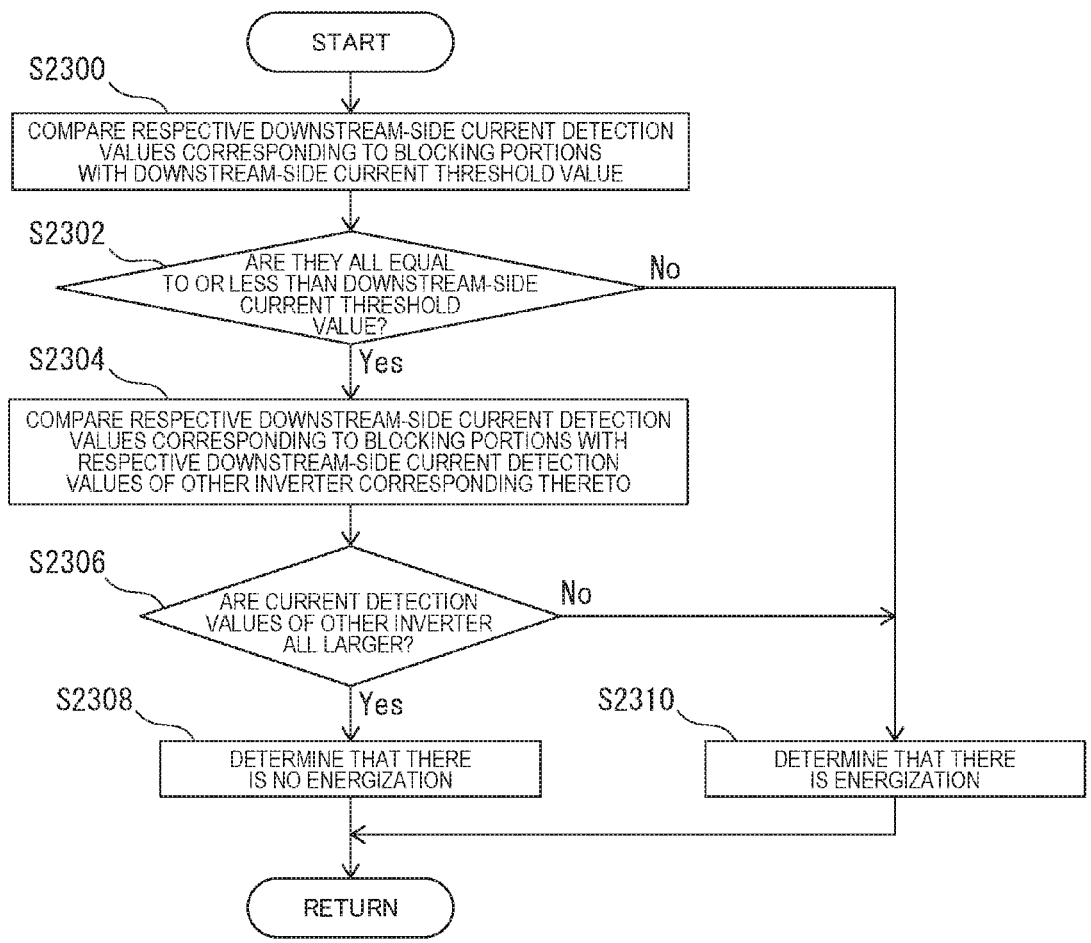
FIG. 22 is a flowchart depicting one example of processing steps of failure check processing by current comparison in a first high-speed check mode and a second high-speed check mode.

At step S208, when the failure check processing by current comparison in the first or second high-speed check mode is started, first, the abnormality detecting unit 31a proceeds to step S2300, as depicted in FIG. 22.

At step S2300, the abnormality detecting unit 31a compares downstream-side current detection values corresponding to FETs as blocking portions in the first or second high-speed blocking operation pattern with a previously set downstream-side current threshold value.

Herein, when the first high-speed check mode is set and the blocking portions are the FETs QA1 to QA3 of the first motor current blocking circuit 33A, each of the absolute values of the downstream-side current detection values IA1 to IC1 (downstream-side blocking object current values) of the current detecting circuits 39A2 to 39A4 is compared with the downstream-side current threshold value. On the other hand, when the blocking portions are the FETs QB1 to QB3 of the second motor current blocking circuit 33B, each of the absolute values of the downstream-side current detection values IA2 to IC2 (downstream-side blocking object current values) corresponding to the current detecting circuits 39B2 to 39B4 is compared with the downstream-side current threshold value.

Alternatively, assume that the second high-speed check mode is set and the blocking portions are a combination of any one of the FETs QA1 to QA3 of the first motor current blocking circuit 33A and any two of the FETs QB1 to QB3 of the second motor current blocking circuit 33B. In this case, any one corresponding to the blocking portion of the downstream-side blocking object current values |IA1| to |IC1| is compared with the downstream-side current threshold value. In addition, each of any two corresponding to the blocking portions of the downstream-side blocking object current values |IA2| to |IC2| are compared with the downstream-side current threshold value.

On the other hand, assume that the second high-speed check mode is set and the blocking portions are a combination of any two of the FETs QA1 to QA3 of the first motor current blocking circuit 33A and any one of the FETs QB1 to QB3 of the second motor current blocking circuit 33B. In this case, each of any two corresponding to the blocking portions of the downstream-side blocking object current values |IA1| to |IC1| is compared with the downstream-side current threshold value. In addition, any one corresponding to the blocking portion of the downstream-side blocking object current values |IA2| to |IC2| is compared with the downstream-side current threshold value.

At step S2302, the abnormality detecting unit 31a determines whether the downstream-side blocking object current values corresponding to the blocking portions are all equal to or less than the downstream-side current threshold value on the basis of the comparison results of step S2300. Then, when determining that they are equal to or less than the downstream-side current threshold value (Yes), the unit 31a proceeds to step S2304, whereas when determining negatively (No), the unit 31a proceeds to step S2310.

In other words, when the blocking portions are in a normally blocked state, the downstream-side blocking object current values are all 0 [A] or substantially 0 [A]. On the other hand, when a short-circuit failure occurs in any of the blocking portions, the downstream-side blocking object current value corresponding to the FET in which the short-circuit failure is occurring becomes larger than the downstream-side current threshold value.

At step S2304, the abnormality detecting unit 31a compares the downstream-side current detection values corresponding to the blocking portions with downstream-side current detection values of an other inverter circuit corresponding thereto, and the unit 31a proceeds to step S2306.

Specifically, a comparison is made between magnitudes of an absolute value (a downstream-side blocking object current value) of a downstream-side current detection value corresponding to a FET as a blocking portion and an absolute value (a downstream-side energizing object current value) of the downstream-side current detection value corresponding to a FET as an energizing portion.

The present embodiment includes the two inverter circuits: the first and second inverter circuits 42A and 42B. Thus, a comparison is made between magnitudes of absolute values of the downstream-side current detection values IA1 to IC1 of the first inverter circuit 42A and absolute values of the downstream-side current detection values IA2 to IC2 of the second inverter circuit 42B.

At step S2306, the abnormality detecting unit 31a determines whether or not the downstream-side energizing object current value is larger than the downstream-side blocking object current value. Then, when determining that it is larger (Yes), the unit 31a proceeds to step S2308, whereas when determining negatively (No), the unit 31a proceeds to step S2310.

Specifically, the downstream-side blocking object current value is a current value in a state in which energization is blocked between the switching arm of the phase corresponding to the blocking portion in the inverter circuit and the motor winding of the phase corresponding to the blocking portion in the three-phase electric motor 22, and thus becomes 0 [A] or substantially 0 [A]. On the other hand, the downstream-side energizing object current value corresponding to the downstream-side blocking object current value is a current value in a state in which there is energization between the switching arm of each phase of the inverter circuit and the motor winding of each phase of the three-phase electric motor 22. Accordingly, when the FET as the blocking portion is in a normally blocked state, the downstream-side energizing object current value becomes larger than the downstream-side blocking object current value.

For example, when the first high-speed check mode is set and the FETs QA1 to QA3 are put in a blocked state, the downstream-side blocking object current values become |IA1|, |IB1|, and |IC1|, and the downstream-side energizing object current values become |IA2|, |IB2|, and |IC2|. In this case, when the FET QA1 is normal, the downstream-side blocking object current value |IA1| is "|IA1|≈0 [A]", and the downstream-side blocking object current value |IA1| and the downstream-side energizing object current value |IA2| are in a magnitude relationship of "|IA1|<|IA2|". In addition, when the FET QA2 is normal, the downstream-side blocking object current value |IB1| is "|IB1|≈0 [A]", and the downstream-side blocking object current value |IB1| and the downstream-side energizing object current value |IB2| are in a magnitude relationship of "|IB1|<|IB2|". Furthermore, when the FET QA3 is normal, the downstream-side blocking object current value |IC1| is "|IC1|≈0 [A]", and the downstream-side blocking object current value |IC1| and the downstream-side energizing object current value |IC2| are in a magnitude relationship of "|IC1|<|IC2|".

In addition, for example, when the second high-speed check mode is set and the FETs QA1, QB2, and QB3 are in a blocked state, the downstream-side blocking object current values become |IA1|, |IB2|, and |IC2|, and the downstream-side energizing object current values become |IA2|, |IB1|, and |IC1|. In this case, when the FET QA1 is normal, the downstream-side blocking object current value |IA1| is "|IA1|≈0 [A]", and the downstream-side blocking object current value |IA1| and the downstream-side energizing object current value |IA2| are in a magnitude relationship of "|IA1|<|IA2|". In addition, when the FET QB2 is normal, the downstream-side blocking object current value |IB2| is "|IB2|≈0 [A]", and the downstream-side blocking object current value |IB2| and the downstream-side energizing object current value |IB1| are in a magnitude relationship of "|IB1|>|IB2|". Furthermore, when the FET QB3 is normal, the downstream-side blocking object current value |IC2| is "|IC2|≈0 [A]", and the downstream-side blocking object current value |IC2| and the downstream-side energizing object current value |IC1| are in a magnitude relationship of "|IC1|>|IC2|".

When proceeding to step S2308, the abnormality detecting unit 31a determines that there is no energization, ends the series of processing, and returns to the initial processing.

On the other hand, when proceeding to step S2310, the abnormality detecting unit 31a determines that there is energization, ends the series of processing, and returns to the initial processing.

While the specific example of the failure check processing by current comparison in first and second high-Speed check modes has been described above, the invention is not limited to this configuration and may be configured to determine whether or not there is energization by performing only either one of the above processing of steps S2300 to S2302 and the above processing of steps S2304 to S2306.

Returning to FIG. 10, when proceeding to step S210, the abnormality detecting unit 31a determines whether check processing of all motor-side blocking portions has been ended or not. Then, when determining that the check processing has been ended (Yes), the unit 31a proceeds to step S212, whereas when determining negatively (No), the unit 31a proceeds to step S206.

Specifically, it is determined whether the failure check processing of step S206 for all the FETs of the first and second motor current blocking circuits 33A and 33B has been ended or not. Then, when determined negatively, failure check processing of unchecked FETs is repeatedly executed by the blocking operation patterns corresponding to each check mode depicted in FIG. 15 to FIG. 20 until check processing for all the FETs QA1 to QA3 and QB1 to QB3 is ended.

When proceeding to step S212, the abnormality detecting unit 31a determines that the check results are normal in all the FETs of the first and second power source blocking circuits 44A and 44B and the first and second motor current blocking circuits 33A and 33B. After that, the unit 31a proceeds to step S214.

At step S214, the abnormality detecting unit 31a recovers the blocked FETs of the FETs of the first and second power source blocking circuits 44A and 44B and the first and second motor current blocking circuits 33A and 33B to energized states. In other words, the unit 31a outputs the abnormal detection signals SAa and SAb of the logical value "0" to the first and second motor driving circuits 32A and 32B. After that, the unit 31a ends the series of processing and returns to the initial processing.

On the other hand, when determining that any blocking performing portion is under energization at step S202 or S208 and proceeding to step S216, the abnormality detecting unit 31a determines that a short-circuit failure is occurring in the motor driving circuit corresponding to the blocking performing portion determined to be under energization. After that, the unit 31a proceeds to step S218.

At step S218, the abnormality detecting unit 31a performs failure-coping blocking processing for the motor driving circuit with the short-circuit failure occurring of the first and second motor driving circuits 32A and 32B. After that, the unit 31a ends the series of processing and returns to the initial processing.

Specifically, the failure-coping blocking processing is processing that outputs an abnormality detection signal SAa or SAb of the logical value "1" to the motor driving circuit having the short-circuit failure occurring therein of the first and second motor driving circuits 32A and 32B. Thereby, all the FETs of the motor driving circuit having the short-circuit failure occurring therein are controlled to be in an OFF state, and the motor driving circuit is electrically isolated from the battery 27 and the three-phase electric motor 22.

(Failure Check Processing by Voltage Comparison)

Next, processing steps of failure check processing by voltage comparison will be described based on FIG. 23 to FIG. 29.

Figure 23:
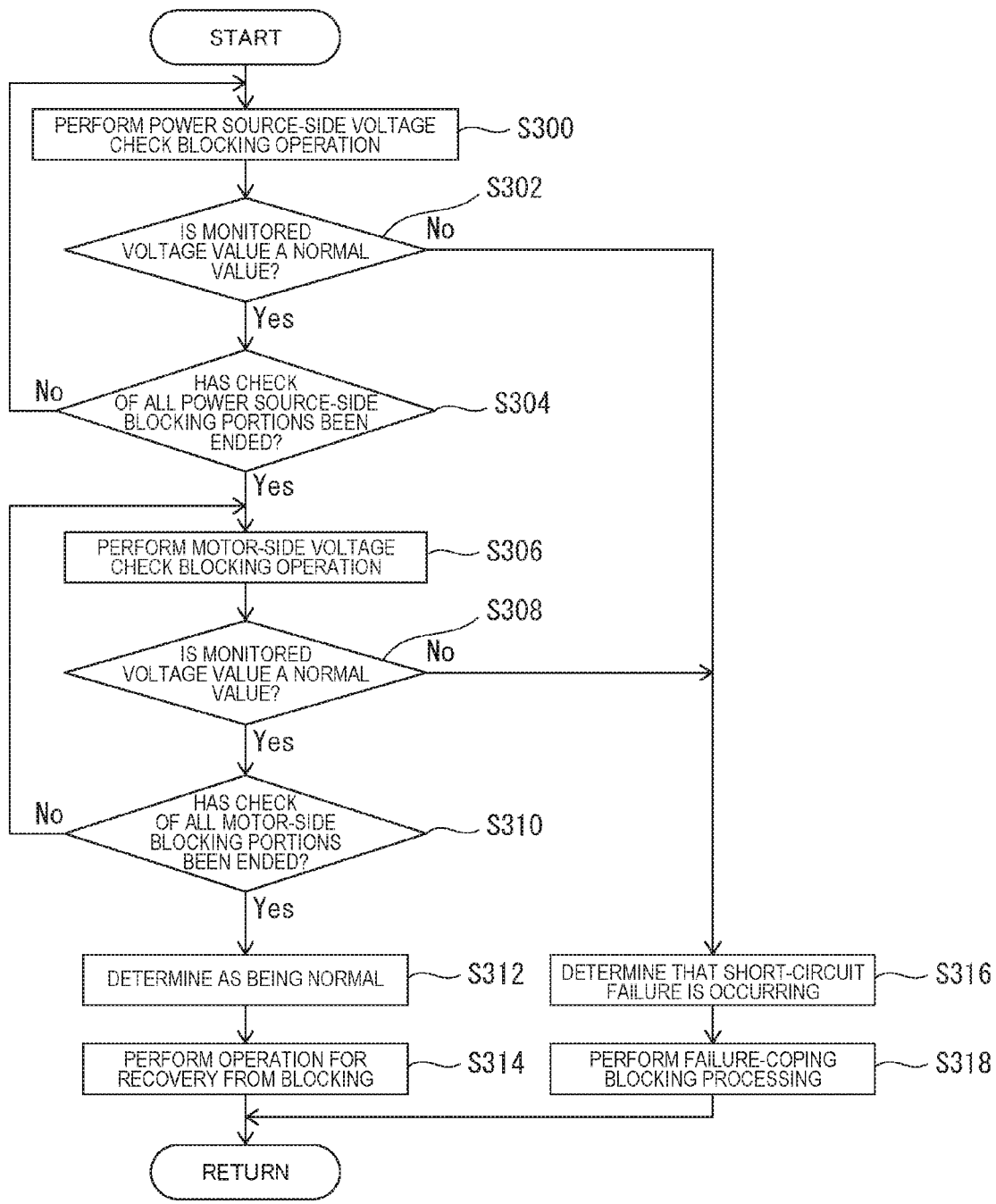
FIG. 23 is a flowchart depicting one example of processing steps of failure check processing by voltage comparison.

When failure check processing by voltage comparison is performed by the abnormality detecting unit 31a, first, the unit 31a proceeds to step S300, as depicted in FIG. 23.

At step S300, the abnormality detecting unit 31a performs power source-side voltage check blocking operation processing, and proceeds to step S302.

Figure 24:
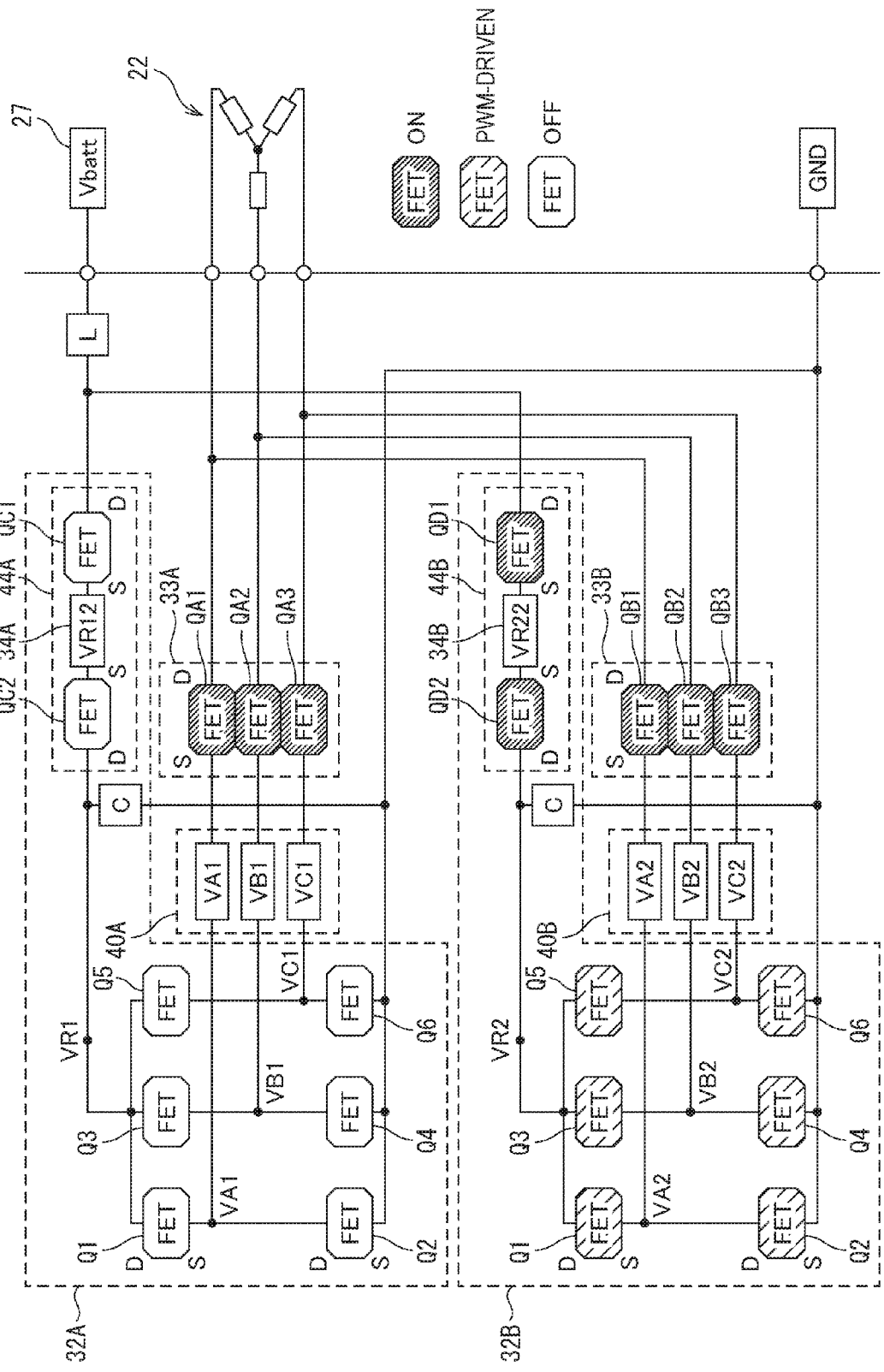
FIG. 24 is a diagram depicting one example of a power source-side voltage check blocking operation pattern.
Figure 25A:
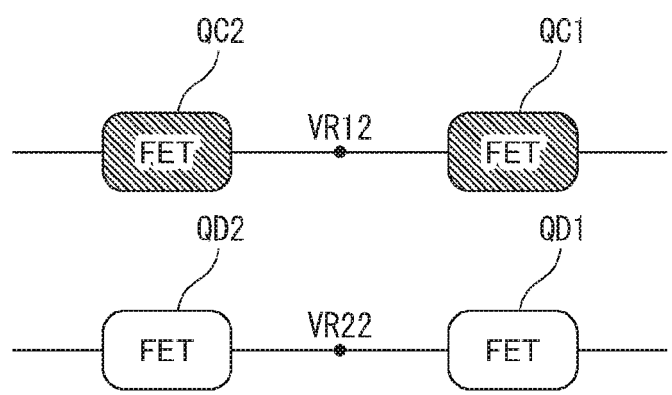
FIG. 25A and FIG. 25B are diagrams depicting other examples of the power source-side voltage check blocking operation pattern.
Figure 25B:
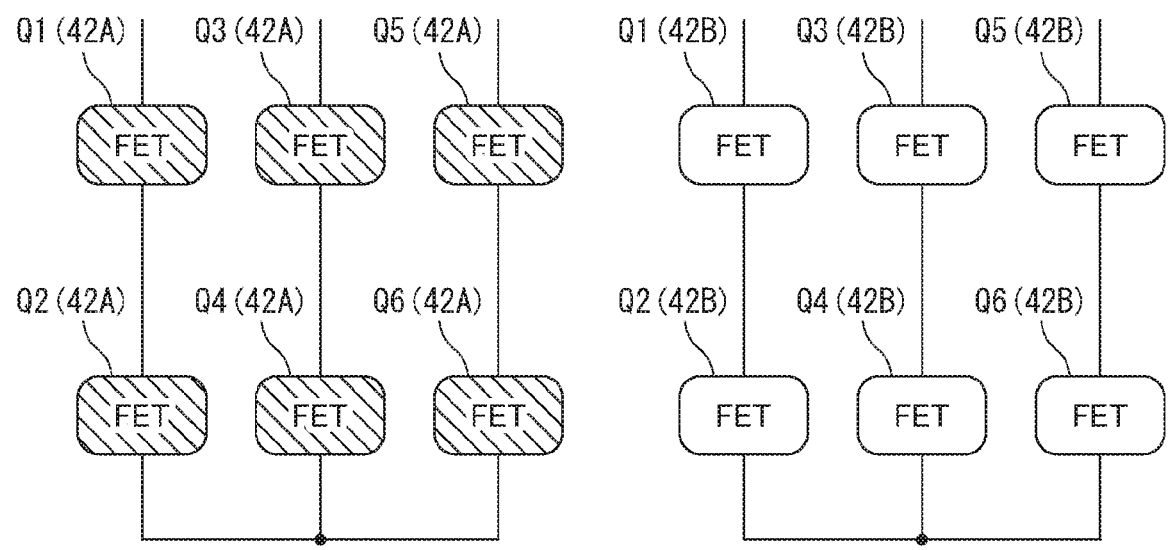

Hereinafter, a specific example of the power source-side voltage check blocking operation processing will be described based on FIG. 24 and FIGS. 25A and 25B. Here, FIG. 24 is a circuit diagram in which the circuit diagram of FIG. 4 is simplified by focusing on voltages to be monitored. In addition, FIGS. 25A and 25B are diagrams depicting blocking portions changed in the circuit diagram of FIG. 24.

In the present embodiment, FETs for maintaining the charge state of the electrolytic capacitors CA and CB and FETs as objects for detecting a short-circuit failure are put in a blocked state (an OFF state) by a previously set power source-side voltage check blocking operation pattern.

Herein, the power source-side voltage check blocking operation pattern is a pattern in which, among the respective FETs of the first and second motor driving circuits 32A and 32B, FETs to be blocked are determined so that the charge state of the electrolytic capacitors CA and CB are maintained. In addition, in the pattern, the FETs to be blocked are determined so that a short-circuit failure of the first or second power source blocking circuit 44A or 44B can be checked by detection values of the monitored voltages VR12 and VR22 (hereinafter referred to as "blocking portion voltage detection values VR12 and VR22").

Specifically, in the power source-side voltage check blocking operation pattern in a case of detection of a short-circuit failure of the first power source blocking circuit 44A, the FETs QC1 and QC2 of the first power source blocking circuit 44A are turned OFF (a blocked state), whereas the FETs QD1 and QD2 of the second power source blocking circuit 44B are turned ON, as depicted in FIG. 24. In addition, all the FETs QA1 to QA3 and QB1 to QB3 of the first and second motor current blocking circuits 33A and 33B are turned ON. Furthermore, in the blocking operation pattern, the respective FETs Q1 to Q6 of the first inverter circuit 42A are turned OFF and the respective FETs Q1 to Q6 of the second inverter circuit 42B are put in a PWM-driven state. Here, the respective FETs Q1 to Q6 of the second inverter circuit 42B may be turned OFF. In addition, the FETs QA1 to QA3 of the first motor current blocking circuit 33A may be turned OFF.

This blocking operation pattern allows maintaining of the changed states (states charged to a battery voltage Vbat [V]) of the electrolytic capacitors CA and CB of the first and second motor driving circuits 32A and 32B. In addition, a short-circuit failure of the first power source blocking circuit 44A can be checked by the blocking portion voltage detection values VR12 and VR22 of the VR voltage detecting circuits 34A and 34B. Additionally, details of the short-circuit failure check will be described later.

Similarly, the power source-side voltage check blocking operation pattern in a case of detection of a short-circuit failure of the second power source blocking circuit 44B is as follows. From the blocking operation pattern depicted in FIG. 24, the FETs QD1 and QD2 of the second power source blocking circuit 44B are turned OFF (a blocked state) whereas the FETs QC1 and QC2 of the first power source blocking circuit 44A are turned ON, as depicted in FIG. 25A. In addition, in the blocking operation pattern, the respective FETs Q1 to Q6 of the first inverter circuit 42A are put in a PWM-driven state, and the respective FETs Q1 to Q6 of the second inverter circuit 42B are turned OFF, as depicted in FIG. 25B. Here, the respective FETs Q1 to Q6 of the first inverter circuit 42A may be turned OFF. In addition, the FETS QB1 to QB3 of the second motor current blocking circuit 33B may be turned OFF.

The blocking operation pattern allows maintaining of the changed states (states charged to the battery voltage Vbat [V]) of the electrolytic capacitors CA and CB of the first and second motor driving circuits 32A and 32B. In addition, short-circuit failure check of the second power source blocking circuit 44B can be made by the blocking portion voltage detection values VR12 and VR22. Additionally, details of the short-circuit failure check will be described later.

Returning to FIG. 23, at step S302, the failure check processing by voltage comparison is performed on the basis of the blocking portion voltage detection values VR12 and VR22, and it is determined whether the monitored voltage value is a normal value or not. Then, when it is determined to be a normal value (Yes), step S304 is performed, whereas when determined negatively (No), step S316 is performed.

In the description hereinbelow, when the blocking portion voltage detection values VR12 and VR22 are not distinguished from each other, the values may be simply referred to as "blocking portion voltage detection value VR".

Hereinafter, a specific example of the failure check processing by voltage comparison in the power source-side voltage check blocking operation will be described based on FIG. 26.

Figure 26:
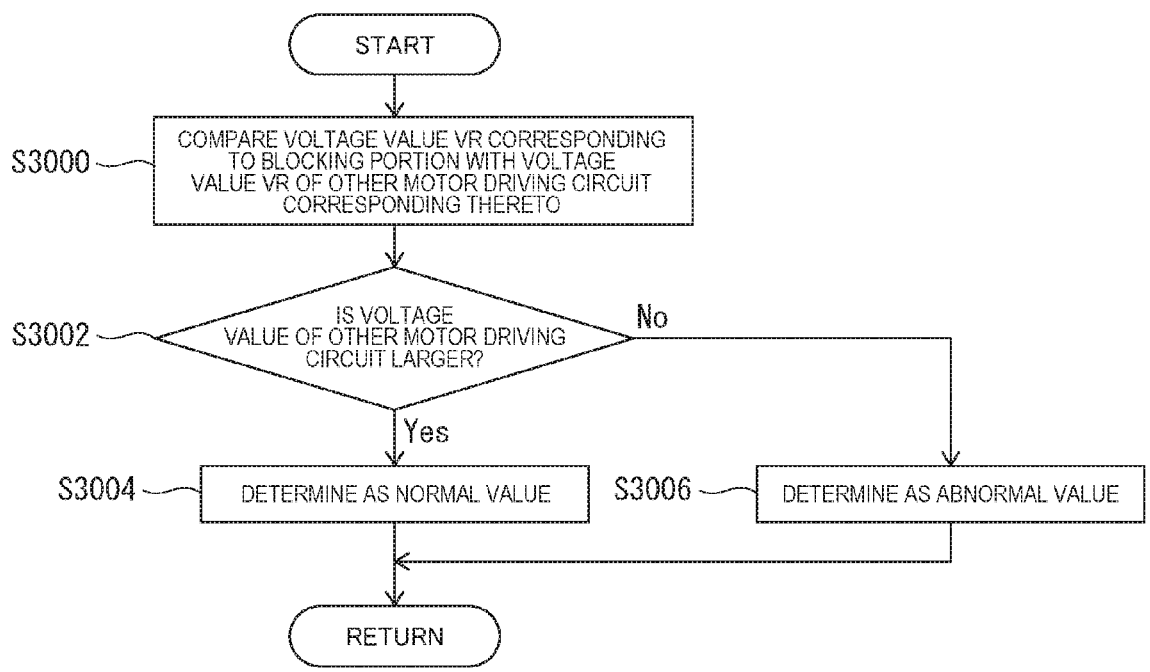
FIG. 26 is a flowchart depicting one example of processing steps of failure check processing by voltage comparison in a power source-side voltage check blocking operation.

At step S302, when the failure check processing by voltage comparison in the power source-side voltage check blocking operation is started, first, step S3000 is performed, as depicted in FIG. 26.

At step S3000, the abnormality detecting unit 31a compares the blocking portion voltage detection value VR of the power source blocking circuit corresponding to blocking portions of one motor driving circuit with the blocking portion voltage detection value VR of the power source blocking circuit of an other motor driving circuit, and proceeds to step S3002.

In the present embodiment, the motor driving circuits include two motor driving circuits: the first and second motor driving circuits 32A and 32B. Thus, the blocking portion voltage detection value VR12 of the connection line of the FETs QC1 and QC2 of the first power source blocking circuit 44A is compared with the blocking portion voltage detection value VR22 of the connection line of the FETs QD1 and QD2 of the second power source blocking circuit 44B.

At step S3002, the abnormality detecting unit 31a determines whether or not the blocking portion voltage detection value VR of the other power source blocking circuit is larger than the blocking portion voltage detection value VR corresponding to the blocking portions. Then, when determining that it is larger (Yes), the unit 31a proceeds to step S3004, whereas determining negatively (No), the unit 31a proceeds to step S3006.

Herein, the VR voltage detecting circuits 34A and 34B of the present embodiment have a configuration depicted in FIG. 8. Accordingly, for example, in detecting a short-circuit failure of the first power source blocking circuit 44A, when the FETs QC1 and QC2 in the blocked state are normal, the blocking portion voltage detection value VR12 is pulled down by the resistance R7 of the VR voltage detecting circuit 34A, and thus becomes substantially 0 [V]. On the other hand, since the FETs QD1 and QD2 of the second power source blocking circuits 44B are in the ON state, the capacitor C1 of the VR voltage detecting circuit 34B is charged by current supplied from the battery 27 or the electrolytic capacitor CB (charged to approximately Vbat [V]). Accordingly, the blocking portion voltage detection value VR22 becomes a substantially battery voltage Vbat [V]. Thus, the blocking portion voltage detection value VR22 is larger than the blocking portion voltage detection value VR12.

In addition, for example, in detecting a short-circuit failure of the first power source blocking circuit 44A, when a short-circuit failure occurs in at least one of the FETs QC1 and QC2 in the blocked state, the blocking portion voltage detection value VR12 becomes a substantially battery voltage Vbat [V], since the capacitor C1 of the VR voltage detecting circuit 34A is charged by current supplied from the battery 27 or the electrolytic capacitor CA (charged to approximately Vbat [V]). On the other hand, the blocking portion voltage detection value VR22 of the second power source blocking circuit 44B also becomes a substantially battery voltage Vbat [V], since the capacitor C1 of the VR voltage detecting circuit 34B is charged by current supplied from the battery 27 or the electrolytic capacitor CB (charged to approximately Vbat [V]). Thus, the blocking portion voltage detection value VR12 and the blocking portion voltage detection value VR22 are in a relationship: "VR12≈VR22 (≈Vbat)".

When proceeding to step S3004, the abnormality detecting unit 31a determines that the monitored voltage value (the blocking portion voltage detection value VR) is a normal value, ends the series of processing, and returns to the initial processing.

On the other hand, at step S3002, when determining that the other blocking portion voltage detection value VR is not larger than the blocking portion voltage detection value VR corresponding to the blocking portions and proceeds to step S3006, the abnormality detecting unit 31a determines that the monitored voltage value (the blocking portion voltage detection value VR) is an abnormal value, ends the series of processing, and returns to the initial processing.

Returning to FIG. 23, when proceeding to step S304, the abnormality detecting unit 31a determines whether or not the check processing of all the power source-side blocking portions has been ended. Then, when determining that it has been ended (Yes), the unit 31a proceeds to step S306, whereas when determining negatively (No), the unit 31a proceeds to step S300.

In the present embodiment, it is determined whether or not the failure check of step S302 in both of the first and second power source blocking circuits 44A and 44B has been ended. Then, when determined that it has not been ended, failure check of an unchecked power source blocking circuit is executed by the blocking operation patterns depicted in FIG. 24 and FIGS. 25A and 25B until the check is ended.

When proceeding to step S306, the abnormality detecting unit 31a performs motor-side voltage check blocking operation processing and proceeds to step S308.

Figure 27:
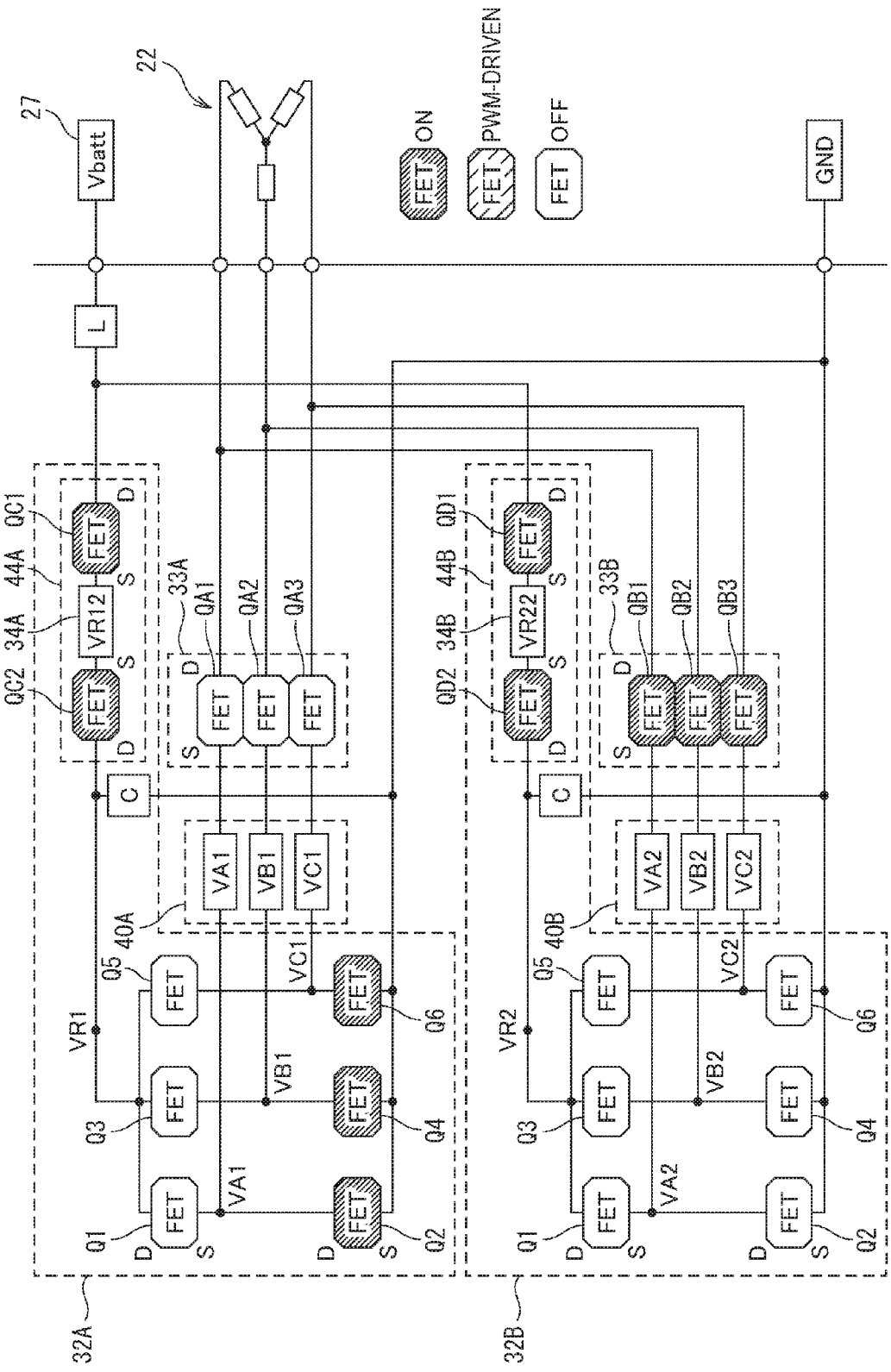
FIG. 27 is a diagram depicting one example of a motor-side voltage check blocking operation pattern.

Hereinafter, a specific example of the motor-side voltage check blocking operation processing will be described based on FIG. 27 and FIGS. 28A and 28B. Here, FIG. 27 is a circuit diagram in which the circuit diagram of FIG. 4 is simplified by focusing on voltages to be monitored. Additionally, FIGS. 28A and 28B are diagrams depicting blocking portions changed in the circuit diagram of FIG. 27.

In the present embodiment, FETs for maintaining the charge state of the electrolytic capacitors CA and CB and FETs as objects for detecting a short-circuit failure are put in a blocked state (an OFF state) by a previously set motor-side voltage check blocking operation pattern.

Herein, the motor-side voltage check blocking operation pattern is a pattern in which, among the respective FETs of the first and second motor driving circuits 32A and 32B, FETs to be blocked are determined so that the charge state of the electrolytic capacitors CA and CB are maintained. In addition, in the pattern, the FETs to be blocked are determined so that a short-circuit failure of the first or second motor current blocking circuit 33A or 33B can be checked by the motor phase voltage detection values VA1 to VC1 and VA2 to VC2 that are detection values of monitored voltages.

Specifically, in the motor-side voltage check blocking operation pattern in a case of detection of a short-circuit failure of the first motor current blocking circuit 33A, the FETs QA1 to QA3 of the first motor current blocking circuit 33A are turned OFF (a blocked state) whereas the FETs QB1 to QB3 of the second motor current blocking circuit 33B are turned ON, as depicted in FIG. 27. In addition, all of the FETs QC1 to QC2 and QD1 to QD2 of the first and second power source blocking circuits 44A and 44B are turned ON. Furthermore, in the blocking operation pattern, the FETs Q1, Q3, and Q5 of the first inverter circuit 42A are turned OFF; the FETs Q2, Q4, and Q6 of the first inverter circuit 42A are turned ON; and the respective FETs Q1 to Q6 of the second inverter circuit 42B are turned OFF. In addition, all of the FETs QC1 to QC2 and QD1 to QD2 of the first and second power source blocking circuits 44A and 44B may be turned OFF.

The blocking operation pattern allows maintaining of the charge state (states charged to the battery voltage Vbat [V]) of the electrolytic capacitors CA and CB of the first and second motor driving circuits 32A and 32B. In addition, a short-circuit failure of the first motor current blocking circuit 33A can be checked by the motor phase voltage detection values VA1 to VC1 and VA2 to VC2 of the motor voltage detecting circuits 40A and 40B. Additionally, details of the short-circuit failure check will be described later.

Similarly, the motor-side voltage check blocking operation pattern in a case of detection of a short-circuit failure of the second motor current blocking circuit 33B is as follows. From the blocking operation pattern of FIG. 27, the FETs QB1 to QB3 are turned OFF (a blocked state), whereas the FETs QA1 to QA3 are turned ON, as depicted in FIG. 28A. In addition, as depicted in FIG. 28B, in the blocking operation pattern, the FETs Q2, Q4, and Q6 of the second inverter circuit 42B are turned ON, whereas the FETs Q2, Q4, and Q6 of the first inverter circuit 42A are turned OFF. Even in this case, all of the FETs QC1 to QC2 and QD1 to QD2 of the first and second power source blocking circuits 44A and 44B may be turned OFF.

The blocking operation pattern allows maintaining of the changed states (states charged to the battery voltage Vbat [V]) of the electrolytic capacitors CA and CB of the first and second motor driving circuits 32A and 32B. In addition, short-circuit failure check of the second motor current blocking circuit 33B can be made by the motor phase voltage detection value VA1 to VC1 and VA2 to VC2 of the motor voltage detecting circuits 40A and 40B. Additionally, details of the short-circuit failure check will be described later.

Returning to FIG. 23, at step S308, the abnormality detecting unit 31a performs the failure check processing by voltage comparison, and determines whether the monitored voltage value is a normal value or not. Then, when determining that it is a normal value (Yes), the unit 31a proceeds to step S310, whereas when determining negatively (No), the unit 31a proceeds to step S316.

In the description hereinbelow, when the motor phase voltage detection values VA1 to VC1 of the motor voltage detecting circuit 40A are not distinguished from each other, the values may be simply referred to as "voltage detection value V1", and when the motor phase voltage detection value VA2 to VC2 of the motor voltage detecting circuit 40B are not distinguished from each other, the values may be simply referred to as "voltage detection value V2". In addition, when the motor phase voltage detection values VA1 to VC1 and VA2 to VC2 are not distinguished from each other, the values may be simply referred to as "voltage detection values VA to VC".

Hereinafter, a specific example of the failure check processing by voltage comparison in the motor-side voltage check blocking operation will be described based on FIG. 29 to FIG. 30.

Figure 29:
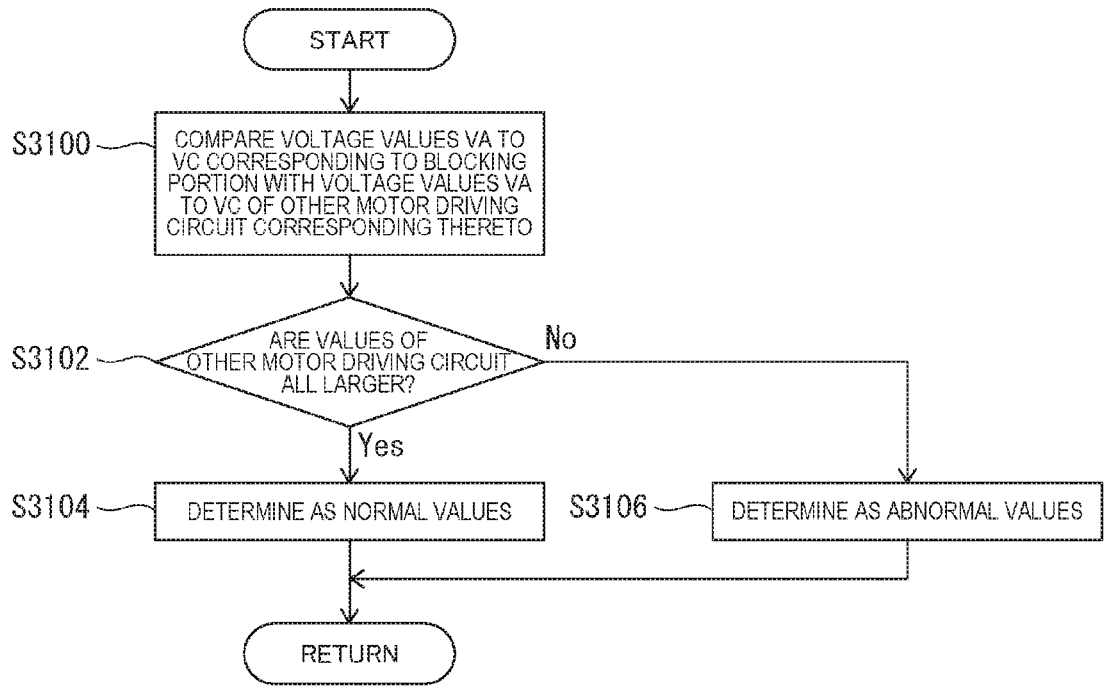
FIG. 29 is a flowchart depicting one example of processing steps of failure check processing by voltage comparison in a motor-side voltage check blocking operation.

At step S308, when the failure check processing by voltage comparison in the motor-side voltage check blocking operation is started, first, the abnormality unit 31a proceeds to step S3100, as depicted in FIG. 29.

At step S3100, the abnormality detecting unit 31a compares magnitudes of the voltage detection values VA to VC of a voltage detecting circuit corresponding to blocking portions and the voltage detection values VA to VC of an other voltage detecting circuit. After that, the unit 31a proceeds to step S3102.

In the present embodiment, the motor driving circuits include the two motor driving circuits: the first and second motor driving circuits 32A and 32B. Accordingly, the motor phase voltage detection value VA1 of the motor voltage detecting circuit 40A is compared with the motor phase voltage detection value VA2 of the motor voltage detecting circuit 40B. In addition, the motor phase voltage detection value VB1 of the motor voltage detection circuit 40A is compared with the motor phase voltage detection value VB2 of the motor voltage detecting circuit 40B. Furthermore, the motor phase voltage detection value VC1 of the motor voltage detecting circuit 40A is compared with the motor phase voltage detection value VC2 of the motor voltage detecting circuit 40B.

At step S3102, the abnormality detecting unit 31a determines whether or not all of the voltage detection values VA to VC of the other voltage detecting circuit are larger than, respectively, the voltage detection values VA to VC of the voltage detecting circuit corresponding to the blocking portions. Then, when determining that all thereof are larger than that (Yes), the unit 31a proceeds to step S3104, whereas determining negatively (No), the unit 31a proceeds to step S3106.

Herein, when all of the FETs QA1 to QC1 of the first motor current blocking circuit 33A are normal, all of the motor phase voltage detection values VA1 to VC1 become ground potential (approximately 0 [V]), since all of the lower arms of the first inverter circuit 42A are in the ON state.

Figure 30:
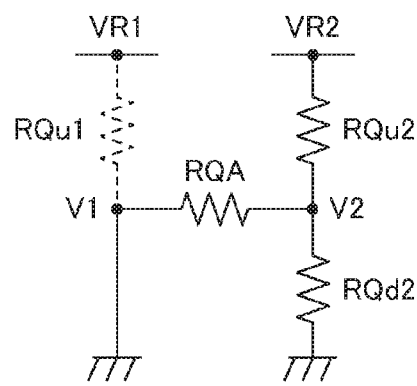
FIG. 30 is a circuit diagram depicting one example of an equivalent circuit including respective FETs of the same phase in first and second inverter circuits 42A and 42B and respective FETs of the same phase in first and second motor current blocking circuits 33A and 33B, where one of the FETs that is in an OFF-state is regarded as a resistance.

In addition, when a FET in an OFF state is regarded as a resistances by focusing on one phase, it is possible to form an equivalent circuit depicted in FIG. 30 by the respective FETs of the same phase of the first and second inverter circuits 42A and 42B and the respective FETs of the same phase of the first and second motor current blocking circuits 33A and 33B.

In FIG. 30, a resistance RQA is one corresponding to the same phase among the FETs QA1 to QA3 in the OFF state of the first motor current blocking circuit 33A connected to the first inverter circuit 42A. Additionally, in FIG. 30, a resistance RQu1 is one corresponding to the same phase among the upper arms in the OFF state of the first inverter circuit 42A connected to the line of the voltage VR1 depicted in FIG. 27. In addition, in FIG. 30, a resistance RQu2 is one corresponding to the same phase among the upper arms in the OFF state of the second inverter circuit 42B connected to a line of the voltage VR2 depicted in FIG. 27. In addition, in FIG. 30, a resistance RQd2 is one corresponding to the same phase among the lower arms in the OFF state of the second inverter circuit 42B. In addition, in FIG. 30, V1 is one corresponding to the same phase among the motor phase voltage detection values VA1 to VC1, and V2 is one corresponding to the same phase among the motor phase voltage detection values VA2 to VC2.

Herein, when the FETs QA1 to QA3 of the first motor current blocking circuit 33A as the blocking performing portions are all normal, the motor phase voltage detection values VA2 to VC2 are all $\frac{1}{3} \times VR2$ (≈Vbat) [V] due to a resistance voltage division ratio of the resistances RQu2, RQA, and RQd2, from the equivalent circuit depicted in FIG. 30.

Accordingly, the relationships between the voltage detection values of the same phase become magnitude relationships of "VA1<VA2", "VB1<VB2", and "VC1<VC2".

On the other hand, when at least one of the FETs QA1 to QA3 of the first motor current blocking circuit 33A as the blocking performing portions is abnormal, the motor phase voltage detection values VA1 to VC1 become all ground potential (approximately 0 [V]) since all of the lower arms of the first inverter circuit 42A are turned ON and grounded.

Additionally, since the motor phase voltage detection values VA2 to VC2 are pulled down via the motor with a relatively low resistance and the FET having a short-circuit failure occurring therein of the FETs QA1 to QA3, all of the values become ground potential (approximately 0 [V]).

Accordingly, the relationships between the voltage detection values of the same phase become relationships of "VA1≈VA2 (≈0 [V])", "VB1≈VB2 (≈0 [V])", and "VC1≈VC2 (≈0 [V])".

Similarly, in a case in which the FETs QB1 to QB3 of the second motor current blocking circuit 33B are blocking performing portions, when the FETs QB1 to QB3 are all normal, all of the motor phase voltage detection values VA2 to VC2 become ground potential (approximately 0 [V]).

In addition, all of the motor phase voltage detection values VA1 to VC1 become ⅓×VR1 (≈Vbat) [V].

Accordingly, the relationships between the voltage detection values of the same phase become magnitude relationships of "VA1>VA2", "VB1>VB2", and "VC1>VC2".

On the other hand, when at least one of the FETs QB1 to QB3 of the second motor current blocking circuit 33B as the blocking performing portions is abnormal, all of the motor phase voltage detection values VA2 to VC2 become ground potential (approximately 0 [V]) since all of the lower arms of the second inverter circuit 42B are turned ON and grounded.

In addition, since the motor phase voltage detection values VA1 to VC1 are pulled down via the motor with a relatively low resistance and the FET having a short-circuit failure occurring therein of the FETs QB1 to QB3, all of the values become ground potential (approximately 0 [V]).

Accordingly, the relationships between the voltage detection values of the same phase become relationships of "VA1≈VA2 (≈0 [V])", "VB1≈VB2 (≈0 [V])", and "VC1≈VC2 (≈0 [V])".

When proceeding to step S3104, the abnormality detecting unit 31a determines that the monitored voltage value is a normal value, ends the series of processing, and returns to the initial processing.

On the other hand, when, at step S3102, determining all of the voltage detection values VA to VC of the other motor driving circuit are not larger than, respectively, the voltage detection values VA to VC corresponding to the blocking portions and proceeding to step S3106, the abnormality detecting unit 31a determines that the monitored voltage values are abnormal values, ends the series of processing, and returns to the initial processing.

Returning to FIG. 23, when proceeding to step S310, the abnormality detecting unit 31a determines whether or not check processing of all of the motor current blocking circuits has been ended. Then, when determining that the check processing has been ended (Yes), the unit 31a proceeds to step S312, whereas when determining negatively (No), the unit 31a proceeds to step S306.

In the present embodiment, it is determined whether the failure check processing of step S306 in both of the first and second motor current blocking circuits 33A and 33B has been ended or not. Then, when determined that it has not been ended, the failure check processing in an unchecked motor current blocking circuit is executed in the blocking operation pattern depicted in FIG. 27 and FIGS. 28A and 28B until the check processing is ended.

When proceeding to step S312, the abnormality detecting unit 31a determines that check results are normal in all the FETs of the first and second power source blocking circuits 44A and 44B and the first and second motor current blocking circuits 33A and 33B. After that, the unit 31a proceeds to step S314.

At step S314, the abnormality detecting unit 31a recovers the FETs in the blocked state of the FETs of the first and second power source blocking circuits 44A and 44B and the first and second motor current blocking circuits 33A and 33B to an energized state. In other words, the abnormality detecting unit 31a outputs the abnormality detection signals SAa and SAb of the logical value "0" to the first and second motor driving circuits 32A and 32B. After that, the unit 31a ends the series of processing and returns to the initial processing.

On the other hand, when the monitored voltage value is determined not to be a normal value at step S302 or S308 and the processing proceeds to step S316, the abnormality detecting unit 31a determines that a short-circuit failure is occurring in a motor driving circuit corresponding to a blocking performing portion whose monitored voltage value has been determined not to be a normal value. After that, the unit 31a proceeds to step S318.

At step S318, the abnormality detecting unit 31a performs failure-coping blocking processing in the motor driving circuit having the short-circuit failure occurring therein. After that, the unit 31a ends the series of processing and returns to the initial processing.

Specifically, the failure-coping blocking processing is processing that outputs the abnormality detection signals SAa and SAb of the logical value "1" to the motor driving circuit having the short-circuit failure occurring therein of the first and second motor driving circuits 32A and 32B. Thereby, the motor driving circuit having the short-circuit failure occurring therein is controlled so that all the FETs thereof are turned OFF. Then, the motor driving circuit is electrically isolated from the battery 27 and the three-phase electric motor 22.

(Operation)

Hereinafter, operation of the present embodiment will be described with reference to FIG. 1 to FIG. 30.

In an operation stopped state in which since an unillustrated ignition switch is in an OFF state, the vehicle is at a stop and the steering assisting control processing is also at a stop, the control computing device 31 of the motor control device 25 is in an unoperated state. Due to this, the steering assisting control processing and the short-circuit failure detection processing that are executed by the control computing device 31 are stopped. Accordingly, the three-phase electric motor 22 is out of operation, where output of a steering assisting force (a steering assisting torque) to the steering assisting mechanism 20 is stopped.

When the ignition switch is turned ON from the operation stopped state, the control computing device 31 goes into an operated state and starts the steering assisting control processing and the short-circuit failure detection processing. At this time, assume that the respective FETs Q1 to Q6 of the first and second inverter circuits 42A and 42B of the respective first and second motor driving circuits 32A and 32B are in a normal state without any an open-circuit failure or a short-circuit failure occurring. In a non-steering state in which the steering wheel 11 is not being steered, the steering torque Ts is "0" and the vehicle speed Vs is also "0" in the steering assisting control processing executed by the control computing device 31. Thus, from the Ts and the Vs, a steering assisting current command value is calculated by referring to the current command value calculation map of FIG. 6.

Then, a d-axis current command value Id* and a q-axis current command value Iq* are calculated on the basis of the calculated steering assisting current command value I* and a motor electrical angle θe input from the motor rotation angle detecting circuit 23. Following that, the calculated d-axis current command value Id* and q-axis current command value Iq* are subjected to dq two-phase to three-phase conversion processing to calculate an A-phase current command value Ia*, a B-phase current command value Ib*, and a C-phase current command value Ic*.

Furthermore, there are calculated current deviations ΔIa, ΔIb, and ΔIc between the respective phase current command values Ia*, Ib*, and Ic* and the three-phase motor driving current values Ia, Ib, and Ic calculated from the downstream-side current detection values IA1 to IC1 and IA2 to IC2 of the respective phases detected by the current detecting circuits 39A2 to 39A4 and 39B2 to 39B4. Furthermore, the calculated current deviations ΔIa, ΔIb, and ΔIc are subjected to PI control processing or PID control processing to calculate target voltage command values Va*, Vb*, and Vc*.

Then, the calculated target voltage command values Va*, Vb*, and Vc* are output as the motor voltage command values V1* and V2* to the first and second gate driving circuits 41A and 41B of the first and second motor driving circuits 32A and 32B. Additionally, since the first and second inverter circuits 42A and 42B are normal, the control computing device 31 outputs the abnormal detection signals SAa and SAb of the logical value "0" to the first and second gate driving circuits 41A and 41B.

Thus, the first and second gate driving circuits 41A and 41B output three high-level gate signals to the first and second motor current blocking circuits 33A and 33B. Accordingly, the FETs QA1 to QA3 and QB1 to QB3 of the first and second motor current blocking circuits 33A and 33B are turned ON. Thereby, energization is performed between the first and second inverter circuits 42A and 42B and the three-phase motor windings La, Lb, and Lc of the three-phase electric motor 22, thereby allowing energization control to the three-phase electric motor 22.

Simultaneously with this, high-level gate signals are output from the first and second gate driving circuits 41A and 41B to the first and second power source blocking circuits 44A and 44B. Due to this, the FETs QC1 to QC2 and QD1 to QD2 of the first and second power source blocking circuits 44A and 44B are turned ON, as a result of which a direct current from the battery 27 is supplied to the first and second inverter circuits 42A and 42B via the noise filter 43.

Furthermore, the first and second gate driving circuits 41A and 41B perform pulse width modulation on the basis of the motor voltage command values V1* and V2* input from the control computing device 31 to form gate signals. Then, the formed gate signals are supplied to the respective FETs Q1 to Q6 of the first and second inverter circuits 42A and 42B.

Accordingly, in a state where the vehicle is stopped and the steering wheel 11 is not steered, the steering torque Ts is "0" and the vehicle speed Vs is also "0". Thus, the steering assisting current command value is also "0" and therefore the three-phase electric motor 22 maintains the stopped state.

In such a situation, the steering assisting current command value I* is less than the first current threshold value, and the respective phase current command values Ia*, Ib*, and Ic* are less than the second current threshold value. In addition, the three-phase motor driving current values Ia, Ib, and Ic are less than the third current threshold value.

Thereby, the abnormality detecting unit 31a determines that energization to the motor is unnecessary, and performs failure check processing by voltage comparison.

When the failure check processing by voltage comparison is performed, the abnormality detecting unit 31a first performs blocking operation processing in the power source-side voltage check blocking operation pattern depicted in FIG. 24 and FIGS. 25A and 25B. Then, by comparing magnitudes of the blocking portion voltage detection values VR12 and VR22 of the VR voltage detecting circuits 34A and 34B at that time, the abnormality detecting unit 31a checks a short-circuit failure of a blocking performing portion of the first and second power source blocking circuits 44A and 44B.

For example, when the first power source blocking circuit 44A is the blocking performing portion, if the blocking portion voltage detection value VR22 is larger than the VR12, the blocking portion voltage detection values VR12 and VR22 are determined to be normal values. In other words, the first power source blocking circuit 44A is determined to be normal. On the other hand, when the blocking portion voltage detection value VR22 is not larger than the VR12 and the blocking portion voltage detection values VR12 and VR22 are in a relationship of "VR12≈VR22≈0 [V]", the blocking portion voltage detection values VR12 and VR22 are determined to be abnormal values. In other words, it is determined that a short-circuit failure is occurring in at least one of the FETs QC1 and QC2 of the first power source blocking circuit 44A.

When any short-circuit failure is occurring in the first power source blocking circuit 44A, the abnormality detection signal SAb is maintained to the logical value "0", whereas the abnormality detection signal SAa becomes the logical value "1". Due to this, six gate drives of the first inverter circuit 42A are all turned OFF, and three low-level gate signals are simultaneously output from the first gate driving circuit 41A of the first motor driving circuit 32A to the first motor current blocking circuit 33A. Furthermore, two low-level gate signals are simultaneously output to the first power source blocking circuit 44A.

As a result, in the first motor current blocking circuit 33A, the FETs QA1 to QA3 of the respective phases are turned OFF, whereby energization to the three-phase motor windings La to Lc of the three-phase electric motor 22 is blocked.

Simultaneously with this, when in the first power source blocking circuit 44A also, the FETs QC1 and QC2 are controlled to be turned OFF and the QC1 is normal, an energization path between the battery 27 and the first inverter circuit 42A is blocked.

However, since the second motor driving circuit 32B is being normally operated, current control to the respective phase motor windings La to Lc of the three-phase electric motor 22 by the second motor driving circuit 32B can be continued by supply of the motor voltage command value V2* to the second motor driving circuit 32B.

Particularly, the three-phase electric motor 22 can generate the same steering assisting torque as in normal conditions by supplying the motor voltage command value V2* set so that 100 [%] of a necessary motor assisting current is provided by the second motor driving circuit 32B. Then, the steering assisting torque is transmitted to the output shaft 12b via the deceleration gear 21, whereby steering assisting characteristics comparable to those in normal conditions can be exhibited. At this time, by outputting a warning signal Swa to the warning circuit 50 at a stage where the short-circuit failure of the first power source blocking circuit 44A has been detected, the occurrence of the short-circuit failure can be reported to the driver to urge the driver to stop by a nearest repair and inspection station.

On the other hand, when there is no short-circuit failure in the first and second power source blocking circuits 44A and 44B, the motor-side voltage check blocking operation processing is continuously performed.

When the motor-side voltage check blocking operation processing is performed, the abnormality detecting unit 31$a$ performs blocking operation processing in the motor-side voltage check blocking operation pattern depicted in FIG. 27 and FIGS. 28A to 28B. Then, by comparing the magnitudes of the values of the same phase among the motor-phase voltage detection values VA1 to VC1 and VA2 to VC2 of the motor voltage detecting circuits 40A and 40B at this time, a short-circuit failure of the blocking performing portion of the first and second motor current blocking circuits 33A and 33B is checked.

For example, when the first motor current blocking circuit 33A is the blocking performing portion, if all of the motor phase voltage detection values VA2 to VC2 are larger than the motor phase voltage detection values VA1 to VC1, respectively, the motor phase voltage detection values are determined to be normal values. In other words, the first motor current blocking circuit 33A is determined to be normal. On the other hand, for example, assume that the motor phase voltage detection values VA2 to VC2 are all not larger than the motor phase voltage detection values VA1 to VC1 and the motor phase voltage detection values VA1 to VC1 and VA2 to VC2 are in a relationship of "VA1≈VA2≈0 [V]", "VB1≈VB2≈0 [V]", and "VC1≈VC2≈0 [V]". In this case, the motor phase voltage detection values are determined to be abnormal values. In other words, at least one of the FETs QA1 to QA3 of the first motor current blocking circuit 33A is determined to have a short-circuit failure.

Herein, when there is no occurrence of a short-circuit failure, the abnormality detection signals SAa and SAb are both maintained to the logical value "0".

Thus, the first and second motor driving circuits 32A and 32B can perform motor driving in normal conditions.

On the other hand, for example, when a short-circuit failure is occurring in the FET QA1 of the first motor current blocking circuit 33A, the abnormality detection signal SAa of the logical value "1" is output to the first gate driving circuit 41A.

Thereby, in the first motor current blocking circuit 33A, the FETs QA1 to QA3 of the respective phases are turned OFF and thereby energization to the three-phase motor windings La to Lc of the three-phase electric motor 22 is blocked.

Simultaneously with this, in the first power source blocking circuit 44A also, the FETs QC1 and QC2 are controlled to be turned OFF. Then, when either one of the QC1 or the QC2 is normal, the energization path between the battery 27 and the first inverter circuit 42A is blocked.

However, since the second motor driving circuit 32B is being normally operated, current control to the respective phase motor windings La to Lc of the three-phase electric motor 22 by the second motor driving circuit 32B can be continued by supply of the motor voltage command value V2* to the second motor driving circuit 32B.

Particularly, by supplying the motor voltage command value V2* set so that 100 [%] of a necessary motor assisting current is provided by the second motor driving circuit 32B, the three-phase electric motor 22 can generate the same steering assisting torque as in normal conditions, and the torque is transmitted to the output shaft 12$b$ via the deceleration gear 21. Thereby, steering assisting characteristics comparable to those in normal conditions can be exhibited. At this time, by outputting the warning signal Swa to the warning circuit 50 at a stage where the short-circuit failure of the first power source blocking circuit 44A has been detected, the occurrence of the short-circuit failure can be reported to the driver to urge the driver to stop by a nearest repair and inspection station.

On the other hand, when a so-called stationary steering is performed by steering the steering wheel 11 in a state where the vehicle is stopped or starts to travel, the steering torque Ts becomes larger, as a result of which the steering assisting current command value I* that is large is calculated by referring to the current command value calculation map of FIG. 6. Thereby, the motor voltage command values V1* and V2* that are large according to the calculated steering assisting current command value I* are supplied to the first and second gate driving circuits 41A and 41B. Due to this, gate signals having duty ratios according to the large motor voltage command values V1* and V2* are output from the first and second gate driving circuits 41A and 41B to the first and second inverter circuits 42A and 42B.

Accordingly, A-phase motor driving currents I1$a$ and I2$a$, B-phase motor driving currents I1$b$ and I2$b$, and C-phase motor driving currents I1$c$ and I2$c$ having a phase difference of 120 degrees according to the steering assisting current command value I* are output from the first and second inverter circuits 42A and 42B. Then, the output motor driving currents pass through the FETs QA1 to QA3 and QB1 to QB3 corresponding to the respective phases of the first and second motor current blocking circuits 33A and 33B and are supplied to the three-phase motor windings La to Lc of the three-phase electric motor 22.

In such a situation, the steering assisting current command value I* is equal to or more than the first current threshold value, and the current command values Ia*, Ib*, and Ic* of the respective phases are equal to or more than the second current threshold value. In addition, the three-phase motor driving current values Ia, Ib, and Ic are equal to or more than the third current threshold value.

Thereby, the abnormality detecting unit 31$a$ determines that the motor is being energized, and performs failure check processing by current comparison.

When the failure check processing by current comparison is performed, the abnormality detecting unit 31$a$, first, performs power source-side current check blocking operation processing in the power source-side current check blocking operation pattern depicted in FIG. 11 and FIGS. 12A to 12C. Herein, in the power source-side current check blocking operation pattern, energization between the battery 27 and one of the motor driving circuits that includes a blocking performing portion is blocked. Thus, driving of the inverter circuits is controlled so that 100 [%] of a necessary motor assisting current is provided by the other motor driving circuit that does not include the blocking performing portion.

Then, on the basis of the upstream-side current detection values IU1 and IU2 of the current detecting circuits 39A1 and 39B1 at this time, a short-circuit failure of the blocking performing portion of the FETs QC1 to QC2 and QD1 to QD2 of the first and second power source blocking circuits 44A and 44B are checked.

For example, when the FET QC1 of the first power source blocking circuit 44A is the blocking performing portion, if the upstream-side blocking object current value |IU1| is equal to or less than the upstream-side current threshold value and the upstream-side energizing object current value |IU2| is larger than the |IU1|, it is determined that there is no energization. In other words, the FET QC1 is determined to be normal. On the other hand, if the upstream-side blocking object current value |IU1| is not equal to or less than the upstream-side current threshold value or the upstream-side energizing object current value |IU2| is equal to or less than the |IU1|, it is determined that there is energization. In other words, it is determined that a short-circuit failure is occurring in the FET QC1.

Additionally, the control computing device 31 supplies, to the second gate driving circuit 41B, the motor voltage command value V2* set so that 100 [%] of a necessary motor assisting current is provided by the second motor driving circuit 32B. Thereby, current control to the respective phase motor windings La to Lc of the three-phase electric motor 22 can be continued. In addition, by generating the same steering assisting torque as in normal conditions by the three-phase electric motor 22, steering assisting characteristics comparable to those in normal conditions can be exhibited.

Herein, when there is no occurrence of a short-circuit failure, the same blocking operation processing and check processing are continued to be performed repeatedly in order of the FETs QC2, QD1, and QD2.

In addition, for example, when a short-circuit failure is occurring in the FET QD1, the abnormality detection signal SAb of the logical value "1" is output to the second gate driving circuit 41B, as in the above-described failure check processing by voltage comparison.

Thereby, in the second motor current blocking circuit 33B, the FETs QB1 to QB3 of the respective phases are turned OFF, whereby energization to the three-phase motor windings La to Lc of the three-phase electric motor 22 is blocked.

Simultaneously with this, in the second power source blocking circuit 44B also, the FET QD1 and QD2 are controlled to be turned OFF. Then, when either one of the QD1 or the QD2 is normal, the energization path between the battery 27 and the second inverter circuit 42B is blocked.

However, since the first motor driving circuit 32A is being normally operated, current control to the respective phase motor windings La to Lc of the three-phase electric motor 22 by the first motor driving circuit 32A can be continued by supply of the motor voltage command value V1* to the first motor driving circuit 32A.

Particularly, by supplying the motor voltage command value V1* set so that 100 [%] of a necessary motor assisting current is provided by the first motor driving circuit 32A, the three-phase electric motor 22 can generate the same steering assisting torque as in normal conditions and thereby can exhibit steering assisting characteristics comparable to those in normal conditions. At this time, by outputting a warning signal Swb to the warning circuit 50 at a stage where the short-circuit failure of the second power source blocking circuit 44B has been detected, the occurrence of the short-circuit failure can be reported to the driver to urge the driver to stop by a nearest repair and inspection station.

On the other hand, when there is no occurrence of a short-circuit failure in any of the FETs of the first and second power source blocking circuits 44A and 44B, the motor-side current check blocking operation processing is continued to be performed.

Herein, when the low-load check mode is set, low-load blocking operation processing is performed in the low-load blocking operation pattern depicted in FIG. 15 and FIGS. 16A to 16E. Herein, in the low-load blocking operation pattern, the energization paths to all the phases of the motor are formed by the remaining paths other than a path blocked by one FET selected as a blocking performing portion among the FETs QA1 to QA3 and QB1 to QB3 of the first and second motor current blocking circuits 33A and 33B. Accordingly, driving of the inverter circuits are controlled so that a switching arm connected to a FET of the other motor current blocking circuit connected to a motor winding of the same phase as a phase connected to the FET as the blocking performing portion provides 100 [%] of an assisting current necessary for the phase. As for the other phases, driving of the inverter circuits are controlled so that switching arms connected to motor windings of the same phases of the first and second inverter circuits 42A and 42B provide each 50 [%] of an assisting current necessary for each phase.

Then, on the basis of the downstream-side current detection values IA1 to IC1 and IA2 to IC2 of the current detecting circuits 39A2 to 39A4 and 39B2 to 39B4 at this time, a short-circuit failure of the blocking performing portion of the FETs QA1 to QA3 and QB1 to QB3 of the first and second motor current blocking circuits 33A and 33B is checked.

For example, when the FET QA1 of the first motor current blocking circuit 33A is the blocking performing portion, if the downstream-side blocking object current value is equal to or less than the downstream-side current threshold value and the downstream-side energizing object current value |IA2| is larger than the downstream-side blocking object current value it is determined that there is no energization. In other words, the FET QA1 is determined to be normal. On the other hand, if the absolute value of the downstream-side current detection value IA1 is not equal to or less than the downstream-side current threshold value or the downstream-side energizing object current value |IA2| is equal to or less than the downstream-side blocking object current value |IA1|, it is determined that there is energization. In other words, it is determined that a short-circuit failure is occurring in the FET QA1.

Additionally, the control computing device 31 sets the target voltage command value Va* of the A phase so that the switching arm SWBa of the second inverter circuit 42B provides 100 [%] of a motor assisting current that is to be supplied to the A-phase motor winding La to which the FET QA1 as the blocking performing portion is connected. In addition, the control computing device 31 sets the target voltage command values Vb* and Vc* of the B phase and the C phase so that the switching arms SWBb and SWBc of the second inverter circuit 42B supply 50 [%] of motor assisting currents that are to be supplied to the B phase and the C phase. Then, the motor voltage command value V2* including these set command values is supplied to the second gate driving circuit 41B.

In addition, the control computing device 31 supplies, to the first gate driving circuit 41A, the motor voltage command value V1* in which the Va*, the Vb*, and the Vc* are set so that the first inverter circuit 42A provides 50 [%] of an assisting current amount that is to be supplied to the respective phase motor windings.

Thereby, current control to the respective phase motor windings La to Lc of the three-phase electric motor 22 can be continued. In addition, by generating the same steering assisting torque as in normal conditions by the three-phase electric motor 22, steering assisting characteristics comparable to those in normal conditions can be exhibited.

In this manner, with the low-load check mode, only any one of the switching arms of the first and second inverter circuits 42A and 42B is caused to provide 100 [%] of a motor assisting current. Thus, as compared to simultaneous check of the plurality of FETs, a load applied to the inverter circuits can be reduced.

Herein, when there is no occurrence of a short-circuit failure, the same blocking operation processing and check processing are continued to be repeatedly performed in order of the FET QA2, QA3, QB1, QB2, and QB3.

In addition, when the first high-speed check mode is set, first high-speed blocking operation processing is performed in the first high-speed blocking operation pattern depicted in FIG. 17 and FIG. 18. Herein, in the first high-speed blocking operation pattern, energization between one of the motor driving circuits that includes a blocking performing portion and the three-phase electric motor 22 is blocked. Thus, driving of the circuits are controlled so that the other motor driving circuit that does not include the blocking performing portion provides 100 [%] of a necessary motor assisting current. In other words, all of the three blocking FETs of anyone of the first and second motor current blocking circuits 33A and 33B of the first and second motor driving circuits 32A and 32B are blocking performing portions.

Then, on the basis of the downstream-side current detection values IA1 to IC1 and IA2 to IC2 of the current detecting circuits 39A2 to 39A4 and 39B2 to 39B4 at this time, a short-circuit failure of the blocking performing portions of the FETs QA1 to QA3 and QB1 to QB3 of the first and second motor current blocking circuits 33A and 33B are checked.

For example, when the FETs QA1 to QA3 of the first motor current blocking circuit 33A are the blocking performing portions, if the downstream-side blocking object current values |IA1| to |IC1| are all equal to or less than the downstream-side current threshold value and, when compared between the values of the same phase, the downstream-side energizing object current values |IA2| to |IC2| are all larger than the downstream-side blocking object current values |IA1| to |IC1|, respectively, it is determined that there is no energization. In other words, the FETs QA1 to QA3 are determined to be normal. On the other hand, if any of the absolute values of the downstream-side current detection values IA1 to IC1 is not equal to or less than the downstream-side current threshold value or, when compared between the values of the same phase, any of the downstream-side energizing object current values |IA2| to |IC2| is equal to or less than the absolute value of any of the downstream-side blocking object current values |IA| to |IC1|, it is determined that there is energization. In other words, it is determined that a short-circuit failure is occurring in any of the FETs QA1 to QA3.

Additionally, the control computing device 31 supplies, to the second gate driving circuit 41B, the motor voltage command value V2* set so that the second motor driving circuit 32B provides 100 [%] of a necessary motor assisting current. Thereby, current control to the respective phase motor windings La to Lc of the three-phase electric motor 22 can be continued. In addition, by generating the same steering assisting torque as in normal conditions by the three-phase electric motor 22, steering assisting characteristics comparable to those in normal conditions can be exhibited.

Herein, when there is no occurrence of a short-circuit failure, the same blocking operation processing and check processing are continued to be performed by using the FETs QB1 to QB3 of the second motor current blocking circuit 33B as the blocking performing portions.

In this manner, with the first high-speed check mode, each three FETS of the first and second motor current blocking circuits 33A and 33B can be checked together, so that check processing time can be reduced as compared to check of each one FET thereof.

In addition, when the second high-speed check mode is set, second high-speed check operation processing is performed in the second high-speed blocking operation pattern depicted in FIG. 19 and FIGS. 20A to 20C. Herein, in the second high-speed blocking operation pattern, energization paths to all the phases of the motor are formed by remaining paths other than paths blocked by three FETs selected as blocking performing portions from both of the first and second motor current blocking circuits 33A and 33B. Accordingly, driving of the inverter circuits are controlled so that switching arms connected to FETs of an other motor current blocking circuit connected to motor windings of the same phase as a phase to which the FETs as the blocking performing portions are connected are caused to be responsible for supplying 100 [%] of assisting current necessary for the phase. In other words, one FET to be blocked of any one of the first and second motor current blocking circuits 33A and 33B of the first and second motor driving circuits 32A and 32B and two FETs to be blocked of the other one of the first and second motor current blocking circuits 33A and 33B are used as blocking performing portions.

Then, on the basis of the downstream-side current detection values IA1 to IC1 and IA2 to IC2 of the current detecting circuits 39A2 to 39A4 and 39B2 to 39B4 at this time, a short-circuit failure of the blocking performing portions of the FETs QA1 to QA3 and QB1 to QB3 of the first and second motor current blocking circuits 33A and 33B are checked.

For example, assumed that the blocking portions are a combination of the FET QA1 of the first motor current blocking circuit 33A and the two FETs QB2 and QB3 of the second motor current blocking circuit 33B. In this case, when the downstream-side blocking object current values |IA1|, |IB2|, and |IC2| are equal to or less than the downstream-side current threshold value and a relationship between the downstream-side blocking object current values and downstream-side energizing object current values is a relationship of "|IA1|<|IA2|", "|IB1|>|IB2|", and "|IC1|>|IC2|", it is determined that there is no energization. In other words, the FETs QA1, QB2, and QB3 are determined to be normal. On the other hand, when the downstream-side blocking object current values |IA1|, |IB2|, and |IC2| are not equal to or less than the downstream-side current threshold value or the relationship between the downstream-side blocking object current values and downstream-side energizing object current values is not the relationship of "|IA1|<|IA2|", "|IB1|>|IB2|", and "|IC1|>|IC2|", it is determined that there is energization. In other words, it is determined that a short-circuit failure is occurring in any of the FETs QA1, QB2, and QB3.

In addition, the control computing device 31 sets the target voltage command values Vb* and Vc* of the B phase and the C phase so that the switching arms SWAb and SWAc of the first inverter circuit 42A supply 100 [%] of motor assisting currents that are to be supplied to the B-phase and C-phase motor windings Lb and Lc to which the FETs QB2 and QB3 as the blocking performing portions are connected. Then, the motor voltage command value V1* including these set command values is supplied to the first gate driving circuit 41A.

On the other hand, the control computing device 31 sets the target voltage command value Va* of the A phase so that the switching arm SWBa of the second inverter circuit 42B supplies 100 [%] of a motor assisting current that is to be supplied to the A-phase motor winding La. Then, the motor voltage command value V2* including the set command value is supplied to the second gate driving circuit 41B.

Thereby, current control to the respective phase motor windings La to Lc of the three-phase electric motor 22 can be continued. In addition, by generating the same steering assisting torque as in normal conditions by the three-phase electric motor 22, steering assisting characteristics comparable to those in normal conditions can be exhibited.

In this manner, with the second high-speed check mode, each three FETs of the first and second motor current blocking circuits 33A and 33B can be checked together. Thus, check processing time can be reduced as compared to check of each one of the FETs.

As a result of check by setting any one of the above check modes, when there is no occurrence of a short-circuit failure in any of the FETs of the first and second motor current blocking circuits 33A and 33B, the first and second power source blocking circuits 44A and 44B and the first and second motor current blocking circuits 33A and 33B are determined to be all normal. After that, blocking operation is cancelled, and operation proceeds to normal steering assisting control processing.

Herein, the first and second motor current blocking circuits 33A and 33B correspond to motor current blocking units; the current detecting circuits 39A1 and 39B1 correspond to current detecting unit and upstream-side current detecting units; and the abnormality detecting unit 31a corresponds to an abnormality detecting unit, a first abnormality detecting unit, and a second abnormality detecting unit.

Additionally, the current detecting circuits 39A2 to 39A4 and 39B2 to 39B4 correspond to current detecting units and downstream-side current detecting units.

Additionally, the first and second power source blocking circuits 44A and 44B correspond to power source blocking units; the motor voltage detecting circuits 40A and 40B correspond to phase voltage detecting units; and the VR voltage detecting circuits 34A and 34B correspond to blocking portion voltage detecting units.

Advantageous Effects of Embodiments (1) The first and second motor driving circuits 32A and 32B receive power supplied from the battery 27 and are operated to supply three-phase motor driving currents Ia, Ib, and Ic to the three-phase motor windings La to Lc of the three-phase electric motor 22. The control computing device 31 controls driving of the first and second motor driving circuits 32A and 32B. The first and second motor current blocking circuits 33A and 33B are individually interposed between the first and second motor driving circuits 32A and 32B and the three-phase motor windings La, Lb, and Lc, and in blocking operation, individually block energization between the first and second motor driving circuits 32A and 32B and the three-phase motor windings La, Lb, and Lc. The current detecting circuits 39A2 to 39A4 and 39B1 to 39B4 individually detect currents flowing to a downstream side (downstream-side current detection signals IA1 to IC1 and IA2 to IC2) of the first and second inverter circuits 42A and 42B of the first and second motor driving circuits 32A and 32B. The abnormality detecting unit 31a detects a short-circuit failure of the first and second motor current blocking circuits 33A and 33B on the basis of current values (the downstream-side current detection values IA1 to IC1 and IA2 to IC2) of the currents detected by the current detecting circuits 39A2 to 39A4 and 39B2 to 39B4. The abnormality detecting unit 31a causes one or more of the FETs QA1 to QA3 and QB1 to QB3 of the first and second motor current blocking circuits 33A and 33B to perform a blocking operation during the energization between the first and second motor driving circuits 32A and 32B and the three-phase electric motor 22, and, during the blocking operation, detects a short-circuit failure of the one or more FETs caused to perform the blocking operation of the FETs QA1 to QA3 and QB1 to QB3, on the basis of the downstream-side current detection values IA1 to IC1 and IA2 to IC2 of the current detecting circuits 39A2 to 39A4 and 39B2 to 39B4.

With this configuration, when one or more of the FETs QA1 to QA3 and QB1 to QB3 of the first and second motor current blocking circuits 33A and 33B are caused to perform a blocking operation, a short-circuit failure of the FETs caused to perform the blocking operation can be detected on the basis of the downstream-side current detection values IA1 to IC1 and IA2 to IC2 of the first and second inverter circuits 42A and 42B.

Herein, the blocking portion(s) of the FETs QA1 to QA3 and QB1 to QB3, when the portion(s) is (are) normal, block(s) energization to a phase(s) connected to the blocking portion(s) among the three-phase motor windings La to Lc. Thus, the downstream-side current detection value(s) corresponding to the blocked phase (s) is (are) 0 [A]. On the other hand, when a short-circuit failure is occurring in the blocking portion(s), the downstream-side current detection value(s) corresponding to the blocked phase(s) is(are) not 0 [A]. Additionally, in the pairs of the downstream-side current detection values of the same phases, i.e. IA1 and IA2, IB1 and IB2, and IC1 and IC2 of the first and second inverter circuits 42A and 42B, when one of the pair is in a blocked state and when the blocking portion is normal, the downstream-side current detection value of the one of the pair is 0 [A]. Thus, the current detection value of the other one of the pair is larger than the value of the one of the pair.

In this manner, a short-circuit failure of a blocking portion can be detected by whether or not a downstream-side current detection value corresponding to the blocking portion become 0 [A] and whether or not, in the magnitude relationships between the downstream-side current detection values IA1 and IA2, IB1 and IB2, and IC1 and IC2 of the same phases, a detection value corresponding to an energizing portion is larger than the detection value corresponding to the blocking portion.

As a result of that, when compared with the conventional configuration for detecting a short-circuit failure by detection of reduction in a motor phase voltage, a short-circuit failure of the first and second motor current blocking circuits 33A and 33B can be more surely detected while the three-phase electric motor 22 is driving.

(2) The abnormality detecting unit 31a causes one or more FETs of the FETs QA1 to QA3 and QB1 to QB3 of the first and second motor current blocking circuits 33A and 33B to perform a blocking operation so that energization to all the phases of the three-phase electric motor 22 is maintained, and performs processing for detecting a short-circuit failure.

Examples of possible blocking operation patterns include a blocking operation pattern in which only the FET QA1 is caused to perform a blocking operation, whereas all the other FETs are caused to perform an energizing operation and a blocking operation pattern in which all the FETs of one of the motor current blocking circuits are caused to perform a blocking operation, whereas all the FETs of the other one thereof are caused to perform an energizing operation. Other than those, there is also a possible blocking operation pattern in which three FETs in total including one FET of one of the motor current blocking circuits and two FETs of the other one thereof that are of phases different from a phase of the one FET are caused to perform a blocking operation, whereas the other FETs are caused to perform an energizing operation.

With this configuration, even during short-circuit failure detection processing, the three-phase electric motor 22 can be driven, so that driving of the three-phase electric motor can be continued without intermission. Herein, since the three-phase electric motor 22 is a motor for assisting steering of the electric power steering device 3, motor assistance can be continuously performed even during short-circuit failure detection processing. As a result of that, it is possible to prevent the occurrence of an uncomfortable steering feeling due to discontinuation of motor assistance.

(3) There are provided the first and second power source blocking circuits 44A and 44B individually interposed between the battery 27 and the first and second inverter circuits 42A and 42B of the first and second motor driving circuits 32A and 32B. The first and second power source blocking circuits 44A and 44B individually block energization between the battery 27 and the first and second inverter circuits 42A and 42B in blocking operation. The abnormality detecting unit 31a detects a short-circuit failure of the first and second power source blocking circuits 44A and 44B on the basis of current values (upstream-side current detection values) IU1 and IU2 of currents detected by the current detecting circuits 39A1 and 39B1. The abnormality detecting unit 31a causes one or more of the FETs QC1 to QC2 and QD1 to QD2 of the first and second power source blocking circuits 44A and 44B to perform a blocking operation during energization between the first and second motor driving circuits 32A and 32B and the three-phase electric motor 22. Along with this, during the blocking operation, the abnormality detecting unit 31a detects a short-circuit failure of the one or more FETs of the first and second power source blocking circuits 44A and 44B caused to perform the blocking operation, on the basis of the upstream-side current detection values IU1 and IU2 of the current detecting circuits 39A1 and 39B1.

Herein, when a FET as a blocking portion of the FETs QC1 to QC2 and QD1 to QD2 is normal, energization between the motor driving circuit to which the power source blocking circuit including the FET is connected and the battery 27 is blocked. Due to this, the upstream-side current detection value flowing to the motor driving circuit from the battery 27 becomes 0 [A]. On the other hand, when a short-circuit failure is occurring in the blocking portion, there is energization between the motor driving circuit to which the power source blocking circuit including the FET is connected and the battery 27. Accordingly, since electric current is supplied to the motor driving circuit from the battery 27, the upstream-side current detection value is not 0 [A]. In addition, in the upstream-side current detection values IU1 and IU2, when the FET as the blocking portion is normal, the upstream-side current detection value of the one motor driving circuit to which the power source blocking circuit including the blocking portion is connected becomes 0 [A]. Thus, the upstream-side current detection value of the other motor driving circuit becomes larger than that.

In this manner, a short-circuit failure of a blocking portion can be detected by whether or not an upstream-side current detection value corresponding to the blocking portion is 0 [A] and whether or not upstream-side current detection value corresponding to an energizing portion is larger than the upstream-side current detection value corresponding to the blocking portion.

As a result of that, when compared to the conventional configuration for detecting a short-circuit failure by detection of voltage reduction in an upper-stage wiring of the inverter circuit, for example, even in a case in which a smoothing capacitor for noise removal is arranged in the inverter circuit side from the power source blocking circuit, it is possible to more surely detect a short-circuit failure of the first and second power source blocking circuits 44A and 44B while the three-phase electric motor 22 is driving.

(4) The abnormality detecting unit 31a causes one or more of the FETs QC1 to QC2 and QD1 to QD2 to perform a blocking operation so that energization to all the phases of the three-phase electric motor 22 is maintained, and performs short-circuit failure check processing.

This configuration enables the three-phase electric motor 22 to be driven even during short-circuit failure detection processing, so that the driving of the three-phase electric motor can be continued without intermission. As a result, it is possible to prevent the occurrence of an uncomfortable steering feeling due to discontinuation of motor assistance.

(5) The control computing device 31 controls the first and second motor driving circuits 32A and 32B to supply a plurality of three-phase motor driving currents to the three-phase motor windings La, Lb, and Lc when the motor control device 25 is normal. When the abnormality detecting unit 31a detects a short-circuit failure, the control computing device 31 stops driving of a motor driving circuit connected to a power source blocking circuit or a motor current blocking circuit in which the short-circuit failure is occurring, as well as causes all the FETs of the power source blocking circuit and the motor current blocking circuit connected to the motor driving circuit to perform a blocking operation and continues supply of three-phase motor driving currents through the other normal one of the motor driving circuits.

With this configuration, when a short-circuit failure occurs in either one of the first or second motor current blocking circuit 33A or 33B, one of the first and second motor driving circuits 32A and 32B to which the motor current blocking circuit having the short-circuit failure occurring therein is connected can be isolated from the battery 27 and the three-phase electric motor 22. In addition, energization to the three-phase electric motor 22 can be continued by the other motor driving circuit without any short-circuit failure occurring. As a result of that, the occurrence of an uncomfortable steering feeling due to discontinuation of motor assistance can be prevented.

(6) The abnormality detecting unit 31a determines whether or not energization between the first and second motor driving circuits 32A and 32B and the three-phase electric motor 22 is necessary on the basis of the steering assisting current command value I* computed by the control computing device 31 and the current values (the three-phase motor driving current values Ia, Ib, and Ic) of currents flowing through the respective phases of the three-phase electric motor 22. Alternatively, the abnormality detecting unit 31a determines whether or not there is energization between the first and second motor driving circuits 32A and 32B and the three-phase electric motor 22. Then, when determining that energization is necessary or there is energization, the abnormality detecting unit 31a performs processing for detecting a short-circuit failure of the first and second power source blocking circuits 44A and 44B.

This configuration enables processing for detecting a short-circuit failure of the first and second power source blocking circuits 44A and 44B based on the three-phase motor driving current values Ia, Ib, and Ic at a timing when there is energization between the first and second motor driving circuits 32A and 32B and the three-phase electric motor 22. Thereby, detection of a short-circuit failure of the first and second power source blocking circuits 44A and 44B can be more surely performed.

(7) The abnormality detecting unit 31a determines whether or not energization between the first and second motor driving circuits 32A and 32B and the three-phase electric motor 22 is necessary or whether or not there is energization between the first and second motor driving circuits 32A and 32B and the three-phase electric motor 22, on the basis of the steering assisting current command value I* computed by the control computing device 31 and the motor driving current values Ia, Ib, and Ic of currents flowing through the respective phases of the three-phase electric motor. Then, when determining that energization is necessary or there is energization, the abnormality detecting unit 31a performs processing for detecting a short-circuit failure of the first and second motor current blocking circuits 33A and 33B.

This configuration enables processing for detecting a short-circuit failure of the first and second motor current blocking circuits 33A and 33B based on the three-phase motor driving current values Ia, Ib, and Ic at a timing when there is energization between the first and second motor driving circuits 32A and 32B and the three-phase electric motor 22. Thereby, detection of a short-circuit failure of the first and second motor current blocking circuits 33A and 33B can be more surely performed.

(8) The first and second motor driving circuits 32A and 32B include the first and second inverter circuits 42A and 42B provided with the switching arms SWAa, SWAb, SWAc, SWBa, SWBb, and SWBc corresponding to the number of phases of the three-phase electric motor 22 that supply the three-phase motor driving currents Ia, Ib, and Ic to the three-phase electric motor. The switching arms SWAa, SWAb, SWAc, SWBa, SWBb, and SWBc include the upper arms (FETs Q1, Q3, and Q5) and the lower arms (FETs Q2, Q4, and Q6). The current detecting circuits 39A1 and 39B1 are individually interposed between the first and second power source blocking circuits 44A and 44B and the upper arms to detect a current that flows from the battery 27 to the upper arms. The abnormality detecting unit 31a acquires an upstream-side blocking object current value detected by the current detecting circuits 39A1 and 39B1, which is the current value of a current flowing through the upper arms of an inverter circuit to which a power source blocking circuit caused to perform a blocking operation is connected. In addition, the abnormality detecting circuit 31a acquires an upstream-side energizing object current value that is the current value of a current flowing through the upper arms of an other inverter circuit to which a power source blocking circuit caused to perform an energizing operation is connected. Then, the abnormality detecting circuit 31a detects a short-circuit failure of the power source blocking unit caused to perform the blocking operation, on the basis of, of the upstream-side blocking object current value and the upstream-side energizing object current value, at least the upstream-side blocking object current value.

Herein, as described in the above (3), the upstream-side blocking object current value (IU1 or IU2) becomes 0 [A] when the FET as the blocking portion (any of the FETs QC1 to QC2 and QD1 to QD2) is normal. Additionally, when the FET as the blocking portion is normal, the upstream-side blocking object current value is larger when compared between the upstream-side blocking object current value (one of the IU1 and the IU2) and the upstream-side energizing object current value (an other one of the IU1 and the IU2).

Accordingly, this configuration enables a short-circuit failure of a blocking portion to be detected on the basis of at least the upstream-side blocking object current value, such as whether or not the upstream-side blocking object current value is 0 [A] or whether or not the upstream-side energizing object current value is larger than the upstream-side blocking object current value.

As a result of that, when compared to the conventional configuration for detecting a short-circuit failure by detecting voltage reduction of an upper-stage wiring of the inverter circuit, for example, even in a configuration in which a smoothing capacitor for noise removal is arranged in an inverter circuit side from the power source blocking circuit, a short-circuit failure of the first and second power source blocking circuits 44A and 44B can be more surely detected while the three-phase electric motor 22 is driving.

(9) The first and second motor driving circuits 32A and 32B include the first and second inverter circuits 42A and 42B provided with the switching arms SWAa, SWAb, SWAc, SWBa, SWBb, and SWBc corresponding to the number of phases of the three-phase electric motor 22 that supply the three-phase motor driving currents Ia, Ib, and Ic to the three-phase electric motor. The switching arms SWAa, SWAb, SWAc, SWBa, SWBb, and SWBc include the upper arms (FETs Q1, Q3, and Q5) and the lower arms (FETs Q2, Q4, and Q6). The current detecting circuits 39A2 to 39A4 and 39B2 to 39B4 are individually interposed between the lower arms of the first and second inverter circuits 42A and 42B and grounds to individually detect currents that flow from the lower arms to the grounds (downstream-side current detection values IA1 to IC1 and IA2 to IC2). The abnormality detecting unit 31a acquires downstream-side blocking object current values detected by the current detecting circuits 39A2 to 39A4 and 39B2 to 39B4, which are the current values of currents flowing to the grounds from the lower arms of the same phases as the motor current blocking circuit of an inverter circuit to which the motor current blocking circuit caused to perform the blocking operation is connected. In addition, the abnormality detecting unit 31a acquires downstream-side energizing object current values that are the current values of currents flowing to the grounds from the lower arms of the same phase as the lower arms corresponding to the downstream-side blocking object current values of the other inverter circuit to which a motor current blocking circuit caused to perform an energizing operation is connected. Then, the abnormality detecting unit 31a detects a short-circuit failure of the motor current blocking circuit caused to perform the blocking operation, on the basis of, of the downstream-side blocking object current values and the downstream-side energizing object current values, at least the downstream-side blocking object current values.

Herein, as described in the above (1), when the FET as a blocking portion (any of the FETs QA1 to QA3 and QB1 to QB3) is normal, the downstream-side blocking object current value (any of IA1 to IC1 and IA2 to IC2) becomes 0 [A]. Additionally, when the FET as the blocking portion is normal, the downstream-side energizing object current value is larger than the downstream-side blocking object current value.

Accordingly, this configuration enables a short-circuit failure of a blocking portion to be detected by whether or not the downstream-side blocking object current value is 0 [A]. In addition, in the magnitude relationship between the downstream-side blocking object current value (either one of IA1 and IA2, IB1 and IB2, and IC1 and IC2) and the downstream-side energizing object current value (either other one of IA1 and IA2, IB1 and IB2, and IC1 and IC2), depending on whether or not the downstream-side energizing object current value is larger than the downstream-side blocking object current value, it is possible to detect the short-circuit failure of the blocking portion.

As a result of that, when compared to the conventional configuration for detecting a short-circuit failure by detecting reduction of a motor phase voltage, a short-circuit failure of the first and second motor current blocking circuits 33A and 33B can be more surely detected while the three-phase electric motor 22 is driving.

(10) The first and second motor driving circuits 32A and 32B receive power supplied from the battery 27 and are operated to supply the three-phase motor driving currents Ia, Ib, and Ic to the three-phase motor windings La to Lc of the three-phase electric motor 22. The control computing device 31 controls driving of the first and second motor driving circuits 32A and 32B. The first and second motor current blocking circuits 33A and 33B of the three phases are individually interposed between the first and second inverter circuits 42A and 42B of the first and second motor driving circuits 32A and 32B and the three-phase motor windings La, Lb, and Lc. The first and second motor current blocking circuits 33A and 33B individually block energization between the first and second inverter circuits 42A and 42B and the three-phase motor windings La, Lb, and Lc in blocking operation. The motor voltage detecting circuits 40A and 40B individually detect motor phase voltage detection values VA1 to VC1 and VA2 to VC2 that are voltages between connection points of the respective upper arms and lower arms of the first and second inverter circuits 42A and 42B and connection points of the respective FETs QA1 to QA3 and QB1 to QB3 of the first and second motor current blocking circuits 33A and 33B. The abnormality detecting unit 31a detects a short-circuit failure of the first and second motor current blocking circuits 33A and 33B on the basis of the motor phase voltage detection values VA1 to VC1 and VA2 to VC2 of the motor voltage detecting circuits 40A and 40B. The abnormality detecting unit 31a operates the control computing device 31 so that the first and second inverter circuits 42A and 42B and the three-phase electric motor 22 are put in a non-energized state. Along with this, one or more of the FETs QA1 to QA3 and QB1 to QB3 of the first and second motor current blocking circuits 33A and 33B are caused to perform a blocking operation during the non-energized state. Then, during the blocking operation, a short-circuit failure of the one or more FETs caused to perform the blocking operation are detected on the basis of the motor phase voltage detection values VA1 to VC1 and VA2 to VC2 detected by the motor voltage detecting circuits 40A and 40B.

For example, in a situation where energization to the three-phase electric motor 22 is unnecessary or there is no energization, no determination can be made as to the presence or absence of energization. With this configuration, the upper arms and lower arms of the first and second inverter circuits 42A and 42B are blocked so that the first and second inverter circuits 42A and 42B and the three-phase electric motor 22 are put in the non-energized state in the situation where energization is unnecessary or there is no energization. In addition, by blocking the FETs as objects to be checked of the first and second motor current blocking circuits 33A and 33B, a short-circuit failure of the first and second motor current blocking circuits 33A and 33B can be detected on the basis of the motor phase voltage detection values VA1 to VC1 and VA2 to VC2 of the motor voltage detecting circuits 40A and 40B at this time.

As a result of that, a short-circuit failure of the first and second motor current blocking circuits 33A and 33B can be detected in the situation where energization to the three-phase electric motor 22 is unnecessary or there is no energization.

(11) There are provided electrolytic capacitors CA and CB individually interposed between connection lines of the first and second motor driving circuits 32A and 32B and the battery 27 and ground lines. The abnormality detecting unit 31a operates the control computing device 31 so that the charge state of the electrolytic capacitors CA and CB are maintained, causes one or more of the FETs QA1 to QA3 and QB1 to QB3 to perform a blocking operation, and performs processing for short-circuit failure detection.

With this configuration, even when the electrolytic capacitors CA and CB having a relatively large capacity are interposed to remove noise, the charge state of the electrolytic capacitors CA and CB can be maintained in performing processing for short-circuit failure detection. As a result of that, when performing a blocking operation involving discharge of the electrolytic capacitors CA and CB, an energization response delay occurring at a time of restart of energization due to the discharge can be prevented. Consequently, this can prevent an uncomfortable steering feeling from occurring due to the energization response delay.

(12) The first and second motor driving circuits 32A and 32B are formed by including the first and second inverter circuits 42A and 42B provided with the switching arms SWAa, SWAb, SWAc, SWBa, SWBb, and SWBc corresponding to the number of the phases of the three-phase electric motor 22 that supply three-phase motor driving currents Ia, Ib, and Ic to the three-phase electric motor. The switching arms SWAa, SWAb, SWAc, SWBa, SWBb, and SWBc include the upper arms (FETs Q1, Q3, and Q5) and the lower arms (FETs Q2, Q4, and Q6). The motor voltage detecting circuits 40A and 40B are individually interposed between connection points of the upper arms and lower arms of the respective phases of the first and second inverter circuits 42A and 42B and the three-phase motor windings La, Lb, and Lc and individually detect voltages of the connection points as the motor phase voltage detection values VA1 to VC1 and VA2 to VC2. The abnormality detecting unit 31a turns OFF all of the upper arms of the inverter circuit to which the motor current blocking circuit as a short-circuit failure detection object is connected and turns ON all of the lower arms thereof, whereas it turns OFF all of the upper arms and lower arms of the inverter circuit to which the motor current blocking circuit as an energizing object is connected. Thereby, the first and second inverter circuits 42A and 42B and the three-phase electric motor 22 are put in a non-energized state. In addition, during the non-energized state, all of the FETs of the motor current blocking circuit as the short-circuit failure detection object connected to either one of the first and second inverter circuits 42A and 42B are caused to perform a blocking operation. Furthermore, during the blocking operation, a short-circuit failure of the motor current blocking circuit caused to perform the blocking operation is detected on the basis of the motor phase voltage detection values VA1 to VC1 and VA2 to VC2 detected by the motor voltage detecting circuits 40A and 40B.

With this configuration, for example, in a case in which the FETs QA1 to QA3 of the first motor current blocking circuit 33A are caused to perform a blocking operation, when the FETs are all normal, the motor phase voltage detection values VA1 to VC1 become all approximately 0 [V]. On the other hand, the motor phase voltage detection values VA2 to VC2 become ⅓×VR2 (≈Vbat [V]) from the relationship of the equivalent circuit depicted in FIG. 30. Additionally, if a short-circuit failure occurs even in any one of the FETs QA1 to QA3, the motor phase voltage detection values VA2 to VC2 are pulled down via the motor and therefore all thereof become approximately 0 [V].

Accordingly, detection of a short-circuit failure can be made by the magnitude relationship between the motor phase voltage detection values VA1 to VC1 and motor phase voltage detection values VA2 to VC2. As a result of that, a short-circuit failure of the motor current blocking circuit can be more surely detected in the situation where energization is unnecessary or there is no energization.

(13) There are provided the first and second power source blocking circuits 44A and 44B individually interposed between the battery 27 and the first and second inverter circuits 42A and 42B of the first and second motor driving circuits 32A and 32B. The first and second power source blocking circuits 44A and 44B individually block energization between the battery 27 and the first and second inverter circuits 42A and 42B in blocking operation. The VR voltage detecting circuits 34A and 34B detect the voltages VR12 and VR22 generated in the first and second power source blocking circuits 44A and 44B. The abnormality detecting unit 31a detects a short-circuit failure of the first and second power source blocking circuits 44A and 44B on the basis of the voltages VR12 and VR22 detected by the VR voltage detecting circuits 34A and 34B. The abnormality detecting unit 31a operates the control computing device 31 so that the first and second inverter circuits 42A and 42B and the three-phase electric motor 22 are put in a non-energized state, and, during the non-energized state, causes one or more of the FETs QC1 to QC2 and QD1 to QD2 of the first and second power source blocking circuits 44A and 44B to perform a blocking operation. Then, during the blocking operation, the abnormality detecting unit 31a detects a short-circuit failure of the one or more FETs caused to perform the blocking operation, on the basis of the blocking portion voltage detection values VR12 and VR22 detected by the VR voltage detecting circuits 34A and 34B.

For example, no determination can be made as to the presence or absence of energization in a situation where energization to the three-phase electric motor 22 is unnecessary or there is no energization. With this configuration, the upper arms and lower arms of the first and second inverter circuits 42A and 42B are blocked so that the first and second inverter circuits 42A and 42B and the three-phase electric motor 22 are put in a non-energized state in the situation where energization is unnecessary or there is no energization. In addition, the FET as an object to be checked of the first and second power source blocking circuits 44A and 44B is blocked. On the basis of the blocking portion voltage detection values VR12 and VR22 of the VR voltage detecting circuits 34A and 34B at this time, a short-circuit failure of the first and second power source blocking circuits 44A and 44B can be detected.

As a result of that, a short-circuit failure of the first and second power source blocking circuits 44A and 44B can be detected in the situation where energization to the three-phase electric motor 22 is unnecessary or there is no energization.

(14) There are provided the electrolytic capacitors CA and CB individually interposed between the connection lines of the first and second power source blocking circuits 44A and 44B and the first and second inverter circuits 42A and 42B and the ground lines. The abnormality detecting unit 31a operates the control computing device 31 so that the charge state of the electrolytic capacitors CA and CB are maintained, causes one or more of the FETs QA1 to QA3 and QB1 to QB3 to perform a blocking operation, and performs processing for short-circuit failure detection.

With this configuration, even when the electrolytic capacitors CA and CB having a relatively large capacity are interposed to remove noise, the charge state of the electrolytic capacitors CA and CB can be maintained in performing processing for short-circuit failure detection. Thereby, when performing a blocking operation involving discharge of the electrolytic capacitors CA and CB, an energization response delay occurring at a time of restart of energization due to the discharge can be prevented. Consequently, this can prevent an uncomfortable steering feeling from occurring due to the energization response delay.

(15) The first and second power source blocking circuits 44A and 44B include the FETs QC1 and QD1 that block energization from the battery 27 to the first and second inverter circuits 42A and 42B and the FETs QC2 and QD2 that block energization from the first and second inverter circuits 42A and 42B to the battery 27. The VR voltage detecting circuits 34A and 34B detect the voltage VR 12 generated at a connection line between the FETs QC1 and QC2 and the voltage VR22 generated at a connection line between the FETs QD1 and QD2, and also have a function of holding the respective connection lines at ground potential (a pulldown function) when the FETs QC1 to QC2 and the FETs QD1 to QD2 are in a normally blocked state.

With this configuration, for example, when the FETs QC1 and QC2 of the first power source blocking circuit 44A are caused to perform a blocking operation, if they are normal, currents from the battery 27 and the electrolytic capacitor CA are blocked. Thus, due to the pulldown function (resistance R7) of the VR voltage detecting circuit 34A, the blocking portion voltage detection value VR12 becomes approximately 0 [V]. On the other hand, the blocking portion voltage detection value VR22 generated at the connection line between the FETs QD1 and QD2 in the energized state becomes approximately Vbat [V] due to the current supplied from the battery 27. Accordingly, a short-circuit failure of the first and second power source blocking circuits 44A and 44B can be detected by blocking all of the FETs of one of the first and second power source blocking circuits 44A and 44B, whereas energizing all of the FETs of the other power source blocking circuit, and making a magnitude comparison between the blocking portion voltage detection values VR12 and VR22.

(16) When the motor control device 25 is normal, the control computing device 31 controls the first and second motor driving circuits 32A and 32B to supply a plurality of three-phase motor driving currents to the three-phase motor windings La, Lb, and Lc. When the abnormality detecting unit 31a detects a short-circuit failure, the control computing device 31 stops driving of the motor driving circuit to which the power source blocking circuit or the motor current blocking circuit having the short-circuit failure occurring therein is connected. Along with this, all of the FETs of the power source blocking circuit and the motor current blocking circuit connected to the motor driving circuit are caused to perform a blocking operation, and the other normal motor driving circuit continues supply of the three-phase motor driving currents.

With this configuration, when a short-circuit failure occurs in either one of the first and second motor current blocking circuits 33A and 33B, one of the first and second motor driving circuits 32A and 32B to which the motor current blocking circuit with the short-circuit failure is connected can be isolated from the battery 27 and the three-phase electric motor 22. In addition, energization to the three-phase electric motor 22 can be continued by the other motor driving circuit without any short-circuit failure occurring. As a result of that, the occurrence of an uncomfortable steering feeling due to discontinuation of motor assistance can be prevented.

(17) The abnormality detecting unit 31a determines whether energization between the first and second motor driving circuits 32A and 32B and the three-phase electric motor 22 is necessary or not on the basis of the steering assisting current command value I* computed by the control computing device 31 and the motor driving current values Ia, Ib, and Ic of currents flowing through the respective phases of the three-phase electric motor. Alternatively, the unit 31a determines whether or not there is energization between the first and second motor driving circuits 32A and 32B and the three-phase electric motor 22. Then, when determining that the energization is unnecessary or there is no energization, the unit 31a performs processing for detecting a short-circuit failure of the first and second power source blocking circuits 44A and 44B.

This configuration enables short-circuit failure detection processing for the first and second power source blocking circuits 44A and 44B based on monitored voltage values at a timing when energization between the first and second motor driving circuits 32A and 32B and the three-phase electric motor 22 is unnecessary. As a result of that, a short-circuit failure of the first and second power source blocking circuits 44A and 44B can be more surely detected.

Herein, in the conventional example, a steering amount of the steering wheel is determined on the basis of the amount of change in output of a torque sensor or a motor angular velocity, and they cannot be regarded as being exactly equivalent to motor current. Thus, in the configuration of the conventional example, energization may be blocked by erroneous permission of check in a state where while a current command is input via a network such as CAN, the motor is not rotating, for example, in a case in which a torque cancellation current command is input from the CAN so that a vehicle can travel straight ahead even with no steering torque during travelling on an inclined road or during sudden braking. In contrast, the present configuration enables the necessity or non-necessity of energization to be surely detected on the basis of the steering assisting current command value I* and the motor driving current values Ia, Ib, and Ic of the respective phases of the three-phase electric motor 22. Thus, the occurrence of an erroneous blocking operation can be prevented.

(18) The abnormality detecting unit 31a determines whether energization between the first and second motor driving circuits 32A and 32B and the three-phase electric motor 22 is necessary or not on the basis of the steering assisting current command value I* computed by the control computing device 31 and the motor driving current values Ia, Ib, and Ic flowing through the respective phases of the three-phase electric motor. Alternatively, the abnormality detecting unit 31a determines whether or not there is energization between the first and second motor driving circuits 32A and 32B and the three-phase electric motor 22. Then, when determining that the energization is unnecessary or there is no energization, the unit 31a performs processing for detecting a short-circuit failure of the first and second motor current blocking circuits 33A and 33B.

With this configuration, short-circuit failure detection processing for the first and second motor current blocking circuits 33A and 33B based on the monitored voltage values can be performed at a timing when energization between the first and second motor driving circuits 32A and 32B and the three-phase electric motor 22 is unnecessary. As a result of that, a short-circuit failure of the first and second motor current blocking circuits 33A and 33B can be more surely detected.

In addition, as with the above (17), since the necessity or non-necessity of the energization can be more surely detected on the basis of the steering assisting current command value I* and the motor driving current values Ia, Ib, and Ic of currents flowing through the respective phases of the three-phase electric motor, the occurrence of an erroneous blocking operation can be prevented.

Modified Examples (1) While the above embodiments have described the configuration in which the motor driving circuits include the two motor driving circuits, the present invention is not limited thereto and can also be applied to embodiments of configurations with three or more motor driving circuits.

(2) While the above embodiments have described the case in which the electric motor is the three-phase electric motor, the invention is not limited thereto and can also be applied to embodiments of multi-phase electric motors with four or more phases.

(3) While the above embodiments have described the case in which the motor control device according to the present invention has been applied to the electric power steering device incorporated in the vehicle, the invention is not limited thereto and can also be applied to an optional system using an electric motor, such as an electric brake device, a steering-by-wire system, or a motor driving device for vehicle traveling.

In addition, while the above-described respective embodiments are preferable specific examples of the present invention and technically preferable various limitations are added, the scope of the invention is not limited to these embodiments as long as there is no description that particularly limits the invention in the above description. Additionally, for illustrative convenience, the drawings used in the above description are schematic diagrams in which longitudinal and transversal scales of the members and portions are different from actual ones.

The present application claims priority to Japanese Patent Application P No. 2014-48009 (filed on Mar. 11, 2014), the entire content of which is incorporated herein by reference.

While the present invention has been described hereinabove with reference to the limited number of embodiments, the scope of the invention is not limited thereto, and improvements and modifications of the respective embodiments based on the above disclosure are obvious to those skilled in the art.

REFERENCE SIGNS LIST

1: Vehicle
11: Steering wheel

12: Steering shaft
13: Steering torque sensor
18: Steering gear
20: Steering assisting mechanism
22: Three-phase electric motor
La: A-phase motor winding
Lb: B-phase motor winding
Lc: C-phase motor winding
L1 to L3: Coil portion
25: Motor control device
26: Vehicle speed sensor
27: Battery
31: Control computing device
31a: Abnormality detecting unit
32A: First motor driving circuit
32B: Second motor driving circuit
33A: First motor current blocking circuit
33B: Second motor current blocking circuit
34A, 34B: VR voltage detecting circuit
35: Compensation control computing unit
36: Adder
37: d-q axis current command value computing unit
38: Voltage command value computing unit
39A1, 39A2, 39A3, 39A4, 39B1, 39B2, 39B3, 39B4: Current detecting circuit
40A, 40B: Motor voltage detecting circuit
41A: First gate driving circuit
41B: Second gate driving circuit
42A: First inverter circuit
42B: Second inverter circuit
44A: First power source blocking circuit
44B: Second power source blocking circuit
50: Warning circuit

The invention claimed is:

1. A motor control device comprising:
a plurality of motor driving circuits configured to operate by receiving a power source supplied from a common power source system and supply multi-phase motor driving currents to multi-phase motor windings of a multi-phase electric motor;
a control computing device configured to control driving of the plurality of motor driving circuits;
a plurality of multi-phase motor current blocking units individually interposed between the plurality of motor driving circuits and the multi-phase motor windings and configured to individually block energization between the plurality of motor driving circuits and the multi-phase motor windings in blocking operation;
a plurality of current detecting units configured to individually detect currents flowing to the plurality of motor driving circuits;
a first abnormality detecting unit configured to detect a short-circuit failure of the plurality of motor current blocking units on a basis of current values of the currents detected by the plurality of current detecting units;
a plurality of power source blocking units individually interposed between the power source system and the plurality of motor driving circuits and configured to, in the blocking operation, individually block energization between the power source system and the plurality of motor driving circuits; and
a second abnormality detecting unit configured to detect a short-circuit failure of the plurality of power source blocking units on a basis of current values of currents detected by the current detecting units, wherein the first abnormality detecting unit causes one or more motor current blocking units of the plurality of motor current blocking units to perform the blocking operation during energization between the plurality of motor driving circuits and the multi-phase electric motor, and, during the blocking operation, detects a short-circuit failure of the motor current blocking units caused to perform the blocking operation based on the current values of the currents detected by the plurality of current detecting units,
the second abnormality detecting unit causes one or more motor current blocking units of the plurality of power source blocking units to perform a blocking operation during the energization between the plurality of motor driving circuits and the multi-phase electric motor, and, during the blocking operation, detects a short-circuit failure of the power source blocking units caused to perform the blocking operation based on the current values of the currents detected by the plurality of current detecting units,
the motor driving circuits include a multi-phase inverter circuit that is provided with switching arms including upper arms and lower arms corresponding to the number of the phases of the multi-phase electric motor and supplying the multi-phase driving currents to the multi-phase electric motor,
the current detecting units include upstream-side current detecting circuits that are individually interposed between the power source blocking units and the upper arms and that detect a current flowing from the power source system to the upper arms, and
the second abnormality detecting unit detects the short-circuit failure of the power source blocking unit caused to perform the blocking operation based on, of an upstream-side blocking object current value that is a current value of a current flowing to the upper arms of the motor driving circuit to which the power source blocking unit caused to perform the blocking operation is connected and an upstream-side energizing object current value that is a current value of a current flowing to the upper arms of an other one of the motor driving circuits to which the power source blocking unit caused to perform an energizing operation is connected, the current values being detected by the upstream-side current detecting circuits, at least the upstream-side blocking object current value.

2. The motor control device according to claim 1, wherein the first abnormality detecting unit causes the one or more motor current blocking units of the plurality of motor current blocking units to perform the blocking operation so that energization to all phases of the multi-phase electric motor is maintained, and performs processing for detecting the short-circuit failure.

3. The motor control device according to claim 1, wherein the second abnormality detecting unit causes the one or more power source blocking units of the plurality of power source blocking units to perform the blocking operation so that the energization to all the phases of the multi-phase electric motor is maintained, and performs processing for detecting the short-circuit failure.

4. The motor control device according to claim 1, wherein when the motor control device is normal, the control computing device controls the plurality of motor driving circuits to supply a plurality of multi-phase motor driving currents to the multi-phase motor windings, and, when the first abnormality detecting unit or the second abnormality detecting unit detects the short-circuit failure, the control computing device stops driving of the motor driving circuit connected to the power source blocking unit or the motor current blocking unit having the short-circuit failure occurring therein, causes the power source blocking unit and the motor current blocking unit connected to the motor driving circuit to perform a blocking operation, and continues supply of the multi-phase motor driving currents by an other normal motor driving circuit.

5. The motor control device according to claim 1, wherein the second abnormality detecting unit determines whether or not the energization between the motor driving circuits and the multi-phase electric motor is necessary or whether or not there is energization between the motor driving circuits and the multi-phase electric motor on a basis of a motor current command value computed by the control computing device and current values of currents flowing through respective phases of the multi-phase electric motor, and when determining that the energization is necessary or there is energization therebetween, performs processing for detecting the short-circuit failure of the power source blocking unit.

6. The motor control device according to claim 1, wherein the first abnormality detecting unit determines whether or not the energization between the motor driving circuits and the multi-phase electric motor is necessary or whether or not there is energization between the motor driving circuits and the multi-phase electric motor on a basis of a motor current command value computed by the control computing device and current values of currents flowing through respective phases of the multi-phase electric motor, and when determining that the energization is necessary or there is energization therebetween, performs processing for detecting the short-circuit failure of the motor current blocking unit.

7. The motor control device according to claim 1, wherein
the current detecting units include a plurality of downstream-side current detecting circuits that are individually interposed between the lower arms corresponding to the number of the phase and ground and that individually detect a current flowing from each of the lower arms to the ground; and
the first abnormality detecting unit detects the short-circuit failure of the motor current blocking unit caused to perform the blocking operation based on, of a downstream-side blocking object current value that is a current value of a current flowing to the ground from the lower arm of the same phase as the motor current blocking unit of the motor driving circuit to which the motor current blocking unit caused to perform the blocking operation is connected and a downstream-side energizing object current value that is a current value of a current flowing to the ground from the lower arm of the same phase as the lower arm corresponding to the downstream-side blocking object current value of an other one of the motor driving circuits to which the motor current blocking unit caused to perform the energizing operation is connected, the current values being detected by the downstream-side current detecting circuits, at least the downstream-side blocking object current value.

8. An electric power steering device, wherein a motor control device including an electric motor that generates a steering assisting force in a steering mechanism comprises the motor control device according to claim 1.

9. A vehicle comprising the motor control device according to claim 1.

10. A motor control device comprising:
a plurality of motor driving circuits configured to operate by receiving a power source supplied from a common power source system and supply multi-phase motor driving currents to multi-phase motor windings of a multi-phase electric motor;
a control computing device configured to control driving of the plurality of motor driving circuits;
a plurality of power source blocking units individually interposed between the power source system and the plurality of motor driving circuits and configured to individually block energization between the power source system and the plurality of motor driving circuits in blocking operation;
a plurality of current detecting units configured to individually detect currents flowing to the plurality of motor driving circuits; and
an abnormality detecting unit configured to detect a short-circuit failure of the plurality of power source blocking units on a basis of current values of the currents detected by the current detecting units,
wherein the abnormality detecting unit causes one or more of the plurality of power source blocking units to perform a blocking operation during energization between the plurality of motor driving circuits and the multi-phase electric motor, and, during the blocking operation, detects a short-circuit failure of the power source blocking units caused to perform the blocking operation based on the current values of the currents detected by the plurality of current detecting units,
the motor driving circuits include a multi-phase inverter circuit that is provided with switching arms including upper arms and lower arms corresponding to the number of the phases of the multi-phase electric motor and supplying the multi-phase electric motor and supplying the multi-phase driving currents to the multi-phase electric motor,
the current detecting units include upstream-side current detecting circuits that are individually interposed between the power source blocking units and the upper arms and that detect a current flowing from the power source system to the upper arms, and
a second abnormality detecting unit detects the short-circuit failure of the power source blocking unit caused to perform the blocking operation based on, of an upstream-side blocking object current value that is a current value of a current flowing to the upper arms of the motor driving circuit to which the power source blocking unit caused to perform the blocking operation is connected and an upstream-side energizing object current value that is a current value of a current flowing to the upper arms of an other one of the motor driving circuits to which the power source blocking unit caused to perform an energizing operation is connected, the current values being detected by the upstream-side current detecting circuits, at least the upstream-side blocking object current value.

* * * * *